United States Patent
Howe et al.

(10) Patent No.: US 12,476,710 B2
(45) Date of Patent: *Nov. 18, 2025

(54) ANALOG AMPLITUDE NOISE MODULATION TO COMMUNICATE INFORMATION

(71) Applicant: The Boeing Company, Arlington, VA (US)

(72) Inventors: Wayne Richard Howe, Irvine, CA (US); Jeffrey H. Hunt, Los Angeles, CA (US)

(73) Assignee: The Boeing Company, Arlington, VA (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/334,739

(22) Filed: Jun. 14, 2023

(65) Prior Publication Data

US 2024/0204878 A1    Jun. 20, 2024

Related U.S. Application Data

(63) Continuation-in-part of application No. 18/067,516, filed on Dec. 16, 2022, and a continuation-in-part of application No. 18/067,547, filed on Dec. 16, 2022.

(51) Int. Cl.
  *H04B 10/50*    (2013.01)
  *H04B 10/11*    (2013.01)
  *H04B 10/54*    (2013.01)

(52) U.S. Cl.
  CPC ........... *H04B 10/503* (2013.01); *H04B 10/11* (2013.01); *H04B 10/54* (2013.01)

(58) Field of Classification Search
  CPC ....... H04B 10/11; H04B 10/54; H04B 10/503
  USPC ......................................................... 398/115
  See application file for complete search history.

(56) References Cited

U.S. PATENT DOCUMENTS

| | | |
|---|---|---|
| 1,309,031 A | 7/1919 | Hettinger |
| 3,404,403 A | 10/1968 | Vallese et al. |
| 3,719,829 A | 3/1973 | Vaill |
| 6,087,992 A | 7/2000 | Anderson |
| 6,087,993 A | 7/2000 | Anderson et al. |
| 6,377,436 B1 | 4/2002 | Margolin |

(Continued)

FOREIGN PATENT DOCUMENTS

| | | | | |
|---|---|---|---|---|
| CA | 3077841 A1 | * | 10/2020 | ........... H05H 1/4697 |
| CN | 111756470 A | * | 10/2020 | ............ H04W 12/02 |

(Continued)

OTHER PUBLICATIONS

Alshershby et al., Reconfigurable Plasma Antenna Produced in Air by Laser-induced Filaments: Passive Radar Application, 2012 International Conference on Optoelectronics and Microelectronics (ICOM), Aug. 23-25, 2012, Changchun, China, 8 pages.

(Continued)

*Primary Examiner* — Amritbir K Sandhu
(74) *Attorney, Agent, or Firm* — Yee & Associates, P.C.

(57) ABSTRACT

A method, apparatus, and system for communicating information. A communications system comprising a computer system and a communications manager. The communications manager is configured to identify analog information for transmission and transmit noise signals with a varying amplitude that thereby modulate the noise signals to correspond to the analog information.

20 Claims, 55 Drawing Sheets

(56) References Cited

U.S. PATENT DOCUMENTS

| | | | |
|---|---|---|---|
| 6,650,297 | B2 | 11/2003 | Anderson et al. |
| 6,657,594 | B2 | 12/2003 | Anderson |
| 6,674,970 | B1 | 1/2004 | Anderson |
| 7,456,791 | B2 | 11/2008 | Pellet |
| 7,613,074 | B1 | 11/2009 | Blackmon et al. |
| 7,965,241 | B2 | 6/2011 | Marquis |
| 8,922,436 | B2 | 12/2014 | Stone et al. |
| 10,069,564 | B2 | 9/2018 | Hening et al. |
| 10,211,522 | B2 | 2/2019 | Anderson |
| 10,630,383 | B2 | 4/2020 | Zhang et al. |
| 10,763,963 | B2 * | 9/2020 | Jia ............... H04B 10/2507 |
| 11,024,950 | B2 | 6/2021 | Hening et al. |
| 2007/0215946 | A1 | 9/2007 | Eastlund |
| 2014/0288539 | A1 * | 9/2014 | Bischoff ............ A61F 9/00825 606/4 |
| 2018/0175936 | A1 * | 6/2018 | Jia ..................... H04B 10/697 |
| 2018/0263103 | A1 * | 9/2018 | Exton .................. B64C 23/005 |
| 2019/0094185 | A1 | 3/2019 | Athanassiadis |
| 2019/0379459 | A1 * | 12/2019 | Kim ................... H04B 10/564 |
| 2020/0091994 | A1 | 3/2020 | Kalita et al. |
| 2022/0390553 | A1 * | 12/2022 | Englesbe ............ G01S 13/0209 |
| 2023/0198624 | A1 * | 6/2023 | Franklin .......... H04B 10/25073 398/183 |
| 2024/0146321 | A1 * | 5/2024 | Miyata ................. H03M 1/165 |
| 2024/0204880 | A1 * | 6/2024 | Howe .................. H04B 10/524 |
| 2024/0244738 | A1 * | 7/2024 | Walczak ............... H05H 15/00 |
| 2024/0267126 | A1 | 8/2024 | Howe et al. |

FOREIGN PATENT DOCUMENTS

| | | | | |
|---|---|---|---|---|
| CN | 113489495 | A | * 10/2021 | ............ H03M 3/358 |
| CN | 117529975 | A | * 2/2024 | ............... H05H 1/54 |
| GB | 124833 | A | 4/1919 | |
| WO | 2010111089 | A2 | 9/2010 | |
| WO | 2017210871 | A1 | 12/2017 | |

OTHER PUBLICATIONS

Brelet et al., "Radiofrequency plasma antenna generated by femtosecond laser filaments in air," Applied Physics Letters , vol. 101, Issue 26, Dec. 27, 2012, 4 pages.https://aip.scitation.org/doi/abs/10.1063/1.4773492.

Choe et al., "Radiation characteristics of femtosecond laser-induced plasma channel Vee antenna," Physics of Plasmas, vol. 22, Issue 6, 10.1063/1.4922083, Published Online Jun. 4, 2015, 10 pages.

Dai et al., "Demonstration of 17 Meter Standoff THz Wave Generation," Nonlinear Optics: Materials, Fundamentals and Applications 2009, Honolulu, Hawaii, Jul. 12-17, 2009, 4 pages.

Harilal et al., "Lifecycle of laser-produced air sparks," Physics of Plasmas, vol. 22, Issue 6, 10.1063/1.4922076, Published Online Jun. 3, 2015, 35 pages.https://aip.scitation.org/doi/10.1063/1.4922076.

Howe et al., "Pulse Noise Modulation to Encode Data," filed Dec. 16, 2022, U.S. Appl. No. 18/067,547, 98 pages.

Howe et al., "Radio Frequency Communications Using Laser Optical Breakdowns," filed Dec. 16, 2022, U.S. Appl. No. 18/067,516, 100 pages.

Kumar et al., "Effect of laser intensity on radio frequency emissions from laser induced breakdown of atmospheric air," Journal of Applied Physics, vol. 119, Issue 21, 214904, Jun. 7, 2016, 9 pages.https://doi.org/10.1063/1.4953211.

Kumar et al., "Radio frequency emissions from laser induced material breakdown," 10th Asia Plasma and Fusion Association Conference, International Conference Series, Journal of Physics, Conference Series 823, (2017), 012008, 7 pages.

Kumar et al., "RF emissions from laser breakdown of target materials," 2013 International Conference on Microwave and Photonics (ICMAP), Dec. 13-15, 2013, 4 pages.doi: 10.1109/ICMAP.2013.6733512.

Kumar et al., "Spectral selective radio frequency emissions from laser induced breakdown of target materials," Applied Physics Letters, vol. 105, Issue 6, 10.1063/1.4893279, Published Online Aug. 13, 2014, 6 pages.https://doi.org/10.1063/1.4893279.

Mechain et al., "A virtual antenna produced in air by intense femtosecond laser pulses," European Symposium on Optics and Photonics for Defence and Security, Nov. 3, 2005, Bruges, Belgium, 7 pages.https://www.spiedigitallibrary.org/conference-proceedings-of-spie/5989/59890S/A-virtual-antenna-produced-in-air-by-intense-femtosecond-laser/10.1117/12.631202.short.

Pearlman et al., "Emission of rf radiation from laser-produced plasmas," Journal of Applied Physics, vol. 49, Issue 1, 457 (1978), Published Online Aug. 12, 2008, 4 pages.https://doi.org/10.1063/1.324360.

Stallings, "Spread Spectrum," Data and Computer Communications 7th Edition, Chapter 9, Feb. 2007, 28 pages. http://williamstallings.com/DCC/DCC7e.html.

Theberge et al., "Broadband and long lifetime plasma-antenna in air initiated by laser-guided discharge," Applied Physics Letters, vol. 111, Issue 7, Aug. 14, 2017, 5 pages.https://aip.scitation.org/doi/10.1063/1.4985045.

Wang et al., "Effect of laser energy and polarization on RF emission characteristics of laser induced air plasma," Eleventh International Conference on Information Optics and Photonics (CIOP 2019), 2019, Xi'an, China, Proceedings of SPIE vol. 11209, 8 pages.https://www.spiedigitallibrary.org/conference-proceedings-of-spie.

Kumar et al., "Detection and analysis of low-frequency electromagnetic emissions from ns laser induced breakdown of air," Proceedings of SPIE—The International Society for Optical Engineering, May 2012, vol. 8434, 7 pages.

Antipov A A et al: "Microwave Generation in an Optical Breakdown Plasma Created By Modulated Laser Radiation", Soviet Journal of Quantum Electronics, American Institute of Physics, New York, NY | us, vol. 6, Jun. 1, 1990 (Jun. 1, 1990), pp. 664-666, XP000174924, ISSN: 0049-1748, DOI: 10.1070/QE1990V020N06ABEH006676.

European Patent Office, Extended Search Report, dated Nov. 11, 2024, regarding Application No. EP24180478.0, 12 pages.

European Patent Office, Extended Search Report, dated Oct. 25, 2024, regarding Application No. EP24180480.6, 10 pages.

European Patent Office Extended Search Report, dated Apr. 25, 2024, regarding Application No. EP23205184.7, 10 pages.

Griffiths et al., "Scalable visible light communications with a micro-LED array projector and high-speed smartphone camera," Optics Express, vol. 27, No. 11, May 27, 2019, pp. 15585-15594, https://opg.optica.org/OE/fulltext.cfm?uri=oe-27-11-15585&id=412698.

Li et al., "Optical Computing using hybrid encoded shadow casting," Rapid Communications, Applied Optics, vol. 25, No. 16, Aug. 15, 1986, 4 pages.

Zong Si-Guang et al: "Study of opto-acoustic communication between air and underwater carrier", Proceedings of SPIE; [Proceedings of SPIE ISSN 0277-786X vol. 10524], SPIE, US, vol. 10697, Feb. 20, 2018 (Feb. 20, 2018), pp. 106975S-106975S, XP060102900, DOI: 10.1117/12.2315446, ISBN: 978-1-5106-1533-5.

Kumar et al., "A reconfigurable plasma antenna," Journal of Applied Physics, Mar. 1, 2010, 10 pages, vol. 107, Issue 5, AIP Publishing, accessed Jul. 16, 2025, https://doi.org/10.1063/1.3318495.

Office Action, dated May 14, 2025, regarding U.S. Appl. No. 18/067,516, 44 pages.

Office Action, dated Apr. 4, 2025, regarding U.S. Appl. No. 18/067,547, 70 pages.

Extended European Search Report, dated Aug. 26, 2025, regarding EP Application No. 25159385.1, 10 pages.

Zhao Yang et al: "Photoacoustic communication system based on detecting laser-generated sound by optical fiber underwater acoustic sensor", Optics and Lasers in Engineering, Elsevier, Amsterdam, NL, vol. 177, Feb. 29, 2024 (Feb. 29, 2024), XP087483956, ISSN: 0143-8166, DOI: 10.1016/J.OPTLASENG.2024.108134 [retrieved on Feb. 29, 2024] * the whole document *.

* cited by examiner

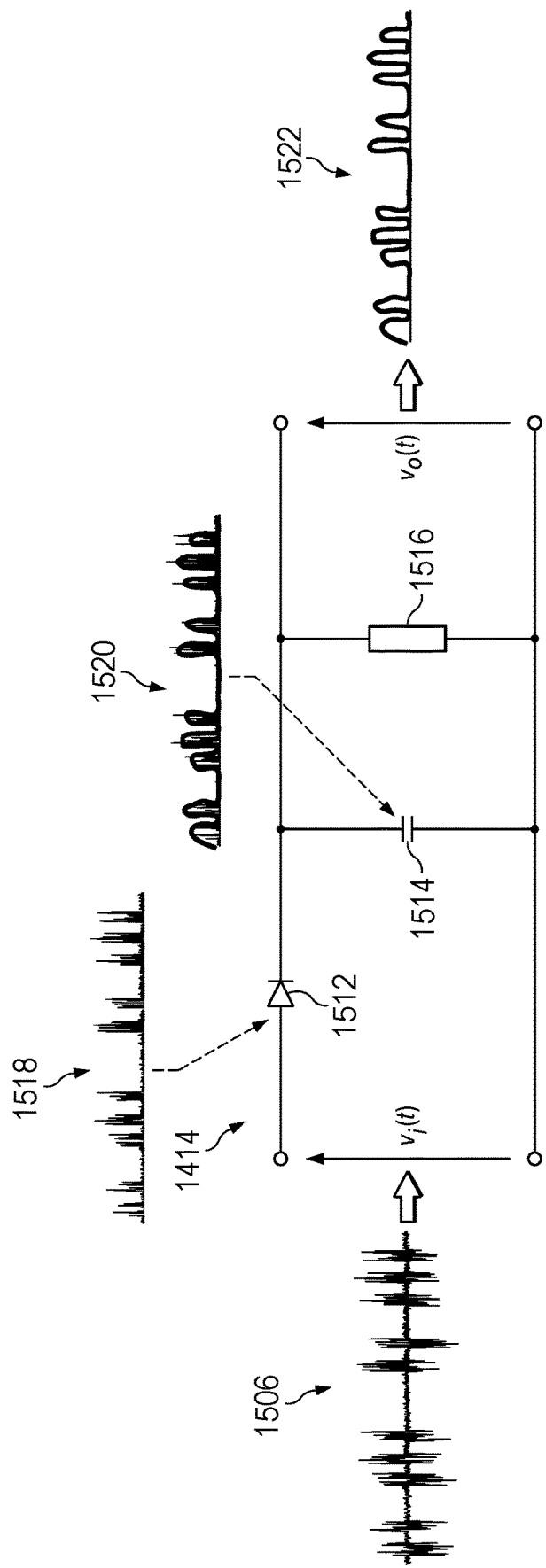

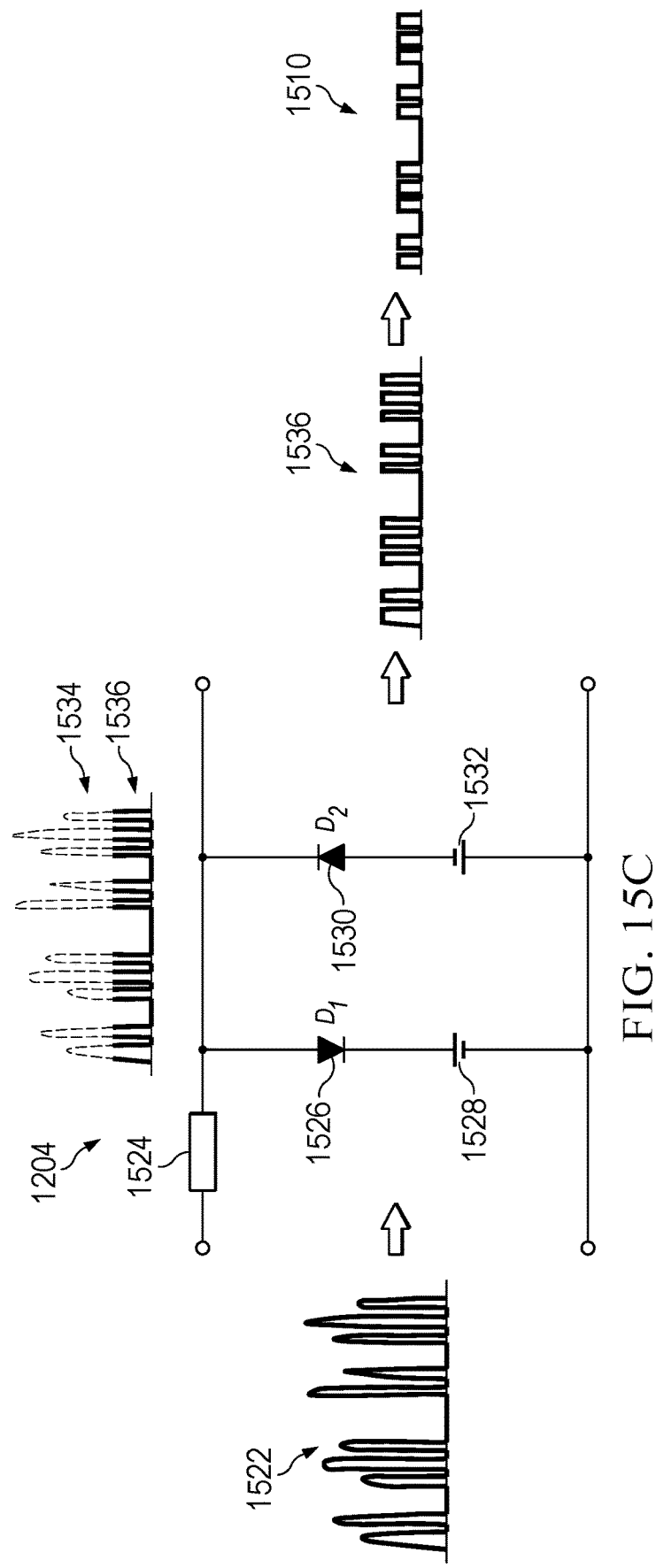

ANALOG AMPLITUDE NOISE MODULATION TO COMMUNICATE INFORMATION

CROSS-REFERENCE TO RELATED APPLICATION

This application is a Continuation-in-Part (CIP) of U.S. patent application entitled "Radio Frequency Communications Using Laser Optical Breakdowns," Ser. No. 18/067,516, filed Dec. 16, 2022, now U.S. Pat. No. 12,401,425 issued Aug. 26, 2025; and is a Continuation-in-Part of U.S. patent application entitled "Pulse Noise Modulation to Encode Data," Ser. No. 18/067,547, filed Dec. 16, 2022, now U.S. Pat. No. 12,407,420 issued Sep. 2, 2025; both of which are incorporated herein by reference in their entirety.

BACKGROUND INFORMATION

1. Field

The present disclosure relates generally to communications and in particular, to methods, apparatuses, systems, and computer program products for communicating information using radio frequency (RF), optical, and/or other signals within the electromagnetic spectrum without physical antenna structures.

2. Background

Wireless communications using radio frequency (RF) signals, optical, and/or other signals within the electromagnetic spectrum are common and widespread. Radio frequency signals are commonly used in computer networks, for example, in the form of Wi-Fi signals that provide communications links between various computing devices.

Radio frequency signals are also used for communications between various clients such as ships, aircraft, land vehicles, buildings, and other locations. These communications can include data and/or information such as position information, voice messages, voice communications, and other types of information and/or data. For example, other types of information and/or data can include digital and analog signaling.

Communications using radio frequency transmissions are facilitated using physical antennas. The transmission or reception of radio frequency signals occurs between antennas. The use of physical antennas can be less convenient or reliable than desired.

In addition, radio frequency communications can be implemented using a carrier signal or carrier wave modulated by a modulation signal, message signal, and/or information signal that modulates the carrier wave. Carrier signals use periodic waves, repeating waveforms, pseudo-random waveforms, and/or other predictable waveforms such as sinusoidal, cosinusoidal, square-waves, sawtooth, or other repeatable carriers which are then modulated in various ways by the message signal, modulation signal, and/or information signal.

Communications have been attempted using lasers, gas-filled tubes, electric arcs, high-voltage electrodes, high-voltage fields, field exciter members, and other mechanisms to create and maintain "plasma antennas" including plasma columns, plasma filaments, plasma structures, plasma channels, laser-induced plasma filaments (LIPF), arrays of focusing and defocusing cycles of plasma, and/or bounded or unbounded ionized air or water columns to emulate the shapes and/or conductance of physical antennas. These devices may be continuous wave or pulsed devices. Previous communication approaches attempt to input, impel, induce, impute, impress upon, influence, and/or modulate an RF or other signal onto the plasma or conductive plasma column with a coupling device, such as an RF coupler, an electromagnetic or capacitive coupling device, an electro-optical crystal, electro-optic modulators such as beams of light, and/or other influencing device. In effect, previous approaches attempt to treat plasma or the plasma column as a conductor or a classical physical conducting antenna, such as a monopole or dipole device. These approaches use conventional modulation of periodic, repeating, sinusoidal, and/or pseudo-random carrier waveforms, such as amplitude-, frequency-, and/or phase-modulation, to generate, induce, impel, influence, and/or control the plasma's amplitude-, frequency-, or phase-modulated electromagnetic fields that radiate from the plasma or plasma column.

Therefore, it would be desirable to have methods, systems, and apparatuses that take into account at least some of the issues discussed above, as well as other possible issues. For example, it would be desirable to have methods and apparatus that overcome a technical problem with radio frequency communications using physical antennas. It would also be desirable to have systems, methods, and apparatuses that overcome the limitations of periodic and/or predictable carriers. It would also be desirable to have systems, methods, and apparatuses that overcome the limitations of plasma antennas and coupled modulation.

SUMMARY

An embodiment of the present disclosure provides a communications system comprising a computer system and a communications manager. The communications manager is configured to identify analog information for transmission and transmit noise signals with a varying amplitude that thereby modulate the noise signals to correspond to the analog information.

Another embodiment of the present disclosure provides a method for communicating analog information. The analog information is identified for transmission. Noise signals are transmitted with a varying amplitude that thereby modulate the noise signals to correspond to the analog information.

Yet another embodiment of the present disclosure provides a method for communicating analog information. Noise signals are received, wherein the analog information that is modulated in the noise signals is demodulated based on a change in amplitude in the noise signals.

Various embodiments herein use the plasma RF noise emission itself as a carrier wave and modulate that RF noise with the message signal.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15B is an illustration of an envelope follower circuit using a diode detector with a low pass filter in accordance with an illustrative embodiment;

FIG. 15C is an illustration of a clipper circuit in accordance with an illustrative embodiment;

DETAILED DESCRIPTION

The illustrative embodiments recognize and take into account one or more different considerations as described herein. For example, currently used physical antennas for transmitting radio frequency signals are subject to damage or destruction from various causes. For example, adverse weather conditions such as a hurricane or tornado can damage or destroy antennas such as transmission towers for land-based communications. As another example, these physical antennas are also subject to damage or destruction from kinetic attacks.

In other considerations, currently used "plasma antennas" require an ionized column of air or water which is not readily relocatable or easily repositioned. Plasma antennas also require a coupling mechanism to modulate the ionized plasma column as if it were a traditional conductive antenna. Plasma antennas also must use traditional modulation techniques of sinusoidal, pseudorandom, and/or other repeating carrier signals which may be easily detected and decoded.

Thus, the illustrative embodiments provide a method, apparatus, system, and computer program product for transmitting radio frequency signals without hardware such as transmission towers and physical antenna structures. In one or more illustrative examples we provide a non-physical radio frequency antenna that is impervious to adverse environmental conditions and kinetic attack. These illustrative embodiments provide a method, apparatus, system, and computer program product for transmitting radio frequency signals without plasma antennas and/or ionized columns of air or water, without coupling mechanisms, and without the need for periodic, repeating, sinusoidal, and/or pseudorandom carrier waves with classical modulation schemes based on these periodic, repeating, sinusoidal, and/or pseudorandom carrier waves. Further, these non-physical radio frequency antennas can be more difficult to detect.

These transmitters can be positioned away from airplanes, transport, installations, buildings, or other locations that are subject to attack or undesired environmental conditions.

In the illustrative examples, radio frequency transmissions are transmitted by using laser beams that induce, cause, and/or control optical breakdowns to generate and control the radio frequency transmissions. In this illustrative example, the optical breakdowns create plasma that generates the radio frequency signals including radio frequency noise. These optical breakdown points where the optical breakdowns occur are the points of origination for transmitting the radio frequency signals and/or radio frequency noise. These optical breakdown points also may be used for transmission in the range of light frequencies, either visible and/or non-visible light.

Figure 1A:
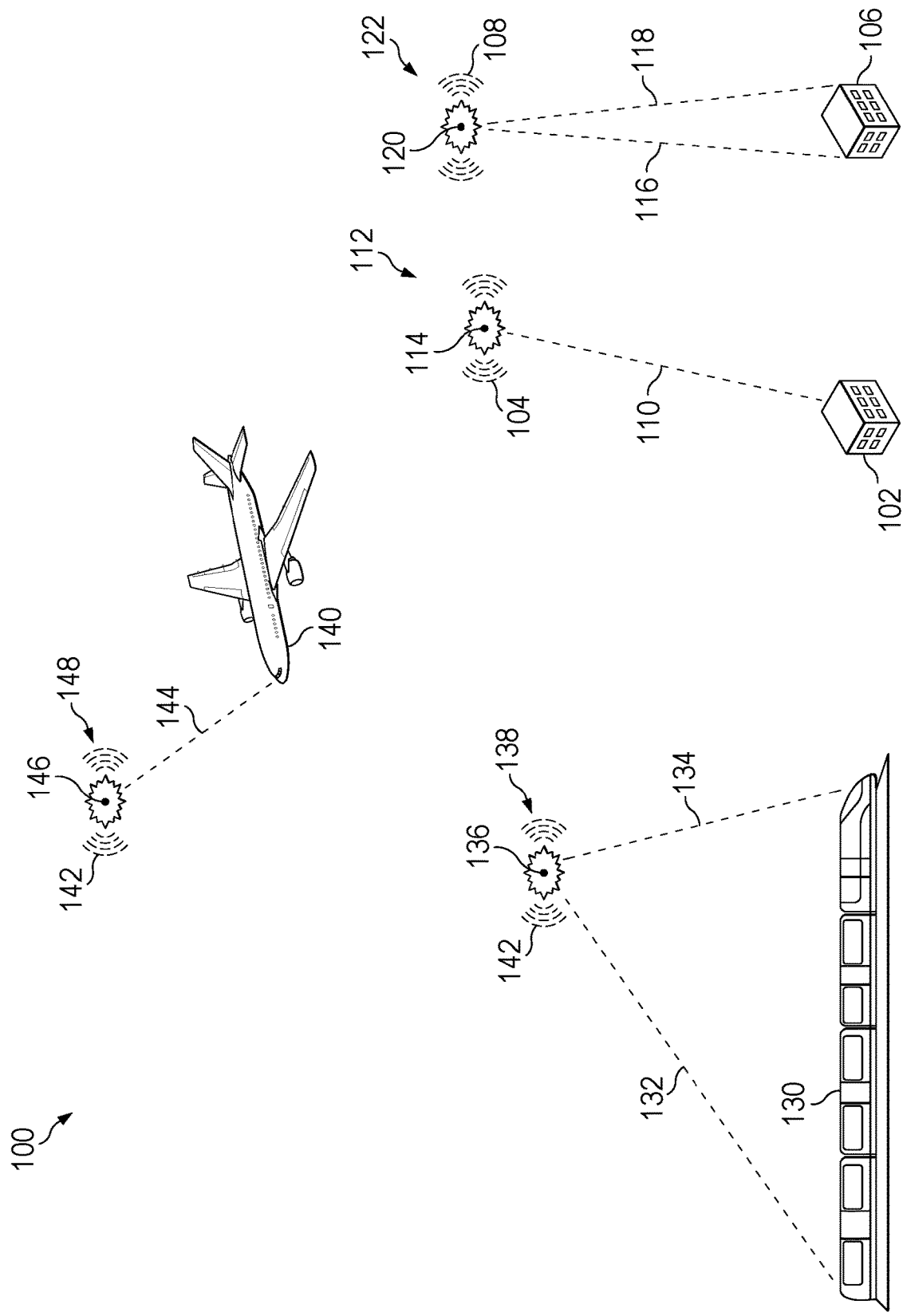
FIG. 1A is a pictorial representation of platforms that can transmit radio frequency signals using non-physical antennas in which illustrative embodiments may be implemented.

With reference now to the figures and, in particular, with reference to FIG. 1A, a pictorial representation of platforms that can transmit radio frequency signals using non-physical antennas is depicted in which illustrative embodiments may be implemented. As depicted, radio frequency signals can be transmitted from various platforms as depicted in this figure.

As depicted, ground station 102 can transmit radio frequency signals 104 without using a physical antenna. In a similar fashion, ground station 106 can also transmit radio frequency signals 108 without using a physical antenna.

In this example, laser beams are used by these ground stations to transmit the radio frequency signals. For example, ground station 102 emits laser beam 110 in a manner that causes optical breakdown 112 at optical breakdown point 114. Radio frequency signals 104 are generated at and transmitted from optical breakdown point 114.

In this example, ground station 106 emits laser beam 116 and laser beam 118 at optical breakdown point 120 to cause optical breakdown 122. In this example, two laser beams are used to cause optical breakdown 122 that results in transmission of radio frequency signals 108.

This type of transmission can be used from other platforms such as train 130. In this example, train 130 emits laser beam 132 and laser beam 134 from different locations on train 130 at optical breakdown point 136. The intersection of these two laser beams at optical breakdown point 136 causes optical breakdown 138. As a result, radio frequency signals 142 are transmitted in response to optical breakdown 138 at optical breakdown point 136.

As another example, airplane 140 transmits radio frequency signals 142 using laser beam 144. As depicted, laser beam 144 is emitted from airplane 140 at optical breakdown point 146. Optical breakdown 148 occurs at optical breakdown point 146 which results in the transmission of radio frequency signals 142.

Figure 1B:
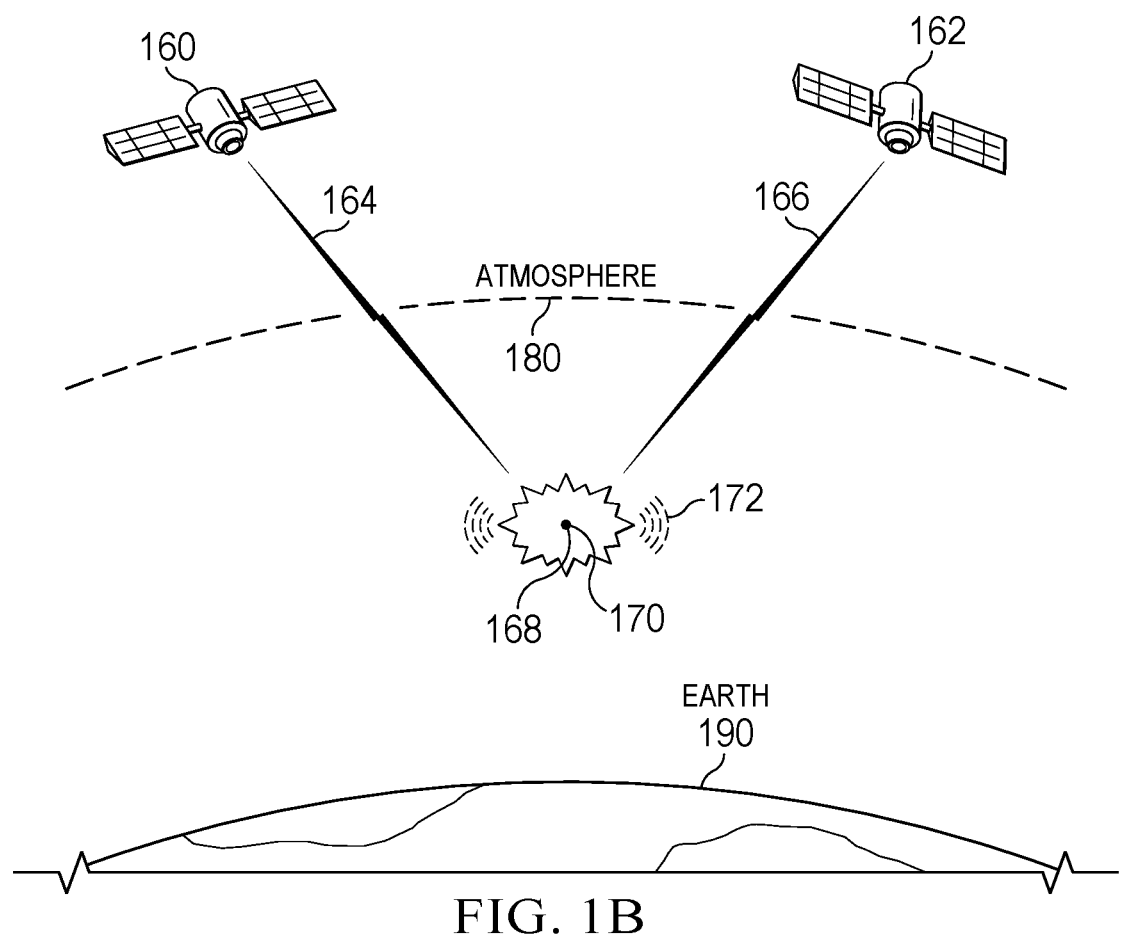
FIG. 1B is a pictorial representation of platforms that can transmit radio frequency signals using non-physical antennas from space in which illustrative embodiments may be implemented.

Turning now to FIG. 1B, a pictorial representation of platforms that can transmit radio frequency signals using non-physical antennas from space in which illustrative embodiments may be implemented. As another example, in FIG. 1B, satellite 160 emits laser 164 from space into the atmosphere 180 above earth 190 while satellite 162 emits laser 166 from space into the atmosphere 180 such that laser 164 and laser 166 intersect at optical breakdown point 168 causing optical breakdown 170 which results in radio frequency signals 172 originating and emanating from optical breakdown point 168.

Figure 1C:
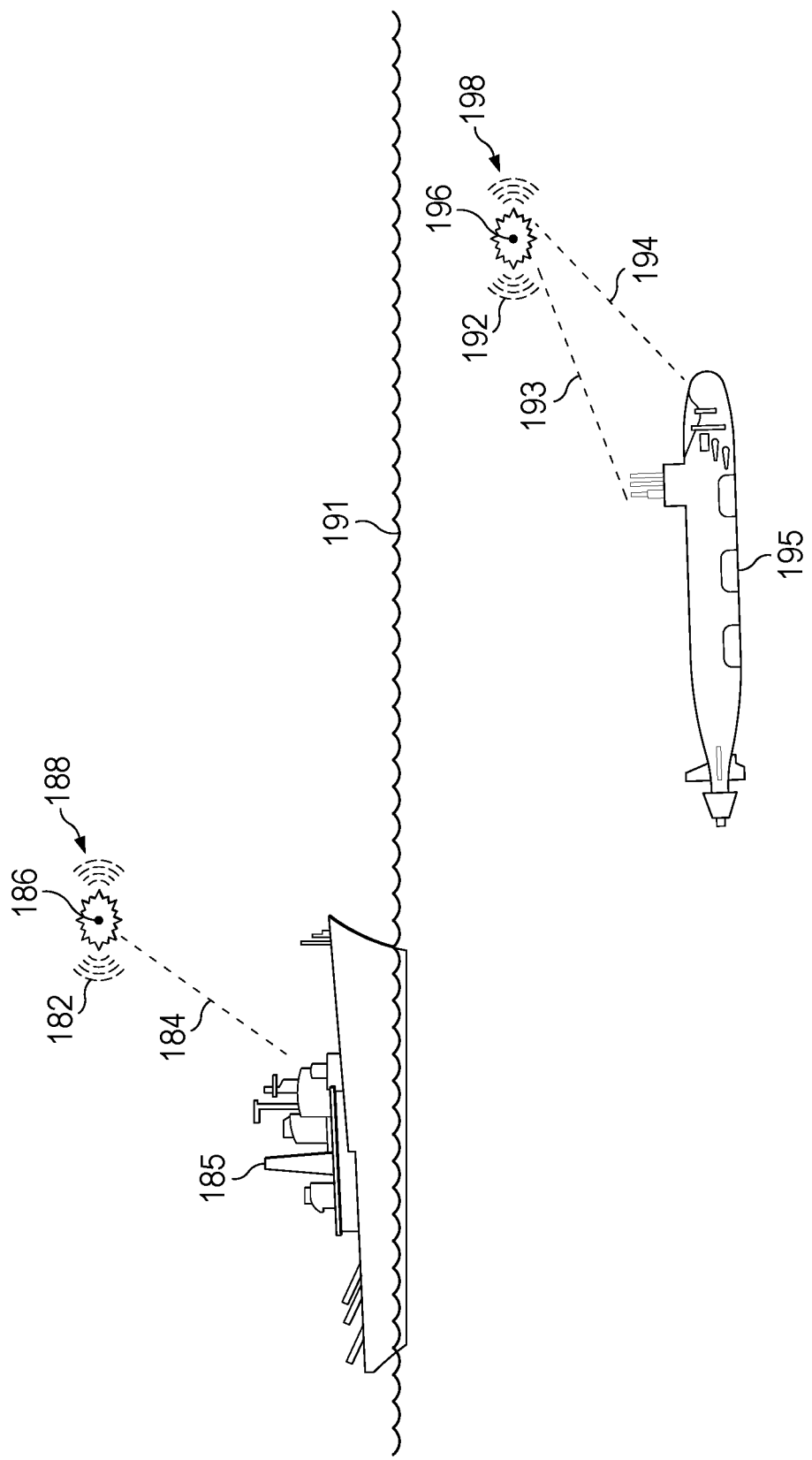
FIG. 1C is a pictorial representation of platforms that can transmit radio frequency signals using non-physical antennas on, in, or under water in which illustrative embodiments may be implemented.

Turning now to FIG. 1C, a pictorial representation of platforms that can transmit radio frequency signals using non-physical antennas on, in, or under water 191 in which illustrative embodiments may be implemented. In this example, ship 185 emits laser beam 184 from ship 185 in a manner that causes and controls optical breakdown 188 at optical breakdown point 186. As a result, radio frequency signals 182 as well as light emissions are transmitted in response to optical breakdown 188 at optical breakdown point 186.

As another example, submarine 195 emits laser beam 193 and laser beam 194 from different locations on submarine 195. The intersection of these two laser beams at optical breakdown point 196 causes optical breakdown 198 which results in the transmission of radio frequency signals 192 as well as underwater light emissions, including visible and non-visible light frequencies.

As depicted, these radio frequency signals are generated without using physical antennas to transmit signals. Further, these radio frequency signals are transmitted at locations away from the platforms. As a result, identifying the platforms generating these radio frequency signals can be more difficult because antennas for transmitting the radio frequency signals are not visible. Further, tracking the location of where the radio frequency signals are generated does not provide identification of the platform or the platform location, nor the location of the communications system, computer system, communications manager, or the laser origination points in these examples.

The locations of these optical breakdowns are considered radio frequency source emitters that can be in remote locations from the platforms emitting the laser beams. As a result, identifying the locations of the platforms becomes more difficult with the absence of physical antennas. Note that these optical breakdowns are distinguished from "plasma antennas" or ionized air or water columns.

Illustration of the different platforms in radio frequency communications environment 100 are only provided as examples of platforms that can implement this type of radio frequency signal transmission. In other illustrative examples, other platforms in addition to or in place of these platforms can be used. For example, this type of radio frequency generation can be implemented in a surface ship, a car or truck, a cruise missile, an aerial vehicle, a tank, a submersible sensor, or some other suitable type of platform in other illustrative examples.

Figure 2:
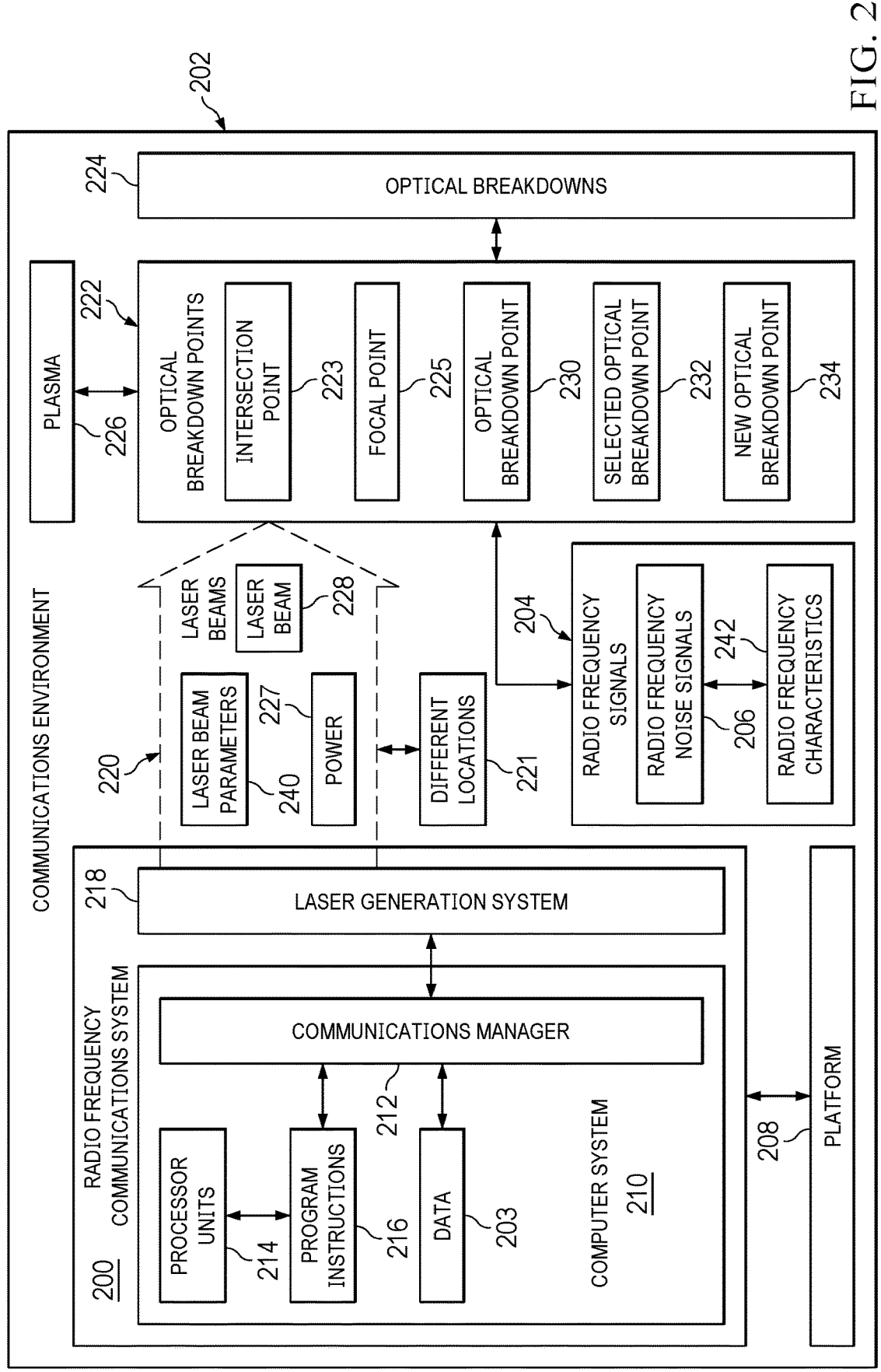
FIG. 2 is an illustration of a block diagram of a radio frequency communications environment in accordance with an illustrative embodiment.

With reference now to FIG. 2, an illustration of a block diagram of a radio frequency communications environment is depicted in accordance with an illustrative embodiment. In this illustrative example, radio frequency communications system 200 in communications environment 202 can communicate data 203 by using radio frequency signals 204 in the form of radio frequency noise signals 206.

Data 203 can take a number of different forms. For example, data 203 can be a document, a spreadsheet, sensor data, an image, a video, and email message, a text message, a webpage, a table, a data structure, serial data, commands, or other types of data that is to be transmitted or communicated. Data can also be analog or digital information and/or data. Analog and digital information and/or data can include, for example, music and audio.

In one illustrative example, a noise signal is a signal with irregular fluctuations that are or appear to be at least one of random, non-predictable, or non-deterministic.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data.

In this example, radio frequency noise signals 206 are electromagnetic noise signals that can have a frequency from around 20 kHz to above the Terahertz range. Radio frequency noise signals can include signals with frequencies such as extremely low frequency (ELF), high frequency (HF), and other types of frequencies. These noise signals can also include microwave noise signals and Terahertz noise signals. Electromagnetic noise signals can also be optical noise in the visible range, infrared, ultraviolet X-rays and other types of noise signals that can be used as modulated noise. For example, lasers used at optical breakdown also may transmit as various ranges of noisy light in addition to noisy broadband radio frequencies. Modulating this noisy light with different techniques such as pulse noise modulation is included in this disclosure.

In this illustrative example, radio frequency communications system 200 is associated with platform 208. Platform 208 is an object that can transmit radio frequency noise signals 206 using radio frequency communications system 200.

Platform 208 can take a number of different forms. For example, platform 208 can be one of a mobile platform, a stationary platform, a land-based structure, an aquatic-based structure, and a space-based structure. More specifically, the platform can be a surface ship, a tank, a personnel carrier, a train, an airplane, a commercial airplane, a spacecraft, a space station, a satellite, a submarine, an automobile, a ground station, a power plant, a bridge, a dam, a house, a manufacturing facility, a building, and other suitable platforms.

In this illustrative example, radio frequency communications system 200 comprises computer system 210 and communications manager 212. In this example, communications manager 212 is located in computer system 210.

As used herein, "a number of" when used with reference to items, means one or more items. For example, "a number of different forms" is one or more different forms.

Communications manager 212 can be implemented in software, hardware, firmware or a combination thereof. When software is used, the operations performed by communications manager 212 can be implemented in program instructions configured to run on hardware, such as a processor unit. When firmware is used, the operations performed by communications manager 212 can be implemented in program instructions and data and stored in persistent memory to run on a processor unit.

When hardware is employed, the hardware may include circuits that operate to perform the operations in communications manager 212. The circuits used to implement communications manager 212 can take other forms in addition to or in place of a processor unit.

In the illustrative examples, the hardware used to implement communications manager 212 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform a number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, computer system 210 includes a number of processor units 214 that are capable of executing program instructions 216 implementing processes in the illustrative examples. In other words, program instructions 216 are computer-readable program instructions.

As used herein, a processor unit in the number of processor units 214 is a hardware device and is comprised of hardware circuits such as those on an integrated circuit that respond and process instructions and program code that operate a computer. When the number of processor units 214 executes program instructions 216 for a process, the number of processor units 214 can be one or more processor units that are on the same computer or on different computers. In other words, the process can be distributed between processor units 214 on the same or different computers in a computer system 210.

Further, the number of processor units 214 can be of the same type or different type of processor units. For example, a number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

As depicted, radio frequency communications system 200 can also include laser generation system 218. In other examples, laser generation system 218 can be considered a separate component controlled by radio frequency communications system 200.

In this example, laser generation system 218 is a hardware system that can emit a set of laser beams 220. The operation of laser generation system 218 can be controlled by communications manager 212.

In this example, the set of laser beams 220 can be emitted from different locations 221. For example, laser generation system 218 can be comprised of laser units that are positioned in different locations. Each location can have one or more laser units for laser generation system 218 in this illustrative example.

Communications manager 212 can identify data 203 for transmission using radio frequency noise signals 206. Communications manager 212 controls an emission of a set of laser beams 220. In this example, communications manager 212 directs or steers the set of laser beams 220 at a set of optical breakdown points 222. In this example, the set of optical breakdown points 222 can be selected from at least one of intersection point 223 or focal point 225.

As used herein, "a set of" when used with reference to items, means one or more items. For example, "a set of optical breakdown points 222" is one or more of optical breakdown points 222. In another example, a "set of laser beams" means one or more laser beams.

In this example, intersection point 223 can be a location where two or more laser beams intersect. This location can be where an optical breakdown occurs from the intersection of two or more laser beams when the power 227 of two or more intersecting laser beams is sufficient to cause an optical breakdown. Focal point 225 can be a location where the laser beam is focused to cause an optical breakdown to occur at that location.

This emission of the set of laser beams 220 is controlled by communications manager 212 to cause optical breakdowns 224 at the set of optical breakdown points 222 that generate radio frequency noise signals 206 encoding data 203. In this illustrative example, plasma 226 occurs at optical breakdown points 222 in response to optical breakdowns 224 by the set of laser beams 220. This plasma generated by optical breakdowns 224 causes radio frequency noise signals 206 to be transmitted at the set of optical breakdown points 222.

In this example, power 227 of laser beam 228 in the set of laser beams 220 at optical breakdown point 230 in the set of optical breakdown points 222 can be controlled using different mechanisms. For example, power 227 can be controlled by at least one of a shutter, a lens, a deformable lens, a microelectromechanical systems mirror, an attenuator, a controlling optics, an optical filter, an amplitude modulator in a laser beam generator, or other device.

In this illustrative example, communications manager 212 can control the emission of the set of laser beams 220 by laser generation system 218 in a number of different ways. For example, communications manager 212 can control laser generation system 218 to emit a first number of the set of laser beams 220 continuously at the set of optical breakdown points 222. Communications manager 212 can control laser generation system 218 to pulse a second number of the set of laser beams 220 at the set of optical breakdown points 222 to cause optical breakdowns 224 that generate radio frequency noise signals 206 encoding data 203. The laser beam can be pulsed by turning the laser beam on and off. In another example, a laser beam can be pulsed by varying the power of the laser beam. In other words, the power can be pulsed by increasing and decreasing the power of the laser beam.

In another illustrative example, communications manager 212 can control laser generation system 218 to emit the set of laser beams 220 at the set of optical breakdown points 222 causing optical breakdowns 224 that generate radio frequency noise signals 206 encoding data 203.

In this example, the emission of the set of laser beams 220 can be performed in a number of different ways. The set of laser beams can be emitted as at least one of as pulsed or continuous. For example, one laser beam can be continuous while another laser beam is pulsed. Further, the laser beams can be originated from different directions at the set of optical breakdown points 222.

The direction at which a laser beam is emitted can move or sweep back such that an optical breakdown point is included during the movement of the laser beam. In other words, during the sweeping of the laser beam the laser beam can intersect with another laser beam. The intersection of this laser beam with another laser beam emitted the optical breakdown point can cause the optical breakdown at that optical breakdown point.

In another illustrative example, communications manager 212 can control laser generation system 218 to emit the set of laser beams 220 at selected optical breakdown point 232 in the set of optical breakdown points 222. Communications manager 212 can select new optical breakdown point 234 in the set of optical breakdown points as the selected optical breakdown point. Communications manager 212 can repeat emitting the set of laser beams 220 and selecting the new optical breakdown point while generating radio frequency noise signals 206 encoding data 203.

In yet another illustrative example, communications manager 212 can control laser generation system 218 to emit the set of laser beams 220 from different locations 221 at optical breakdown point 230. In this example, a portion of the set of laser beams 220 intersect at optical breakdown point 230 such that power 227 from the portion of the set of laser beams 220 is sufficient to cause optical breakdowns 224 at intersection point 223 that generate radio frequency noise signals 206 encoding data 203.

As another example, communications manager 212 can control laser generation system 218 to emit the set of laser beams 220 at optical breakdown point 230. In this example, optical breakdowns 224 occur in response to all of the set of laser beams 220 intersecting at optical breakdown point 230.

In controlling the emission of the set of laser beams 220, communication manager 212 can change a set of laser beam parameters 240 for the set of laser beams 220 to encode data 203 into radio frequency noise signals 206 or visible and/or non-visible light. Laser beam parameters 240 include but are not limited to pulse durations, pulse repetition rate, beam diameter, beam profile (temporal and spatial), optical focal length, pulse shape, power, frequency, wavelength, directivity, gain, efficiency, and physical properties of propagation media such as index of refraction. In this example, changing the set of laser beam parameters 240 changes a set of radio frequency characteristics 242 for radio frequency noise signals 206 or visible and/or non-visible light. The set radio frequency characteristics 242 for radio frequency noise signals 206 can be selected from at least one of a timing, an optical breakdown point, an amplitude of the radio frequency noise signals, a frequency band, a relative phase, or other characteristics for radio frequency noise signals 206.

In yet another illustrative example, communications manager 212 can control laser generation system 218 to emit a subset of the set of laser beams 220 at the set of optical breakdown points 222 to cause the optical breakdowns 224 that generates radio frequency noise signals 206 encoding data 203. Communications manager 212 can select a new subset of the set of laser beams 220 as the subset of laser beams 220.

Communications manager 212 can repeat emitting of the subset of the set of laser beams 220 and selecting the new subset of the set of laser beams 220 while transmitting radio frequency noise signals 206 encoding the data 203.

Thus, one or more illustrative examples enable transmitting radio frequency noise signals using radio frequency source emitters that do not require physical structures. As a result, one or more illustrative examples can overcome an issue with the vulnerability present in using physical source emitters such as antennas. In the illustrative examples, the optical breakdown points for the optical breakdowns are radio frequency source emitters.

Further, these radio frequency source emitters can be moved almost instantaneously to different locations by repositioning the laser beams such that the laser beams point at different optical breakdown points. Attacks at these radio frequency source locations are attacks at the optical breakdown points where the plasma is generated. As a result, kinetic attacks against these locations are useless because the laser modulation sources are remote from the locations of these radio frequency source emitters.

The illustration of communications environment 202 to in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 212 is shown as being implemented using program instructions 216 run on a number of processor units 214 in computer system 210, communications manager 212 can be implemented in other hardware instead of or in addition to the number of processor units 214. For example, computer system 210 may use other hardware in addition to or in place of the number of processor units 214.

For example, other types of hardware circuits capable of performing the operations for communications manager 212 can be used. This other hardware can be at least one of a circuit system, an integrated circuit, an application-specific integrated circuit (ASIC), a programmable logic device, or some other suitable type of hardware configured to perform a number of operations.

Figure 3:
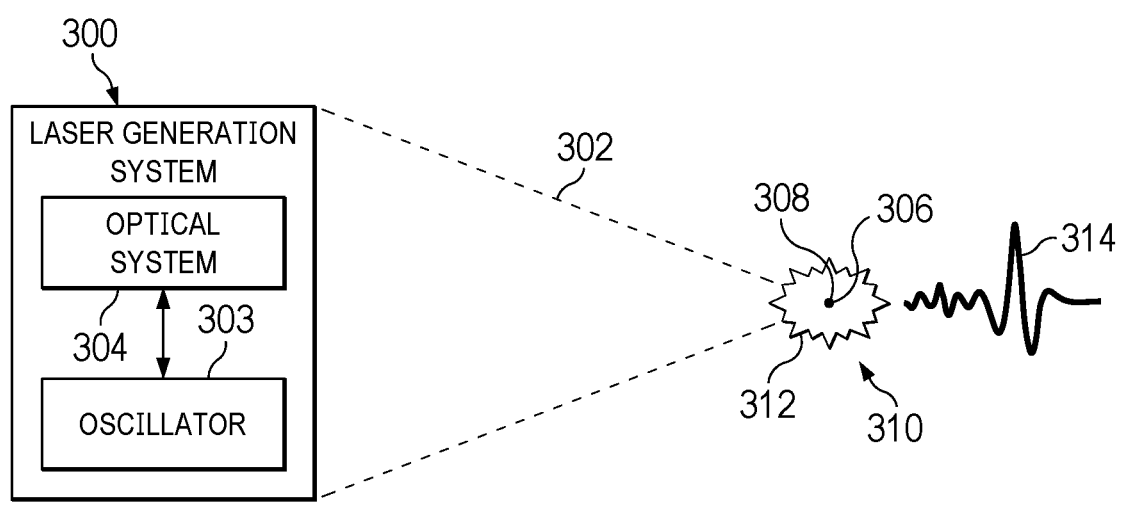
FIG. 3 is an illustration of radio frequency noise generation using a laser beam in accordance with an illustrative embodiment.

Turning next to FIG. 3, an illustration of radio frequency noise generation using a laser beam is depicted in accordance with an illustrative embodiment. This depicted example in FIG. 3 illustrates how a single laser beam can be used to generate radio frequency signals.

In this illustrative example, laser generation system 300 is an example of laser generation system 218 in FIG. 2. Laser generation system 300 emits laser beam 302.

As depicted, laser generation system 300 comprises a number of different components. In this example, laser generation system 300 includes oscillator 303 and optical system 304.

Oscillator 303 generates coherent light for emitting laser beam 302. In this example, optical system 304 can focus laser beam 302. Optical system 304 includes at least one of a lens, a mirror, or other optical element that can change the focus of laser beam 302.

In this example, the focus of laser beam 302 is controlled such that the power at focal point 306 is an optical breakdown point 308 where optical breakdown 310 occurs. As depicted in this example, optical breakdown 310 results in the generation of plasma 312. Plasma 312 resulting from optical breakdown 310 causes the generation of radio frequency noise signal 314. Thus, this example illustrates how a single laser beam can be used to generate radio frequency signals.

Figure 4:
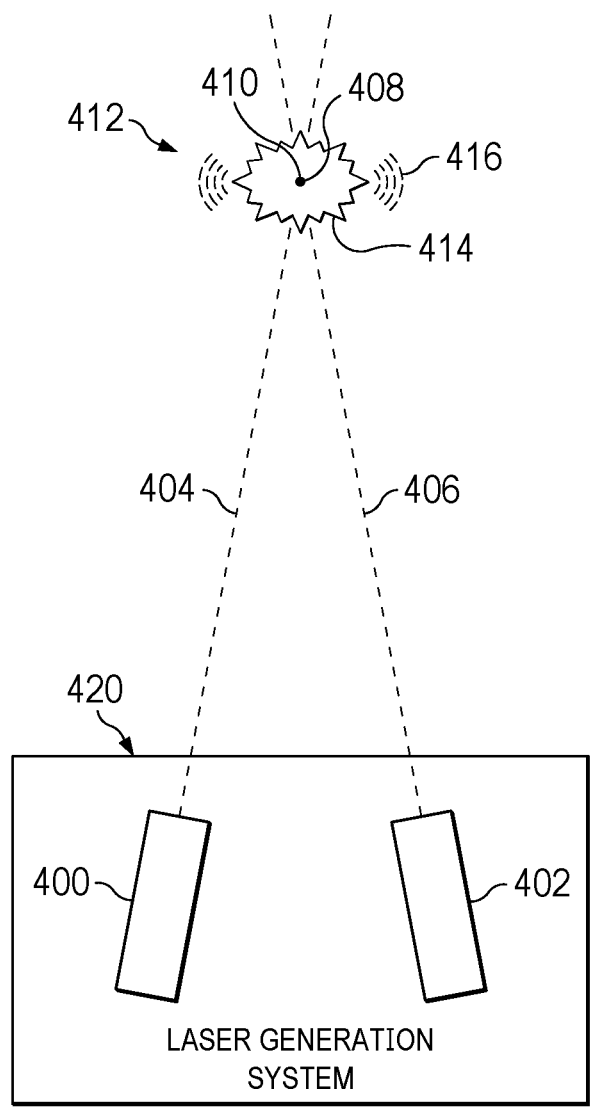
FIG. 4 is an illustration of radio frequency noise generation using a plurality of laser beams in accordance with an illustrative embodiment.

Turning next to FIG. 4, an illustration of radio frequency noise generation using a plurality of laser beams is depicted in accordance with an illustrative embodiment. In this illustrative example, laser generation system 420 comprises laser unit 400 and laser unit 402. Laser generation system 420 is an example of an implementation for laser generation system 218 in FIG. 2.

In this illustrative example, laser unit 400 generates first laser beam 404. Laser unit 402 generates second laser beam 406.

In this example, first laser beam 404 and second laser beam 406 are emitted in directions from these laser beam units to intersect at optical breakdown point 408. These two laser beams are emitted along different paths that intersect at optical breakdown point 408. This optical breakdown point where the two laser beams intersect each other is intersection point 410.

In this example, the intersection of first laser beam 404 and second laser beam 406 results in optical breakdown 412. This optical breakdown generates plasma 414. As depicted in this example, optical breakdown 412 results in radio frequency noise signals 416.

As depicted in the example, optical breakdown 412 occurs where first laser beam 404 and second laser beam 406 intersect at intersection point 410. In this example, the power for first laser beam 404 and second laser beam 406 individually is not sufficient to cause an optical breakdown.

The illustration of the two laser units for laser generation system 420 in FIG. 4 is provided as an example of one implementation for generating radio frequency noise signals. This illustration is not meant to limit the manner in which other illustrative examples can be implemented. In another example, one or more laser units in addition to laser unit 400 and laser unit 402 can be used to generate additional laser beams. The laser beams can also intersect at intersection point 410 to cause optical breakdown 412.

Figure 5:
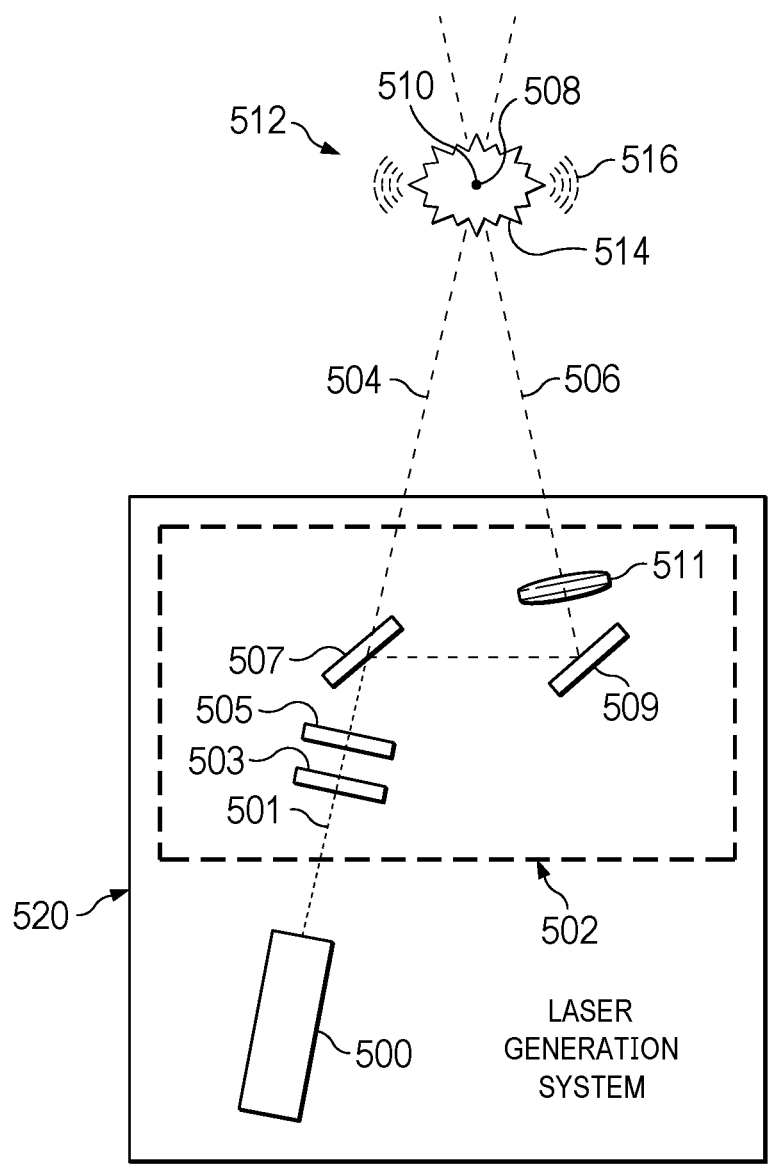
FIG. 5 is an illustration of radio frequency noise generation using a plurality of laser beams in accordance with an illustrative embodiment.

Turning next to FIG. 5, an illustration of radio frequency noise generation using a plurality of laser beams is depicted in accordance with an illustrative embodiment. In this illustrative example, laser generation system 520 comprises laser unit 500 and optical system 502. Laser generation system 520 is an example of an implementation for laser generation system 218 in FIG. 2.

In this example, laser unit 500 emits first laser beam 504 and second laser beam 506. In this example, laser unit 500 generates initial laser beam 501 that is split into two laser beams, first laser beam 504 and second laser beam 506 by optical system 502.

As depicted, optical system 502 comprises a number of different components. In this depicted example, optical system 502 comprises shutter 503, variable attenuator 505, beam splitter 507, mirror 509, and lens 511.

The components depicted are example components that can be used in optical system 502 and can change in other illustrative examples. For example, one or more of lens 511, variable attenuator 505, and shutter 503 may be omitted in other illustrative examples. In yet other illustrative examples, other components may be added such as a lens located before beam splitter 507.

As depicted, initial laser beam 501 is split into two laser beams by beam splitter 507. Mirror 509 can be used to direct second laser beam 506 in different directions. Further, mirror 509 can be used to provide focus to increase the power of second laser beam 506 at a focal point such as optical breakdown point 508. Lens 511 also can be used to provide focus to increase the power of second laser beam 506 at optical breakdown point 508.

In this example, first laser beam 504 and second laser beam 506 are emitted in directions to intersect at optical breakdown point 508, which is intersection point 510 in this example. Optical breakdown 512 occurs at this intersection of first laser beam 504 and second laser beam 506, generating plasma 514 that results in the generation of radio frequency noise signals 516.

In this example, the power of first laser beam 504 and second laser beam 506 are sufficient to cause optical breakdown 512 at the intersection of the laser beams. Optical breakdowns do not occur in other locations where these laser beams do not intersect each other in this example.

Figure 6:
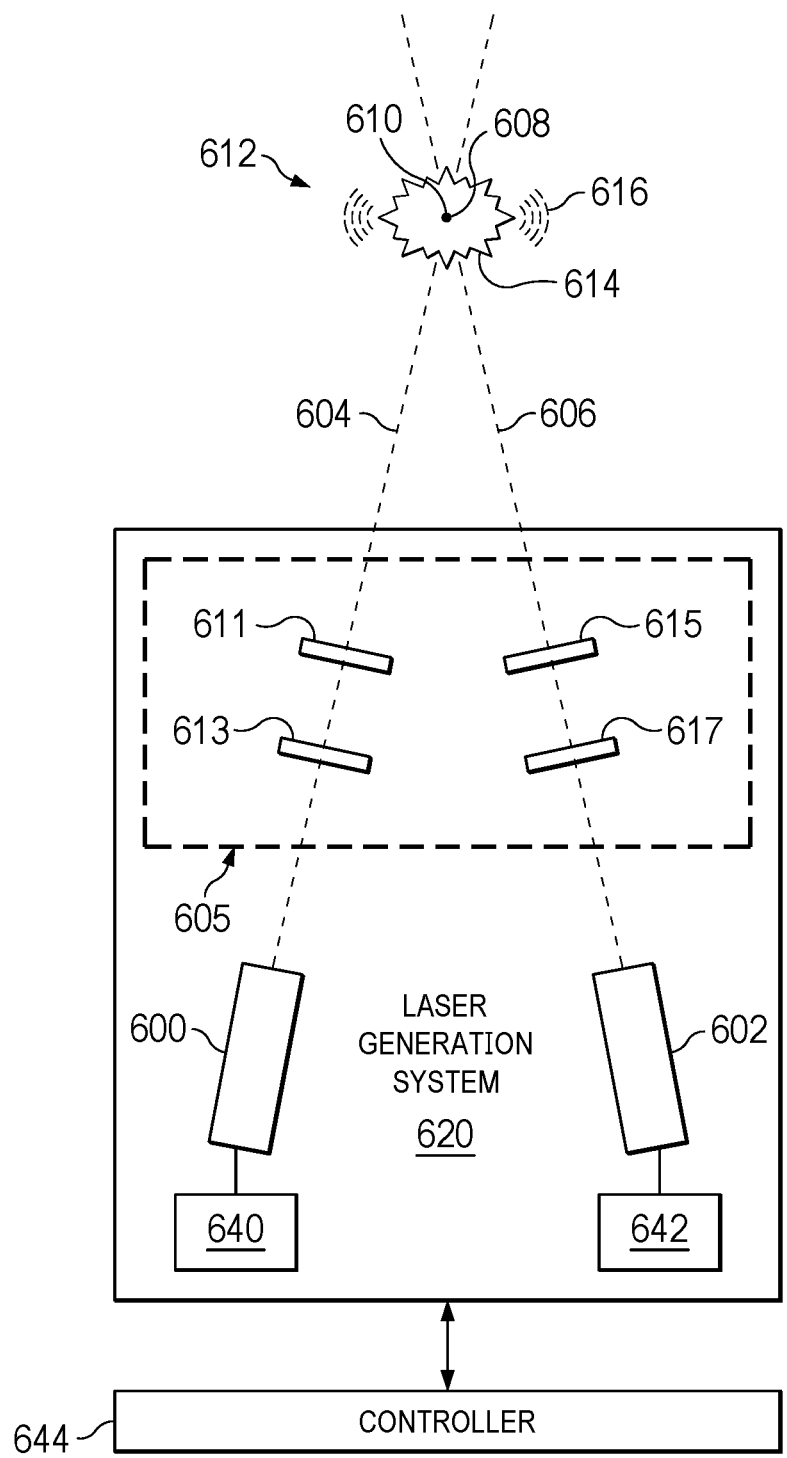
FIG. 6 is an illustration of a diagram for controlling radio frequency noise generation in accordance with an illustrative embodiment.

With reference now to FIG. 6, an illustration of a diagram for controlling radio frequency noise generation is depicted in accordance with an illustrative embodiment. In this illustrative example, the operation of laser generation system 620 is controlled by controller 644. As depicted, laser generation system comprises laser unit 600, laser unit 602, first power source 640, second power source 642, and optical system 605. In this example, controller 644 can control the operation of laser generation system 620.

In this example, laser generation system 620 is an example of an implementation for laser generation system 218 in FIG. 2. Controller 644 is an example a component that can be implemented in communications manager 212 in FIG. 2.

In this illustrative example, controller 644 can control the emission of first laser beam 604 and second laser beam 606 from laser generation system 620. In this illustrative example, laser unit 600 generates first laser beam 604 using power supplied by first power source 640. Laser unit 602 generates second laser beam 606 using power supplied by second power source 642.

In this example, first laser beam 604 and second laser beam 606 are emitted in directions that have paths that intersect at optical breakdown point 608, which is intersection point 610. Optical breakdown 612 occurs at this intersection of first laser beam 604 and second laser beam 606, generating plasma 614 that results in the transmission of radio frequency noise signals 616.

In this example, controller 644 can control the emission of these laser beams such that at least one of first laser beam 604 or second laser beam 606 is pulsed. This pulsing can include at least one of turning a laser beam on and off for increasing and decreasing the power of the laser beam. This pulsing of one or both of first laser beam 604 and second laser beam 606 can be controlled to control the timing of radio frequency noise generation.

When pulsed, optical breakdown 612 occurs when both laser beams intersect at intersection point 610. When one laser beam is turned off, and intersection is not present between both laser beams and optical breakdown 612 does not occur. By controlling the timing of when first laser beam 604 and second laser beam 606 intersect at intersection point 610, controller 644 can control the generation of radio frequency noise signals in a manner that encodes information and/or data.

For example, data can be encoded in radio frequency noise signals based on the timing of when radio frequency noise signals are generated. As another example, the timing of the laser beams can be used to control the duration of radio frequency noise signals. This duration can also be used to encode data into the radio frequency noise signals.

In this illustrative example, controller 644 can control whether a laser unit emits a continuous laser beam or a pulsed laser beam using components such as first power source 640 and second power source 642. These power sources can be turned on and off to turn the laser beams on and off. With this pulsing, optical breakdowns occur when both laser beams are on and intersect at intersection point 610.

In this example, the pulsing can also include increasing and decreasing the power in one or both of first laser beam 604 and second laser beam 606. In this example, decreasing the power of one or both laser beams can prevent the occurrence of an optical breakdown because of insufficient power being present when first laser beam 604 and second laser beam 606 intersect at intersection point 610. Optical breakdown 612 occurs when the power present from both laser beams intersecting at intersection point 610 is high enough for an optical breakdown.

As another example, the pulsing of the laser beams can also be controlled using optical elements in optical system 605. These optical elements can be controlled by controller 644 to pulse one or more of first laser beam 604 and second laser beam 606.

For example, variable attenuator 611 and shutter 613 can be operated to pulse first laser beam 604. For example, shutter 613 can be used to selectively emit first laser beam 604. Variable attenuator 611 can be used to change the power of first laser beam 604. In similar fashion, the emission of second laser beam 606 can also be pulsed using variable attenuator 615 and shutter 617.

Thus, the emission of first laser beam 604 and second laser beam 606 from laser generation system 620 can be controlled by controller 644 such that both laser beams are continuous, one laser beam is continuous while the other laser beam is pulsed, or both laser beams are pulsed. This control can be performed to achieve optical breakdowns to transmit radio frequency noise signals in a manner that encodes data into the radio frequency signals.

The illustration of laser generation system 620 is an example of one implementation and is not meant to limit the manner in which other illustrative examples can be implemented. For example, in other illustrative examples one or more laser units can be present in addition to laser unit 600 and laser unit 602.

Figure 7:
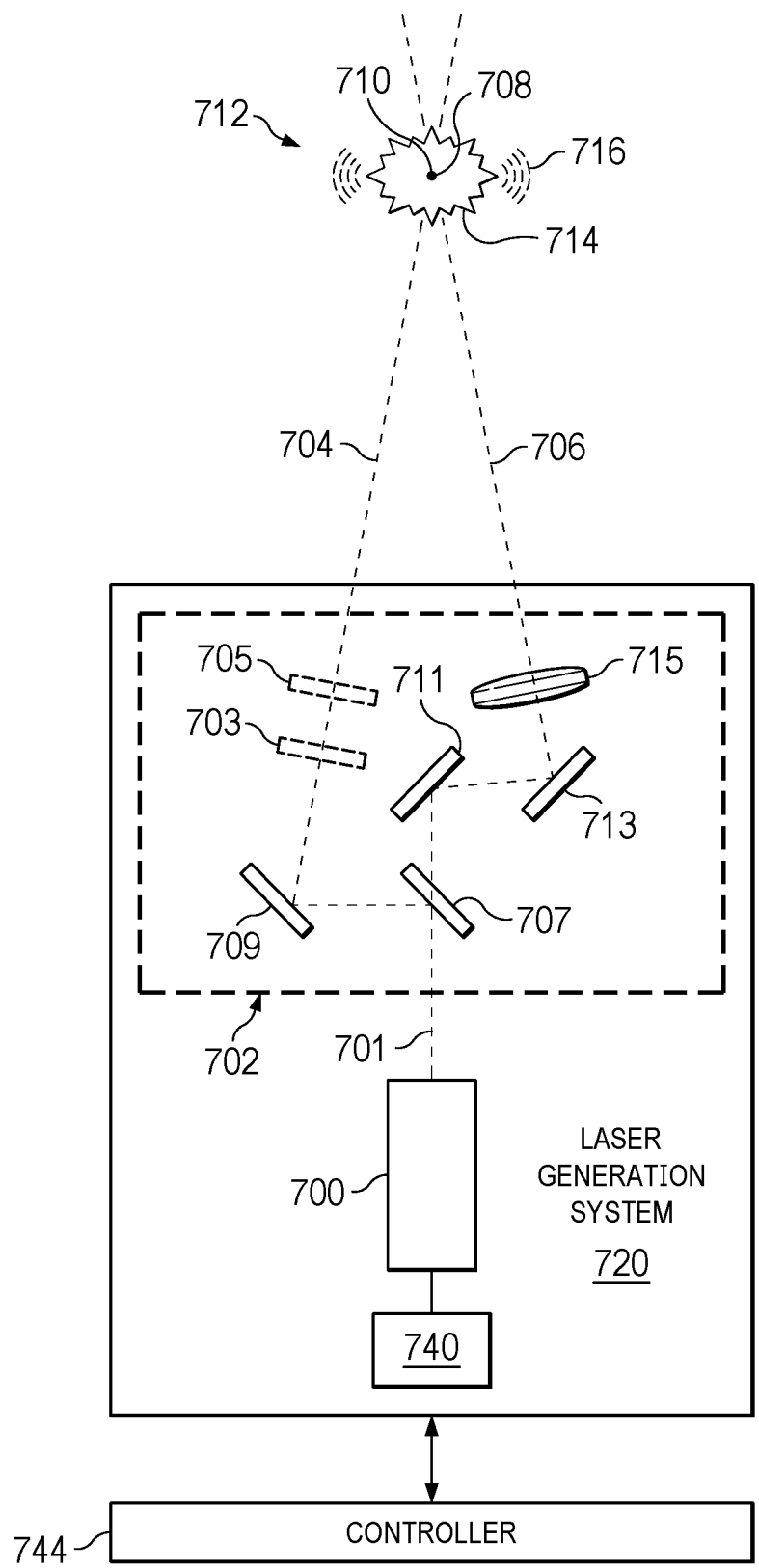
FIG. 7 is an illustration of a diagram for controlling radio frequency noise generation in accordance with an illustrative embodiment.

With reference next to FIG. 7, an illustration of a diagram for controlling radio frequency noise generation is depicted in accordance with an illustrative embodiment. In this illustrative example, laser generation system 720 is controlled by controller 744. As depicted, laser generation system 720 comprises laser unit 700, power source 740, and optical system 702.

Laser generation system 720 is an example of an implementation for laser generation system 218 in FIG. 2. Controller 744 is an example of the components that can be implemented in communications manager 212 in FIG. 2.

In this illustrative example, controller 744 controls the emission of first laser beam 704 and second laser beam 706 from laser generation system 720. In this illustrative example, laser unit 700 generates first laser beam 704 and second laser beam 706 using power supplied by power source 740. In this example, laser unit 700 generates initial laser beam 701 that is split into two laser beams, first laser beam 704 and second laser beam 706 by optical system 702.

As depicted, optical system 702 comprises a number of different components. In this example, optical system 702 comprises shutter 703, variable attenuator 705, beam splitter 707, and mirror 709, mirror 711, mirror 713, and lens 715 as other components that can be located in optical system 702. The components depicted are example components that can be used in optical system 702 and these components can change in other illustrative examples. For example, one or more lens 715, variable attenuator 705, and shutter 703 may be omitted in other illustrative examples. In yet other illustrative examples, other components may be included such as a lens located before beam splitter 707.

As depicted, initial laser beam 701 is split into two laser beams by beam splitter 707. In this example, first laser beam 704 and second laser beam 706 are emitted in directions to intersect at optical breakdown point 708, which is intersection point 710 in this example. Optical breakdown 712 occurs at this intersection of first laser beam 704 and second laser beam 706. Optical breakdown 712 generates radio frequency signal 716 through plasma 714 occurring from optical breakdown 712.

In this example, the power of the first laser beam 704 and second laser beam 706 are sufficient to cause optical breakdown 712 at the intersection of the laser beams. Optical breakdowns do not occur in other locations where these laser beams do not intersect each other in this example.

In this example, controller 744 can control the emission of these laser beams such that at least one of first laser beam 704 or second laser beam 706 is pulsed. This pulsing can include at least one of turning a laser beam on and off for increasing and decreasing the power of the laser beam. This pulsing of one or both of first laser beam 704 and second laser beam 706 can be controlled to control the timing of radio frequency noise generation.

In this example, first laser beam 704 can be pulsed by controller 744 controlling the operation of at least one of variable attenuator 705 or shutter 703. Variable attenuator 705 can be used to change the power of first laser beam 704. Shutter 703 can turn laser beam on and off with respect to emissions of laser beams from laser generation system 720. In this example, both laser beams can be pulsed at the same time by controlling power source 740. In another illustrative example, components within laser unit 700 such as an amplitude modulator can be controlled to pulse the power of initial laser beam 701 resulting in a pulsing of both first laser beam 704 and second laser beam 706.

By controlling the timing of when first laser beam 704 and second laser beam 706 intersect at intersection point 710, controller 744 can control the generation of radio frequency noise signals in a manner that encodes data.

In yet another illustrative example, controller 744 can control the location of optical breakdown point 708 by moving one or both of first laser beam 704 and second laser beam 706. This movement of optical breakdown point 708 can be controlled using at least one of mirror 709 or mirror 713. By moving the location of optical breakdown point 708, the phase of radio frequency noise signal can be changed to encode data.

The illustration of example implementations for laser generation system 218 in FIG. 2 and in FIGS. 3-7 have been provided as an example of some illustrative examples and are not meant to limit the manner in which other laser generation systems can be implemented. For example, a laser generation system can include both a first laser unit and a second laser unit with an optical system. In yet another illustrative example, one or more laser units can be present that emit laser beams in addition to the ones depicted at different optical breakdown points. With this example, two or more optical breakdowns can occur from laser beams emitted from a laser generation system.

In yet another illustrative example, different laser beams can be emitted at different times at the same optical breakdown point. As a result, optical breakdowns can be generated from different combinations of laser beams at the same optical breakdown point.

The illustrative embodiments also recognize and take into account that current techniques for transmitting data involves the use of carrier wave forms. For example, many techniques use only periodic, sinusoidal, or other repetitive or predictable carrier wave forms that are modulated to encode data. These types of waveforms can be detected in noise through various techniques including the denoiser technology which can detect sinusoidal carriers at 20 dB to 40 dB below a noise floor.

As a result, interception and decoding of signals can occur using current transmission techniques. Further, when the sinusoidal carriers can be detected, security issues can arise. For example, information can be inserted into transmissions, jamming attacks can occur, or other issues with using single sinusoidal, periodic, or other repetitive carriers to transmit data.

Thus, the illustrative embodiments provide a method, apparatus, and system for transmitting data. In the illustrative examples, this data can be transmitted using various modulation techniques that modulate noise signals. The use of noise signals is in contrast to the use of a sinusoidal, periodic, repetitive, or predictable carrier that can be detected.

Figure 8:
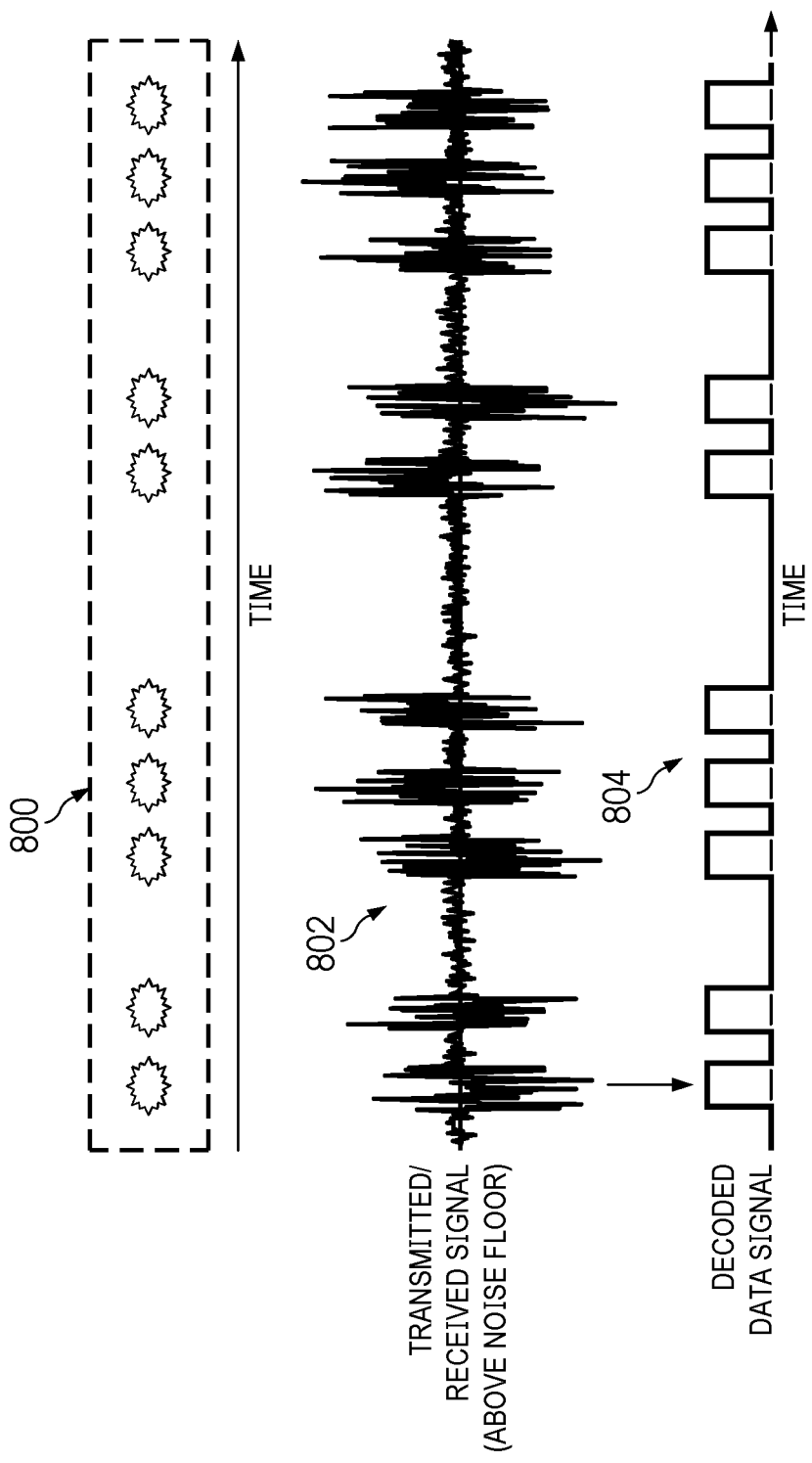
FIG. 8 is an illustration of data transmission using pulse code noise modulation or pulse noise modulation in accordance with an illustrative embodiment.

Turning to FIG. 8, an illustration of data transmission using pulse code noise modulation (also called pulse noise modulation) is depicted in accordance with an illustrative embodiment. In this illustrative example, pulse code noise modulation or pulse noise modulation can be performed using a radio frequency communication system such as radio frequency communication system 200 in FIG. 2.

In this illustrative example, optical breakdowns are generated over time. These optical breakdowns result in the generation of plasma 800 that causes radio frequency noise signals 802 to be transmitted.

The timing of these optical breakdowns can be selected to encode data such that the generation of radio frequency noise signals 802 encode the data. In this example, pulses are present in radio frequency noise signals 802 with timing that corresponds to the timing of optical breakdowns that generated plasma 800. These pulses of radio frequency noise signals 802 are timed to encode data. This type of encoding of data can be referred to as pulse noise modulation. As depicted, radio frequency noise signals 802 can be received and decoded to obtain decoded data signal 804.

This illustration of using radio frequency noise signals generated by optical breakdowns to communicate data is presented as one example of how pulses of radio frequency noise signals can encode data. This illustration is not meant to limit the manner in which other illustrative examples can be implemented.

For example, the pulses of radio frequency noise signals can be generated using other techniques in addition to or in place of laser-induced optical breakdowns. A transmitter system can use a noise signal as a carrier signal and a modulator to modulate the carrier signal such that pulses of radio frequency noise are transmitted that encode the data.

In still other illustrative examples, other types of noise signals in addition to or in place of radio frequency electromagnetic noise signals can be used. For example, noise signals can be used for transmitting data encoded in pulses and can be selected from at least one of electromagnetic frequency noise signals, radio frequency noise signals, microwave frequency signals, audio frequency noise signals, ultrasonic frequency noise signals, ultra-low frequency noise signals, very low frequency noise signals, underwater frequency noise signals, optical frequency noise signals, or other types of noise signals. These different types of noise signals can be used for various applications including speech communication, music, or other types of information for data that that are encoded in the noise signals.

Figure 9:
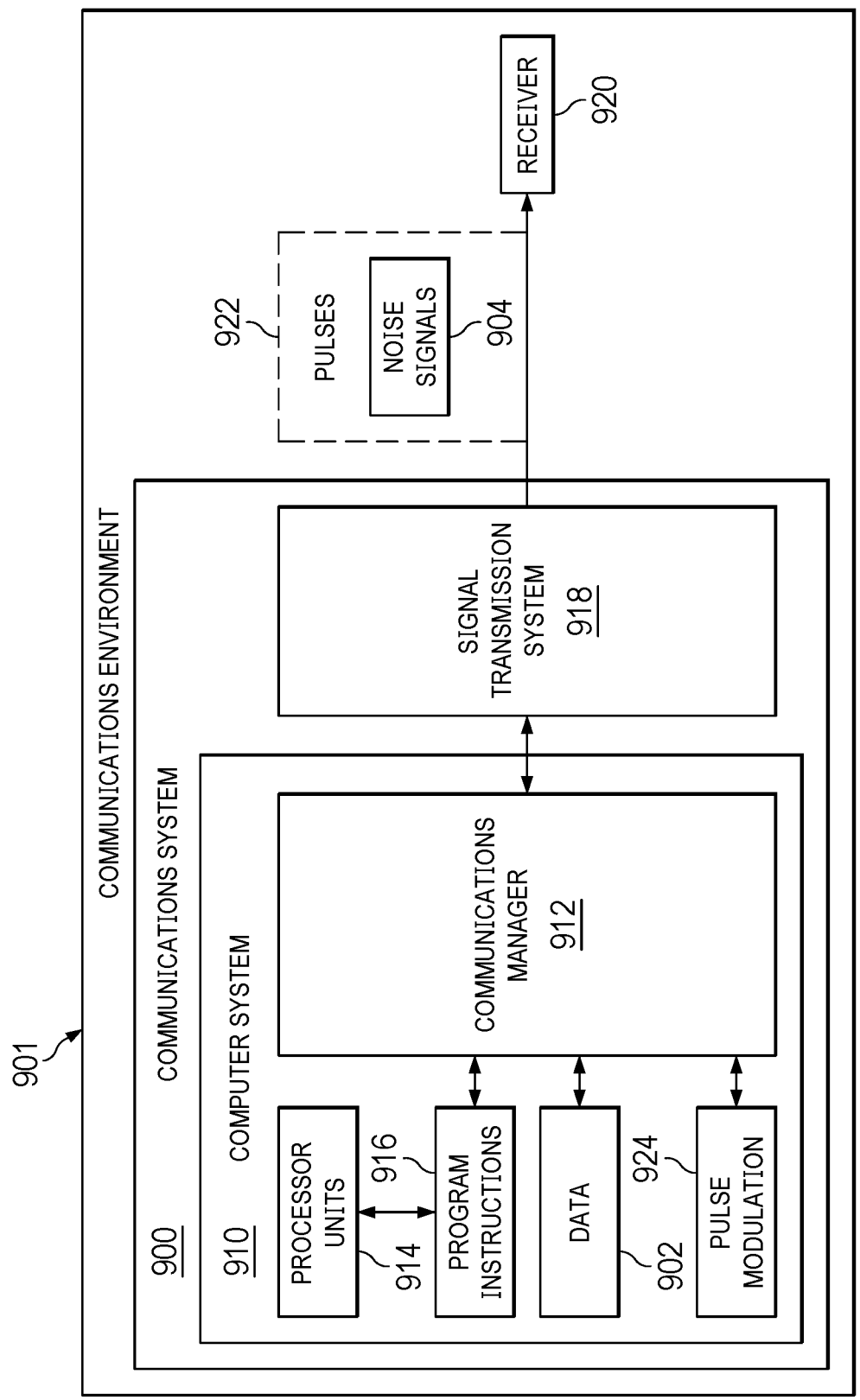
FIG. 9 is an illustration of a block diagram of a communication system in accordance with an illustrative embodiment.

With reference next to FIG. 9, an illustration of a block diagram of a communication system is depicted in accordance with an illustrative embodiment. In this illustrative example, communications system 900 in communications environment 901 operates to transmit data 902 encoded in noise signals 904.

In one illustrative example, a noise signal is a signal with irregular fluctuations that are or appear to be random, non-predictable, or non-deterministic. A noise signal can be a signal that is statistically random. For example, a noise signal in these examples can be a signal that meets one or more standard tests for statistical randomness. A pseudorandom noise signal that seems to lack any definite pattern, although consisting of a deterministic sequence of pulses that repeats itself after its period is an example of a signal that is statistically random and considered a noise signal that can be used to encode data. In this example, the noise in noise signals 904 can be selected from at least one of nondeterministic noise, pseudo random noise, or some other suitable type of noise signal.

In the illustrative example, signals can have characteristics selected from at least one of amplitude, frequency, bandwidth, timing, phase, or other characteristics. In this illustrative example, noise signals 904 can be noise signals in which at least one of these characteristics are not controlled to encode the data. In other words, at least one or more of these characteristics meet one or more standard tests for statistical randomness in noise signals 904.

In these examples, noise signals 904 do not include carrier waves that are periodic. These types of signals can be, for example, sinusoidal, sawtooth, square, or other types of signals. Noise signals 904 also do not include periodic or sinusoid-based carrier signals that employ spread spectrum, frequency-hopping signals, and radar "chirps" that are based on periodic signals such as sinusoids or sawtooths. These and other types of signals that do not meet one or more standard tests for statistical randomness are not considered noise signals 904 in this example. However, "spread noise spectrum", frequency-hopping noise signals, and noise-based radar bursts that use noise as the basis of their carrier signals are considered noise signals 904 in this example.

As depicted, communications system 900 comprises computer system 910 and communications manager 912 located in computer system 910.

Communications manager 912 can be implemented in software, hardware, firmware or a combination thereof. When software is used, the operations performed by communications manager 912 can be implemented in program instructions configured to run on hardware, such as a processor unit. When firmware is used, the operations performed by communications manager 912 can be implemented in program instructions and data and stored in persistent memory to run on a processor unit.

When hardware is employed, the hardware may include circuits that operate to perform the operations in communications manager 912.

The circuits used to implement communications manager 912 can take other forms in addition to or in place of a processor unit.

In the illustrative examples, the hardware used to implement communications manager 912 can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 910 is a physical hardware system and includes one or more data processing systems. In this illustrative example, the data processing systems are hardware machines that can be configured to perform a sequence of operations. These operations can be performed in response to receiving an input in generating and output based on performing the operations. This output can be data in the form of values, commands, or other types of data. When more than one data processing system is present in computer system 910, those data processing systems are in communication with each other using a communications medium. The communications medium may be a network. The data processing systems may be selected from at least one of a computer, a server computer, a tablet, or some other suitable data processing system.

As depicted, computer system 910 includes a number of processor units 914 that are capable of executing program instructions 916 implementing processes in the illustrative examples. In other words, program instructions 916 are computer-readable program instructions.

As used herein, a processor unit in the number of processor units 914 is a hardware device and is comprised of hardware circuits such as those on an integrated circuit that respond and process instructions and program code that operate a computer. When the number of processor units 914 executes program instructions 916 for a process, the number of processor units 914 can be one or more processor units that are on the same computer or on different computers. In other words, the process can be distributed between processor units 914 on the same or different computers in a computer system 910.

Further, the number of processor units 914 can be of the same type or different type of processor units. For example, a number of processor units 914 can be selected from at least one of a single core processor, a dual-core processor, a multi-processor core, a general-purpose central processing unit (CPU), a graphics processing unit (GPU), a digital signal processor (DSP), or some other type of processor unit.

As depicted, communications system 900 can also include signal transmission system 918. In other examples, signal transmission system 918 can be considered a separate component controlled by communications system 900.

In this depicted example, signal transmission system 918 is a hardware system that can transmit noise signals 904. The operation of signal transmission system 918 can be controlled by communications manager 912.

In this illustrative example, noise signals 904 are received by receiver 920. Receiver 920 is also depicted as part of communication system 900. In yet other illustrative examples, receiver 920 may be a separate component from communications system 900.

Receiver 920 is a hardware system and can include processes implemented in hardware or software that decode data 902 that is encoded in pulses 922 of noise signals 904.

In this illustrative example, communications manager 912 identifies data 902 for transmission. In response to identifying data 902, communications manager 912 transmits pulses 922 of noise signals 904 encoding data 902. In one illustrative example, data 902 can be encoded in pulses 922 of noise signals 904 using at least one of a timing of the pulses 922, an amplitude of the pulses 922, duration of pulses 922, or other characteristic for pulses 922. In this manner, communications manager 912 can perform pulse noise modulation through the modulation of noise signals 904 to encode data 902.

For example, communications manager 912 can control the operation of signal transmission system 918 to perform pulse modulation 924. With pulse modulation 924, pulses 922 can encode data 902 through the timing of pulses 922 which are noise pulses or pulses of noise in this example.

For example, the presence of a noise pulse or pulse of noise can be considered a "1" and the absence of a noise pulse or pulse of noise can be considered a "0" which can be selected in time to encode data 902. The timing of the presence or absence of pulses 922 of noise can occur using various time periods.

For example, the timing can be based on whether a noise pulse or pulse of noise is present or absent at each period of time. The period of time can be, for example, a microsecond, a millisecond, two milliseconds, or some other period of time during which a pulse is absent or present for encoding data 902 in pulses 922 of noise.

Figure 10:
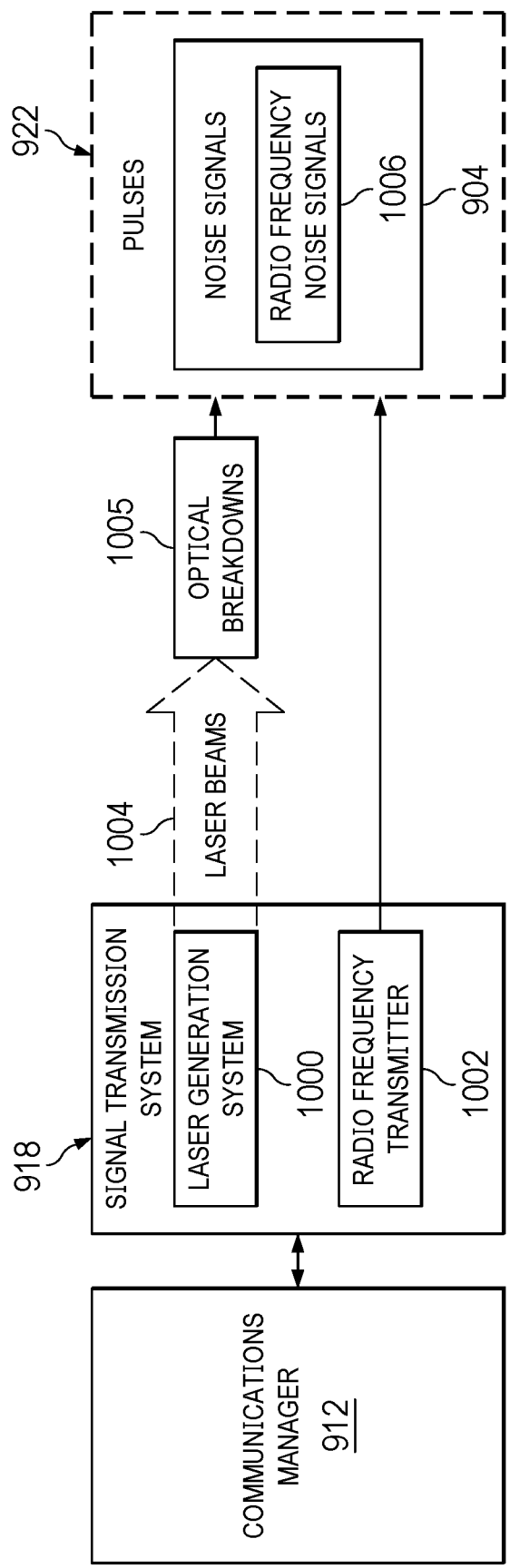
FIG. 10 is an illustration of a transmitter in accordance with an illustrative embodiment.

With reference next to FIG. 10, an illustration of a transmitter is depicted in accordance with an illustrative embodiment. In the illustrative examples, the same reference numeral may be used in more than one figure. This reuse of a reference numeral in different figures represents the same element in the different figures. In this illustrative example, examples of components that can be used to implement signal transmission system 918 in FIG. 9 are depicted.

As depicted in this illustrative example, signal transmission system 918 can include a number of different components that can be controlled to transmit noise signals 904. More specifically, these components can be controlled to generate pulses 922 of noise signals 904. These components can include at least one of laser generation system 1000 or radio frequency transmitter 1002.

In this illustrative example, laser generation system 1000 is a hardware system that emits a set of laser beams 1004. Communications manager 912 can control the emission of the set of laser beams 1004 from laser generation system 1000 to cause optical breakdowns 1005.

In this example, optical breakdowns 1005 result in the generation of noise signals 904 in the form of radio frequency noise signals 1006. In this example, pulses 922 of radio frequency noise signals 1006 can be generated based on the timing of optical breakdowns 1005. In this illustrative example, each optical breakdown in optical breakdowns 1005 can be a pulse in pulses 922 of radio frequency noise signals 1006.

In this example, radio frequency transmitter 1002 is a hardware system and can transmit pulses 922 of noise signals 904 in the form of radio frequency noise signals 1006. For example, radio frequency transmitter 1002 can transmit pulses 922 of noise signals 904 in the form of radio frequency noise signals 1006 transmitted from a physical hardware antenna instead of using lasers and optical breakdowns to produce the radio frequency noise signals 1006.

Figure 11:
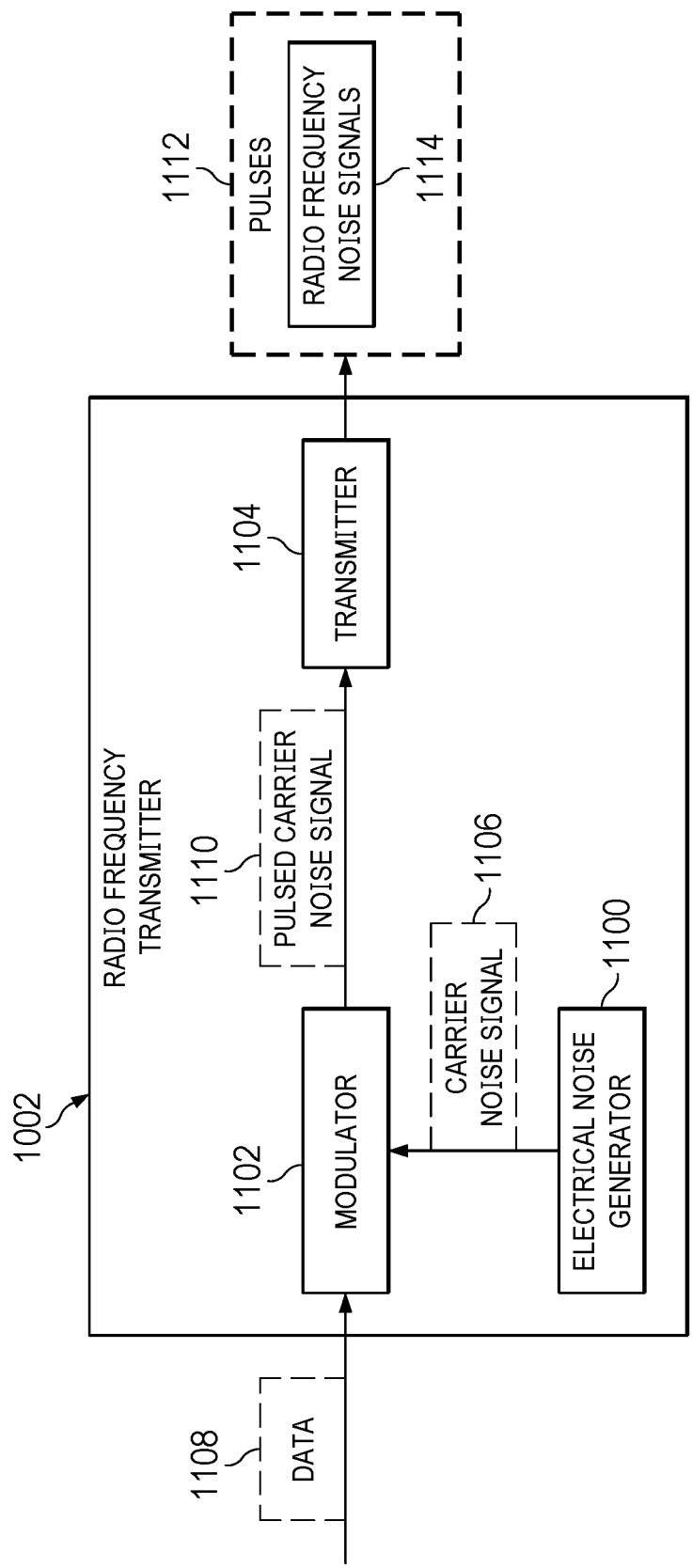
FIG. 11 is an illustration of a block diagram of a radio frequency transmitter in accordance with an illustrative embodiment.

Turning next to FIG. 11, an illustration of a block diagram of a radio frequency transmitter is depicted in accordance with an illustrative embodiment. This figure illustrates example components that can be used to implement radio frequency transmitter 1002. As depicted in this example, radio frequency transmitter 1002 comprises electrical noise generator 1100, modulator 1102, and transmitter 1104.

As depicted, electrical noise generator 1100 generates carrier noise signal 1106. Electrical noise generator 1100 is connected to modulator 1102 and sends carrier noise signal 1106 to modulator 1102.

As depicted, modulator 1102 receives data 1108 that is to be transmitted. In this example, modulator 1102 modulates carrier noise signal 1106 to create pulsed carrier noise signal 1110 that encodes data 1108. This data is encoded in pulses in pulsed carrier noise signal 1110. In this example the modulation occurs by modulator 1102 turning carrier noise signal 1106 on and off to form pulsed carrier noise signal 1110.

Transmitter 1104 transmits pulsed carrier noise signal 1110 as pulses 1112 of radio frequency noise signals 1114. In this example, transmitter 1104 includes a physical antenna that is used to transmit pulses 1112 of radio frequency noise signals 1114. In other illustrative examples, the antenna can be a separate component from the hardware used to generate radio frequency noise signals 1114.

Figure 12:
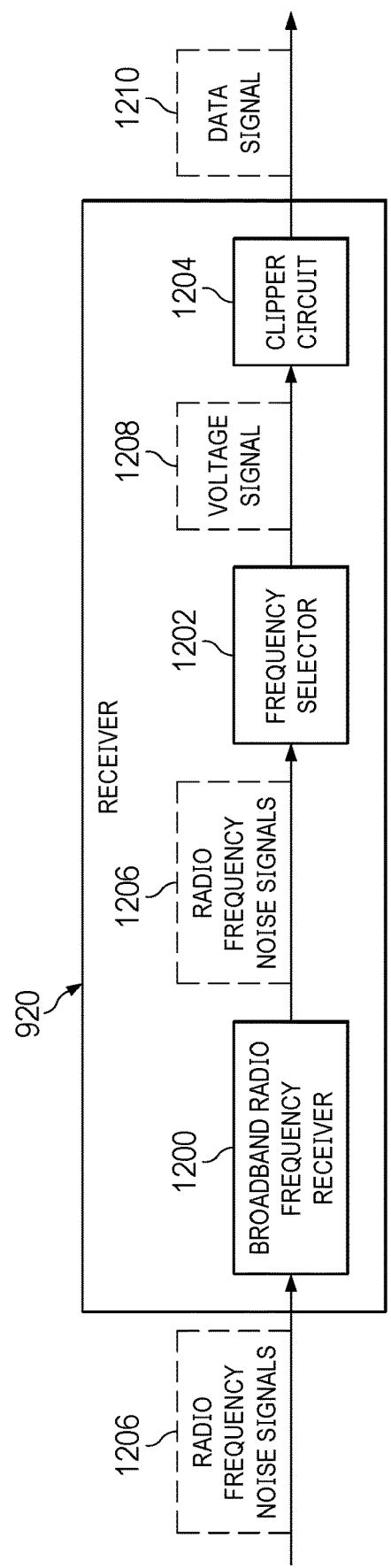
FIG. 12 is an illustration of a block diagram of a receiver in accordance with an illustrative embodiment.

Turning next to FIG. 12, an illustration of a block diagram of a receiver is depicted in accordance with an illustrative embodiment. An example of components that can be used to implement receiver 920 are shown in this figure. As depicted, receiver 920 is a hardware system. As depicted, receiver 920 comprises broadband radio frequency receiver 1200, frequency selector 1202, and clipper circuit 1204.

In this illustrative example, broadband radio frequency receiver 1200 receives radio frequency noise signals 1206.

Broadband radio frequency receiver 1200 is connected to frequency selector 1202 and sends the received signals to frequency selector 1202.

Frequency selector 1202 outputs a set of voltage signals 1208 from the frequencies selected in radio frequency noise signal 1206. In this illustrative example, the selection of frequencies by frequency selector 1202 can be performed using at least one of a bandpass filter, a band-reject filter, an envelope follower, an envelope detector, a low-pass filter, a rectified low pass filter, multiple bandpass filters tuned to different frequencies, or some other suitable type of circuit.

Frequency selector 1202 is connected to clipper circuit 1204. Voltage signal 1208 is received by clipper circuit 1204, which shapes voltage signal 1208. In this illustrative example, clipper circuit 1204 prevents voltage signal 1208 from exceeding a selected voltage level. Clipper circuit 1204 outputs data signal 1210. In this example, data signal 1210 is in an analog or digital signal and contains pulses that can be used re-create the data transmitted in radio frequency noise signals 1206.

Thus, one or more illustrative examples enable communicating data using noise carrier signals. In one illustrative example, these noise carrier signals or carrier noise signals can be modulated to encode data. The modulation can be pulse noise modulation or pulse code noise modulation in which a noise signal is transmitted in pulses. The timing of the pulses selected encodes data in these pulses of noise signals.

In this illustrative example, the modulation and demodulation of these pulses of noise signals do not depend on a single frequency or periodic waveform as the basis for the carrier wave as compared to current techniques that use a sinusoidal, periodic, or predictable carrier. As result, increased security can be present and interference with the sinusoidal carriers can be reduced.

In one illustrative example, the pulse code noise modulation or pulse noise modulation can be a broadband noise radio frequency carrier signal encoding the data. The generation of the pulses of radio frequency noise signals can be performed using a laser generation system that generates radio frequency signals through optical breakdowns. In another example, the generation of the radio frequency noise signals can be performed using a physical electromagnetic receipt transmitter having a physical antenna.

The illustration of communications environment 901 and the different components in FIGS. 9-12 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although communications manager 912 is shown as being implemented using program instructions 916 run on a number of processor units 914 in computer system 910, communications manager 912 can be implemented in other hardware instead of or in addition to the number of processor units 914. For example, computer system 910 may use other hardware in addition to or in place of the number of processor units 914.

For example, other types of hardware circuits capable of performing the operations for communications manager 912 can be used. This other hardware can be at least one of a circuit system, an integrated circuit, an application-specific integrated circuit (ASIC), a programmable logic device, or some other suitable type of hardware configured to perform a number of operations.

As another example, the illustration of laser generation system 1000 and radio frequency transmitter 1002 are provided as examples of some implementations of components that can transmit pulses 922 of noise signals 904. As another example, radio frequency transmitter 1002 that generates electrical noise in electrical noise generator 1100 as carrier signal noise 1106 to be modulated and transmitted as radio frequency noise signals 1114 in noise pulses 1112 can be transmitted on any type of physical, hardware antenna, or both. Examples of antenna types include, for example, whip antennas, dipole antennas, microwave antennas, metamaterial antennas, directional antennas, omnidirectional antennas, and any other type of physical antenna.

Figure 13:
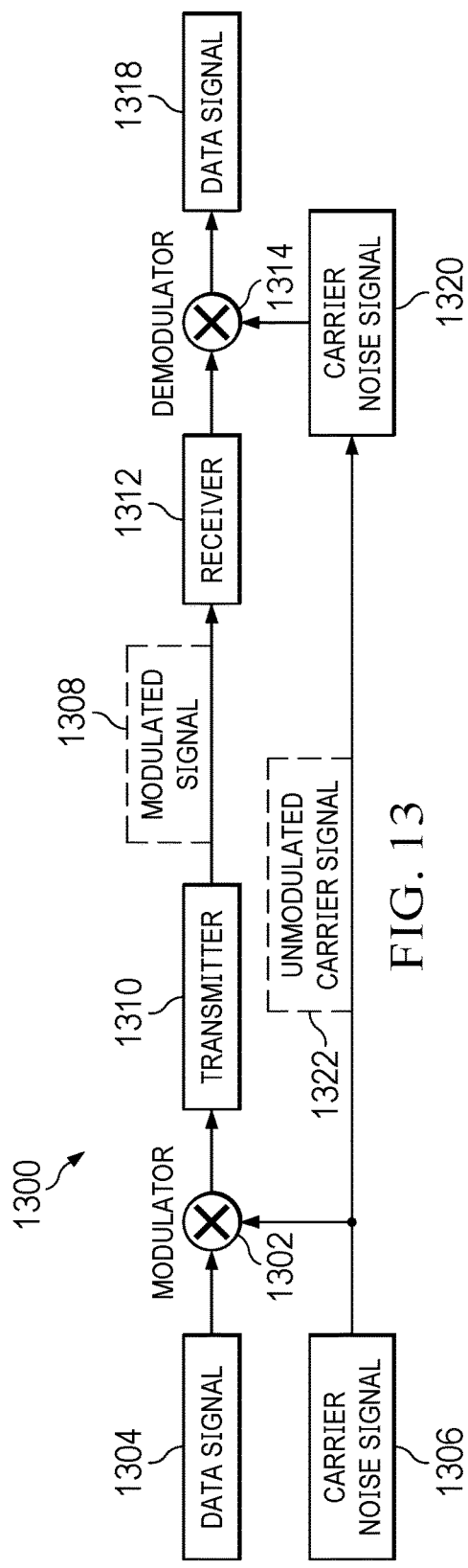
FIG. 13 is an illustration of a communications system for transmitting and receiving electromagnetic noise signals in accordance with an illustrative embodiment.

Turning next to FIG. 13, an illustration of a communications system for transmitting and receiving electromagnetic noise signals is depicted in accordance with an illustrative embodiment. In this illustrative example, communications system 1300 can transmit or receive electromagnetic noise signals encoding data using electromagnetic noise signals. Examples of electromagnetic noise signals may include electromagnetic ranges of ULF (Ultra Low Frequency), VLF (Very Low Frequency), 20 KHz to 300 KHz, HF (High Frequency), UHF (Ultra High Frequency), millimeter wave and microwave ranges, EHF (Extremely High Frequencies) up through Gigahertz frequencies and above Terahertz frequencies, and including the optical spectrum. Examples of applications or uses include noise carrier communications for modulation of audio, voice, and video communications, as well as noise-based radar, noise-based precision navigation and timing such as noise-based global positioning systems, noise-based spread spectrum using frequency bands of noise instead of sinusoidal-based carrier spread spectrum, noise-based frequency band-hopping using frequency-hopping of frequency bands of noise instead of using sinusoidal or periodic-based carrier frequency-hopping, as well as Signals Intelligence (SI) waveforms such as Low Probability of Intercept/Low Probability of Detect (LPI/LPD) and other clandestine signaling where detection and interception of messages using noise carriers will be difficult.

As depicted, modulator 1302 receives data signal 1304 and carrier noise signal 1306. In this illustrative example, carrier noise signal 1306 can be generated by an electrical noise generator.

Modulator 1302 modulates carrier noise signal 1306 to generate modulated signal 1308. In this example, modulated signal 1308 comprises pulses of carrier noise signal 1306. For example, modulated signal 1308 can be generated by turning modulator 1302 on and off to send pulses of carrier noise signal 1306 to transmitter 1310 for transmission as modulated signal 1308. The generation of the pulses is based on the data in data signal 1304. In this manner, the data in data signal 1304 can be encoded in modulated signal 1308.

Transmitter 1310 transmits modulated signal 1308 to receiver 1312. In one illustrative example, receiver 1312 can be a broadband radio frequency receiver when modulated signal 1308 is a radio frequency signal. When other types of signals are used, receiver 1312 is selected to detect the signals transmitted by transmitter 1310.

Modulated signal 1308 detected by receiver 1312 is sent to demodulator 1314. In this example, demodulator 1314 demodulates modulated signal 1308 using carrier noise signal 1320 to generate data signal 1318, which contains the same data in data signal 1304 in this depicted example.

As depicted, the demodulation of modulated signal 1308 is performed using carrier noise signal 1320. In this illustrative example, carrier noise signal 1306 is not predictable as compared to current techniques using sinusoidal wave forms for carrier signals.

As depicted, carrier noise signal 1320 can be obtained by demodulator 1314 in the form of unmodulated carrier noise signal 1322 being transmitted to demodulator 1314. In this manner, carrier noise signal 1320 used to demodulate modulated signal 1308 can be the same carrier signal as carrier noise signal 1306. Unmodulated carrier noise signal 1322 can be an in-band or out-of-band copy of carrier noise signal 1306.

Figure 14:
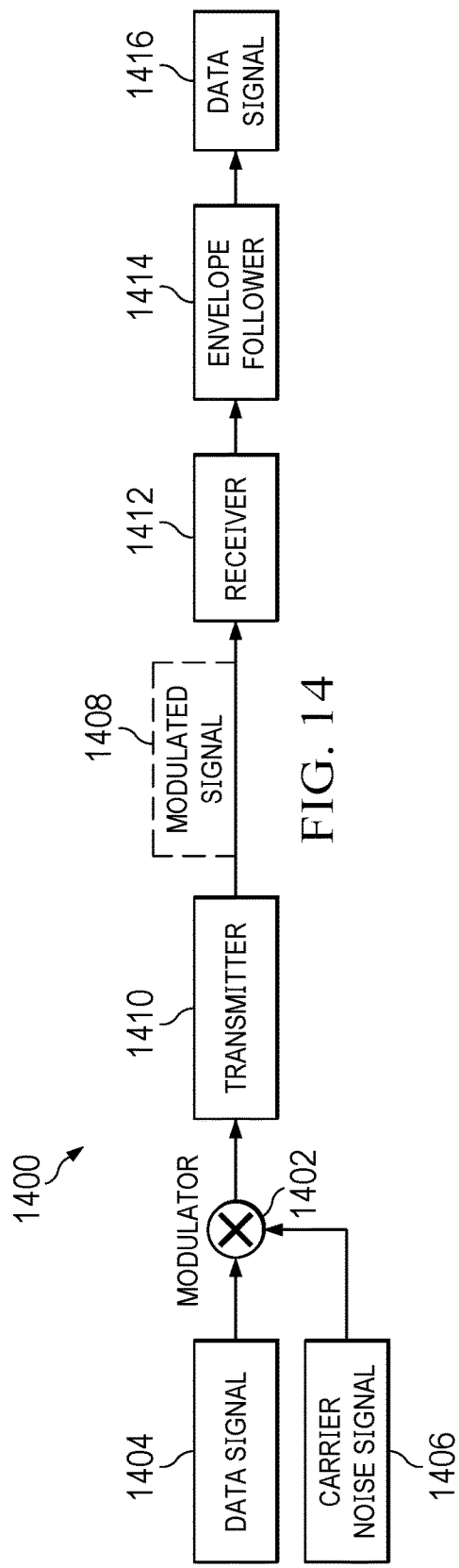
FIG. 14 is an illustration of a block diagram of a communications system for transmitting and receiving electromagnetic noise signals in accordance with an illustrative embodiment.

With reference now to FIG. 14, an illustration of a block diagram of a communications system for transmitting and receiving electromagnetic noise signals is depicted in accordance with an illustrative embodiment. Communications system 1400 can transmit or receive electromagnetic noise signals encoding data using electromagnetic noise signals.

In this illustrative example, communications system 1400 can transmit or receive electromagnetic noise signals encoding data using electromagnetic noise signals.

As depicted, modulator 1402 receives data signal 1404 and carrier noise signal 1406. In this illustrative example, carrier noise signal 1406 can be generated by an electrical noise generator.

Modulator 1402 modulates carrier noise signal 1406 to generate modulated signal 1408. In this example, modulator 1402 can be an on/off modulator. As an on/off modulator, modulator 1402 sends carrier noise signal 1406 transmitter 1410 for transmission when modulator 1402 is turned on and does not send carrier noise signal 1406 to transmitter 1410 when modulator 1402 is turned off. As result, modulated signal 1408 comprises pulses of carrier noise signal 1406. These pulses are generated to encode data signal 1404. In other words, the timing of these pulses can be generated to encode the data. For example, the timing in these depicted examples can be time for pulses to perform pulse code noise modulation or pulse noise modulation.

For example, modulated signal 1408 can be generated by turning modulator 1402 on and off to send pulses of carrier noise signal 1406 to transmitter 1410 for transmission as modulated signal 1408.

Transmitter 1410 transmits modulated signal 1408 to receiver 1412. In one illustrative example, receiver 1412 can be a broadband radio frequency receiver when modulated signal 1408 is a radio frequency signal. When other types of signals are used, receiver 1412 is selected to detect the signals transmitted by transmitter 1410.

In this example, modulated signal 1408 detected by receiver 1412 is sent to envelope follower 1414. As depicted, envelope follower 1414 can also be referred to as an envelope detector. Envelope follower 1414 can detect amplitude variations in modulated signal 1408 and create a signal having a shape that resembles those variations. This example, modulated signal 1408 contains pulses of noise. As a result, envelope follower 1414 can generate a signal with the shape of the noise pulses to form data signal 1416. Envelope follower 1414 can be a selected from at least one of a low pass filter, a bandpass filter, an envelope detector, a peak detector, or a diode detector that follows and outputs the overall shape of at least one of the amplitudes or pulses as currently used.

The illustrative examples of communication systems in FIG. 13 and in FIG. 14 are presented as examples of some implementations for communications system 900 in FIG. 9. These illustrations are not meant to limit the manner in which other illustrative examples can be implemented. For example, a clipper circuit as is known in the art can be placed after envelope follower 1414 in FIG. 14 to convert rough envelopes of pulses into square wave pulses.

Figure 15A:
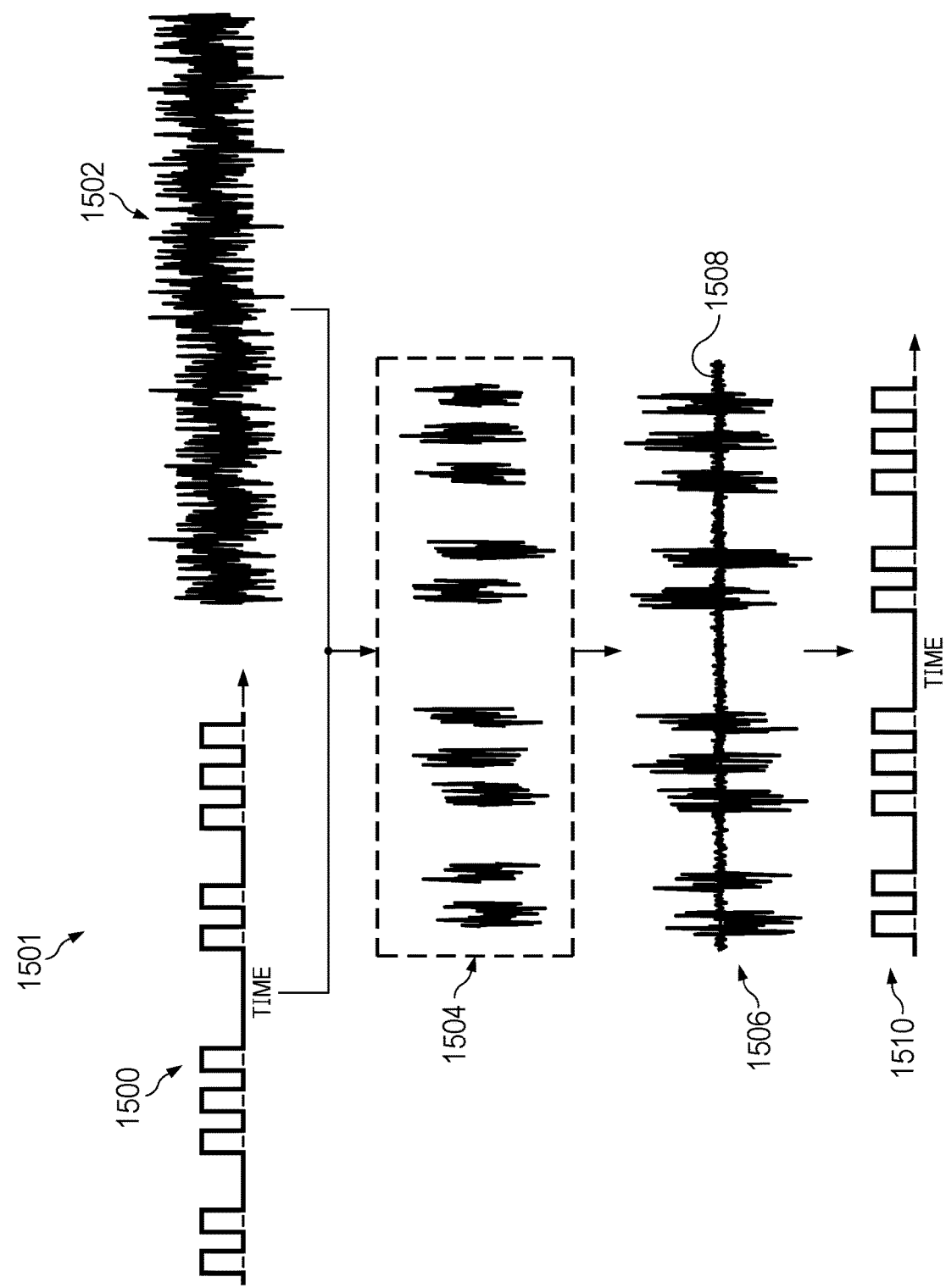
FIG. 15A is an illustration of a data flow of signals transmitting data using modulated noise signals in accordance with an illustrative embodiment.

Turning now to FIG. 15A, an illustration of a data flow of signals transmitting data using modulated noise signals is depicted in accordance with an illustrative embodiment. In this illustrative example, data signal 1501 is an example of signals in communications system 1400 in FIG. 14.

In this illustrative example, data signal 1500 is used to modulate carrier noise signal 1502. Data signal 1500 is an example of data signal 1404 and carrier noise signal 1502 is an example of carrier noise signal 1406 in FIG. 14.

The modulation of carrier noise signal 1502 forms modulated signal 1504, which encodes the data in data signal 1500. Modulated signal 1504 is an example of modulated signal 1408 in FIG. 14. As depicted in this example, modulated signal 1504 is a modulated noise signal comprising pulses of carrier noise signal 1502.

Received signal 1506 is an example of the signal received by a receiver. As depicted, received signal 1506 also includes noise 1508 in addition to the pulses of carrier noise signal 1502 in modulated signal 1504. In this example, noise 1508 is background noise or other noise in addition to the pulses in the carrier noise in modulated signal 1504.

As depicted, received signal 1506 can be processed and decoded using a component such as envelope follower 1414 in FIG. 14. Other components such as a bandpass filter, low-pass filter, band reject filter, clipper circuit, or other circuits can be used to generate data signal 1510. In this example, data signal 1510 is the same as or close enough to data signal 1500 such that the same data used to generate data signal 1500 can be obtained from data signal 1510.

As discussed previously, the set of characteristics for noise signals can be selected from at least one of a timing, an amplitude, a frequency band, a relative phase, or other characteristics for carrier noise signals. For pulse noise modulation the carrier noise may be of different frequency characteristics that the transmitter and receiver will share. For pulse noise modulation the carrier noise signals will vary in amplitude, duration, and timing to modulate the message signal. For reception of these pulse noise modulated signals the receivers in FIG. 12 and FIG. 14 use various types of techniques to receive and demodulate the original data signal.

Turning now to FIG. 15B, an illustration of an envelope follower circuit using a diode detector with a low pass filter in accordance with an illustrative embodiment. In this figure, an illustration of a simple circuit for envelope follower 1414 is shown. In this illustrative example, envelope follower 1414 is comprised of a diode 1512 to rectify the input signal, capacitor 1514 to provide a low pass filter to smooth out the noisy rectified signal and produce a lower frequency envelope. An optional resistor 1516 or inductive coil may be provided to affect the tuning or resonance of the circuit. Here, received signal 1506 of carrier pulses of noise is inputted to the envelope follower 1414 circuit. As received signal 1506 travels through diode 1512 the diode acts as a rectifier and converts the AC noise signal into a DC noise signal 1518 as shown by the dashed arrow from DC noise signal 1518 to the output of diode 1512. From there the rectified DC noise signal 1518 travels across capacitor 1514 which acts as a low pass filter to smooth the signal into an envelope signal 1520. The actual envelope signal 1520 is shown by the line the follows the outline or envelope of the noise bursts from DC noise signal 1518. The envelope signal 1520 then travels across optional resistor 1516 or coil and exits at the output as the envelope followed signal 1522.

In this illustrative example it is clear that the envelope followed signal 1522 is beginning to look like the received data signal 1510.

With reference to FIG. 15C, an illustration of a clipper circuit in accordance with an illustrative embodiment. In this figure, clipper circuit 1204 is also referred to as a slicer or amplitude selector. In this illustrative example, clipper circuit 1204 is comprised of optional input resistor 1524, and a bidirectional clipping circuit comprised of diode D1 1526, bias voltage 1528, diode D2 1530, and bias voltage 1532. This and many other known methods of clipping can be used. Single directional clipping may be used as well as bidirectional or any other type of clipping circuit.

In this illustrative example, envelope followed signal 1522 from FIG. 15B has been amplified to be a stronger signal and is inputted into clipper circuit 1204. Envelope followed signal 1522 travels through optional input resistor 1524 which may be an impedance matching circuit.

This signal then travels across one or more illustrative diodes D1 1526 and D2 1530. Various types of diodes may be used. A single diode may be used, or a transistor circuit may be used with the purpose of clipping off the top of envelope followed signal 1522 such that top part of signal 1534 is clipped off and bottom part of signal 1536 remains. The level at which top part of the signal 1534 is clipped off is determined by the diodes D1 1526 and D2 1530 as well as by the bias voltages 1528 and 1532.

Thus, bottom part of signal 1536 remaining is outputted at the output. This bottom part of the signal 1536 can be transferred through another stage of clipping until it becomes output data signal 1510 which is extremely similar to the original data signal 1500.

As can be seen in this illustrative example, the pulses of carrier noise signal 1502 encode data in data signal 1500. In other words, the timing in generating pulses of carrier noise signal 1502 is used to encode the data.

Thus, the different illustrative examples use pulse modulation of a noise signal that can be generated using a laser generator or a transmitter. With a laser generator, optical breakdowns are used to create the pulses of noise signals. With a physical transmitter, an electronic noise source generates a carrier noise signal that is modulated to create pulses of the carrier noise signal based on the data to be transmitted. These pulses of the carrier noise signals form the pulses of noise signal encoding data that can be transmitted using a physical antenna.

In this illustrative example, FIGS. 16-27 are flowcharts illustrating operations that can be performed to generate radio frequency noise signals encoding data in which a physical antenna is unnecessary.

Figure 16:
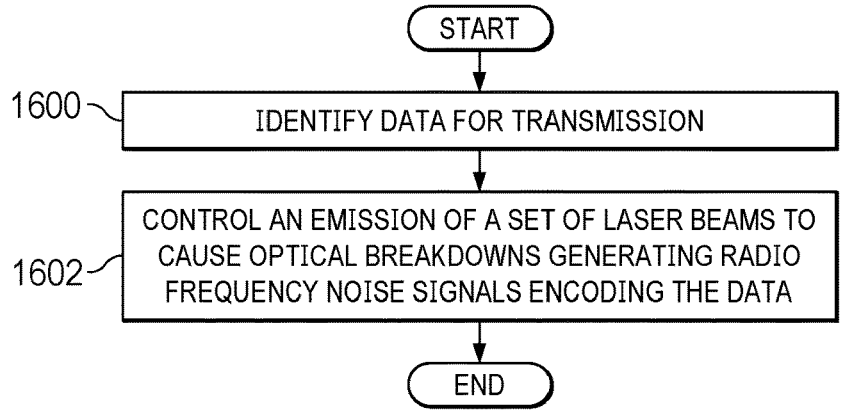
FIG. 16 is an illustration of a flowchart of a process for transmitting data in accordance with an illustrative embodiment.

With reference first to FIG. 16, a flowchart of a process for transmitting data is depicted in accordance with an illustrative embodiment. The process in FIG. 16 can be implemented in hardware, software, or both. When implemented in software, the process can take the form of program instructions that is run by one of more processor units located in one or more hardware devices in one or more computer systems. For example, the process can be implemented in communications manager 212 in computer system 210 in FIG. 2.

The process begins by identifying data for transmission (operation 1600). The process controls an emission of a set of laser beams to cause optical breakdowns generating radio frequency noise signals encoding the data (operation 1602). The process terminates thereafter.

In operation 1602, the emission of the set of laser beams can be controlled in number of different ways. For example, the laser beams can be emitted continuously or pulsed. Further, direction at which the laser beams are directed can also be changed. For example, the set of laser beams can be directed towards a set of optical breakdown points. The optical breakdown points can be selected from at least one of an intersection point or focal point. These optical breakdown points are locations where optical breakdowns occur. These optical breakdowns are locations where plasma is generated that generates the radio frequency noise signals.

The manner in which the optical breakdowns occur can be used to encode the data in the radio frequency noise signals. For example, the timing of the occurrence of optical breakdowns generate time pulses used to encode data. In this manner, different types of data encoding such as pulse noise modulation can be used to encode data based on when radio frequency noise signals are generated.

As another example, the set of laser beams can be moved or swept such that the optical breakdowns occur in different locations resulting in the frequency of a phase change in the optical breakdowns that can be used to encode data. As another example, the power of the laser beams can be changed to change the amplitude of the radio frequency noise signals two encode data. In this manner, different types of data encoding such as pulse noise modulation can be used to encode data based on when radio frequency noise signals are generated.

Figure 17:
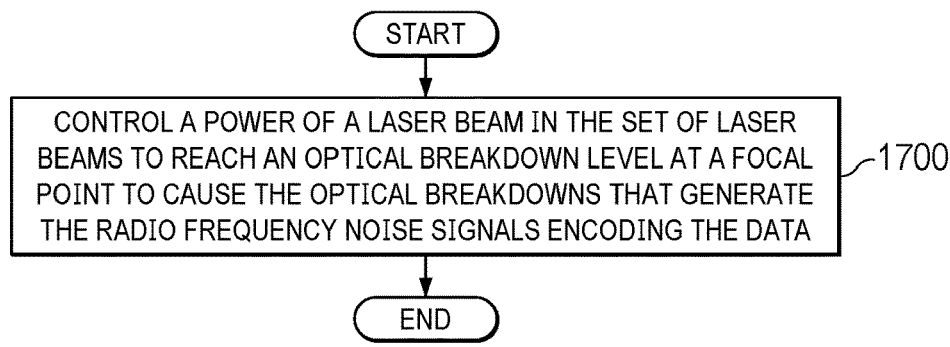
FIG. 17 is an illustration of a flowchart for controlling the emission of laser beams in points in accordance with an illustrative embodiment.

Turning next to FIG. 17, an illustration of a flowchart for controlling the emission of laser beams is depicted in points with an illustrative embodiment. The process illustrated in FIG. 17 is an example of one implementation for operation 1602 in FIG. 16.

The process controls a power of a laser beam in the set of laser beams to reach an optical breakdown level at a focal point to cause the optical breakdowns that generate the radio frequency noise signals encoding the data (operation 1700). The process terminates thereafter.

Figure 18:
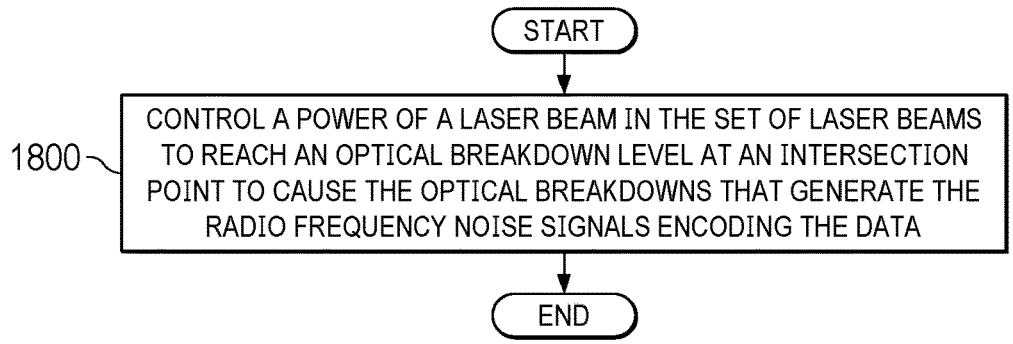
FIG. 18 is an illustration of a flowchart for controlling the emission of laser beams in intersecting points in accordance with an illustrative embodiment.

With reference next to FIG. 18, an illustration of a flowchart for controlling the emission of laser beams is depicted at intersecting points with an illustrative embodiment. The process illustrated in FIG. 18 is another example of an implementation for operation 1602 in FIG. 16.

The process controls a power of a laser beam in the set of laser beams to reach an optical breakdown level at an intersecting point to cause the optical breakdowns that generate the radio frequency noise signals encoding the data (operation 1800). The process terminates thereafter.

Figure 19:
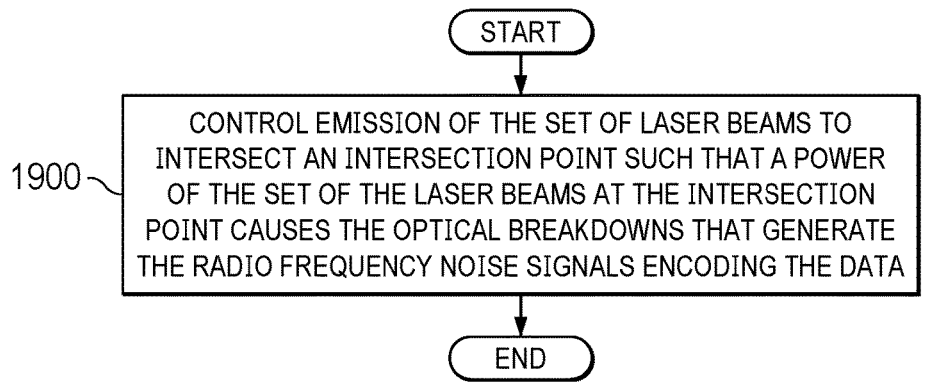
FIG. 19 is an illustration of a flowchart for controlling the emission of laser beams in points in accordance with an illustrative embodiment.

In FIG. 19, an illustration of a flowchart for controlling the emission of laser beams is depicted in points with an illustrative embodiment. The process illustrated in FIG. 19 is yet another example of an implementation for operation 1602 in FIG. 16.

The process controls emission of the set of laser beams to intersect an intersection point such that a power of the set of the laser beams at the intersection point causes the optical breakdowns that generate the radio frequency noise signals encoding the data (operation 1900). The process terminates thereafter.

Figure 20:
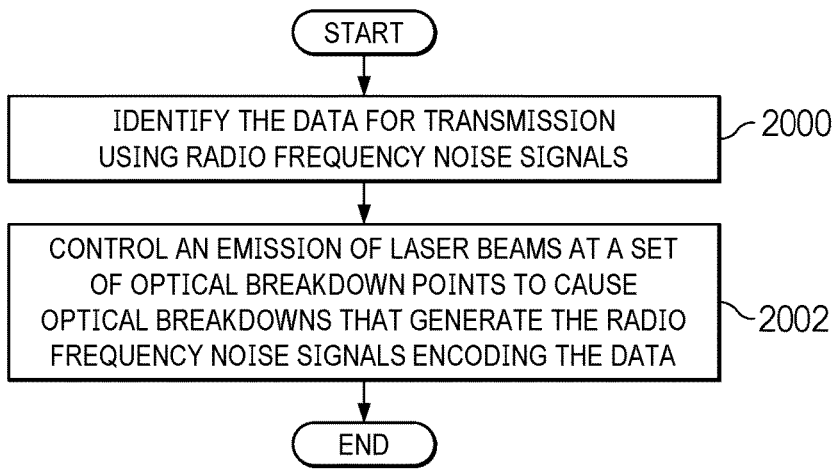
FIG. 20 is an illustration of a flowchart of a process for transmitting data in accordance with an illustrative embodiment.

Turning next to FIG. 20, a flowchart of a process for transmitting data is depicted in accordance with an illustrative embodiment. The process in FIG. 20 can be implemented in hardware, software, or both. When implemented in software, the process can take the form of program instructions that is run by one of more processor units located in one or more hardware devices in one or more computer systems. For example, the process can be implemented in communications manager 212 in computer system 210 in FIG. 2.

The process begins by identifying the data for transmission using radio frequency noise signals (operation 2000). The process controls an emission of laser beams at a set of optical breakdown points to cause optical breakdowns that generate the radio frequency noise signals encoding the data (operation 2002). The process terminates thereafter.

In this example, the set of optical breakdown points can be at different locations when more than one optical breakdown point is present in the set of optical breakdown points. In one example, radio frequency transmissions can be transmitted from multiple locations when the set of optical breakdowns caused by the set of lasers being directed at more than one optical breakdown point.

Figure 21:
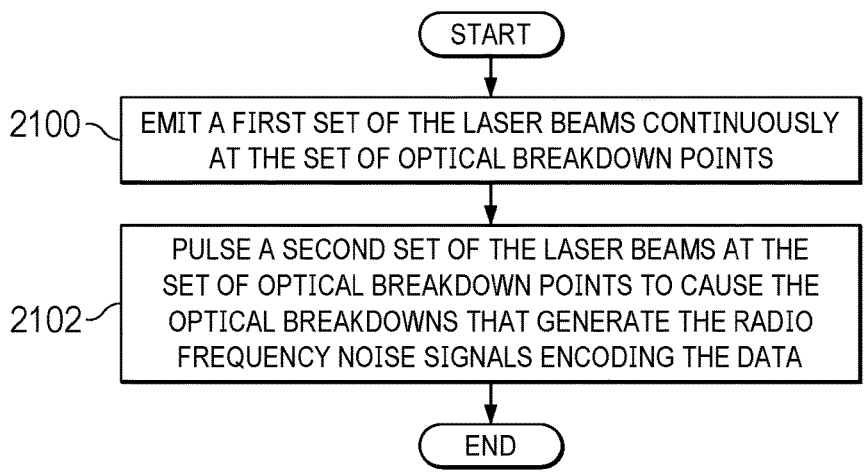
FIG. 21 is an illustration of a flowchart for controlling the emission of laser beams in points in accordance with an illustrative embodiment.

In FIG. 21, an illustration of a flowchart for controlling the emission of laser beams is depicted in points with an illustrative embodiment. The process illustrated in FIG. 21 is yet another example of an implementation for operation 2002 in FIG. 20.

The process begins by emitting a first set of the laser beams continuously at the set of optical breakdown points (operation 2100). The process pulses a second set of the laser beams at the set of optical breakdown points to cause the optical breakdowns that generate the radio frequency noise signals encoding the data (operation 2102). The process terminates thereafter.

In operation 2102, the pulsing can occur by turning the second set of laser beams on and off. In other examples, the pulsing can provide increasing decreasing the power to the second set of laser beams. In this example, the optical breakdowns occur in response to sufficient power in the laser beams at the set of optical breakdown points. In this example, the pulsing can control the timing of when radio frequency noise signals are transmitted.

Further in operation 2102, a power of a laser beam at the optical breakdown point can be controlled at by at least one of a shutter, a lens, a deformable lens, a microelectromechanical systems mirror, an attenuator, a controlling optics, an optical filter, an amplitude modulator in a laser beam generator, or other suitable components.

Figure 22:
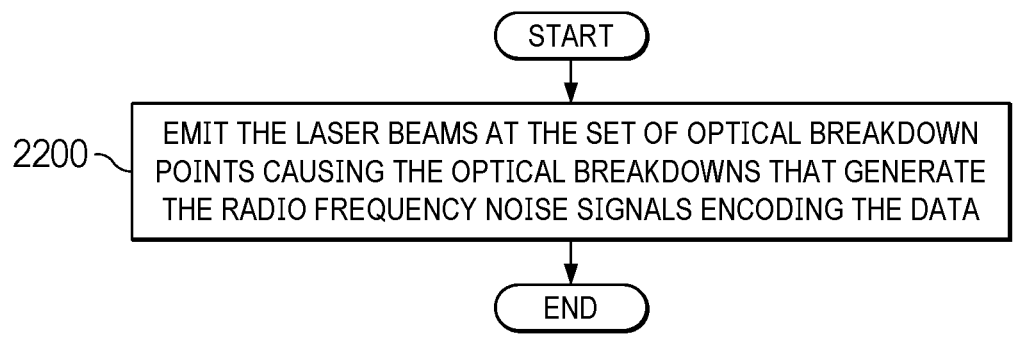
FIG. 22 is an illustration of a flowchart for controlling the emission of the laser beams in points in accordance with an illustrative embodiment.

With reference now to FIG. 22, an illustration of a flowchart for controlling the emission of the laser beams is depicted in points with an illustrative embodiment. The process illustrated in FIG. 21 is yet another example of an implementation for operation 2002 in FIG. 20.

The process emits the laser beams at the set of optical breakdown points causing the optical breakdowns that generate the radio frequency noise signals encoding the data (operation 2200). The process terminates thereafter.

Figure 23:
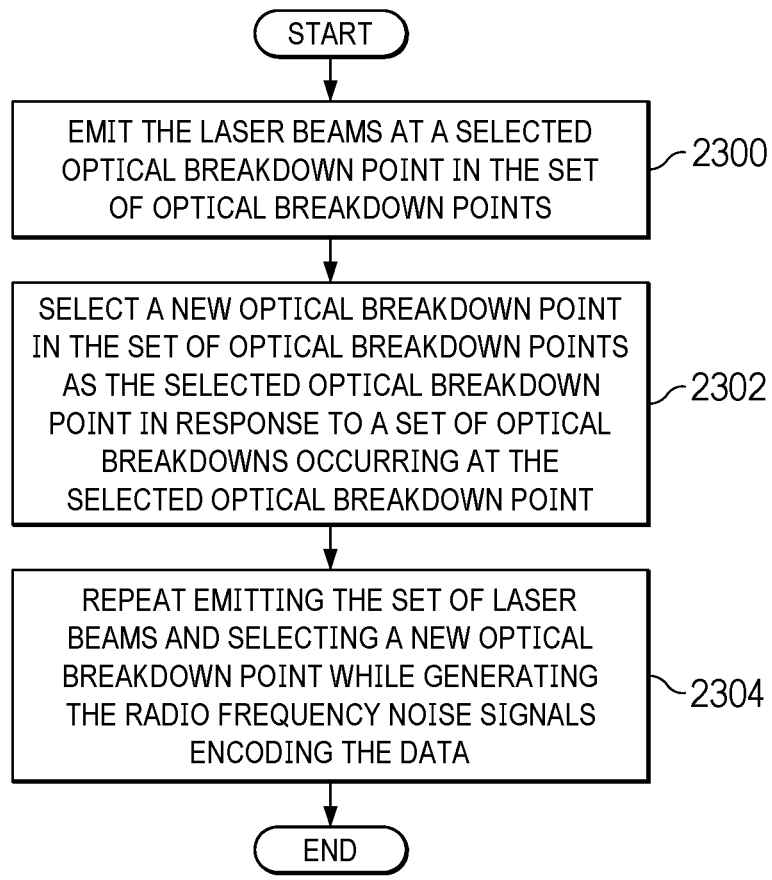
FIG. 23 is an illustration of a flowchart for controlling the emission of laser beams in points in accordance with an illustrative embodiment.

Turning next to FIG. 23, an illustration of a flowchart for controlling the emission of laser beams is depicted in points with an illustrative embodiment. The process illustrated in FIG. 23 is example of an implementation for operation 2200 in FIG. 22.

The process begins by emitting the laser beams at a selected optical breakdown point in the set of optical breakdown points (operation 2300). The process selects a new optical breakdown point in the set of optical breakdown points as the selected optical breakdown point in response to a set of optical breakdowns occurring at the selected optical breakdown point (operation 2302).

The process repeats emitting the set of laser beams and selecting a new optical breakdown point while generating the radio frequency noise signals encoding the data (operation 2304) the process terminates thereafter. In operation 2304, the process repeats operations 2300 and operation 2302 any number of times while transmitting the radio frequency noise signals. Operation at 2304 enables transmitting the radio frequency signals from different locations through the selection of different optical breakdown points. As result, identifying the origination of the radio frequency signals can be made more difficult.

Figure 24:
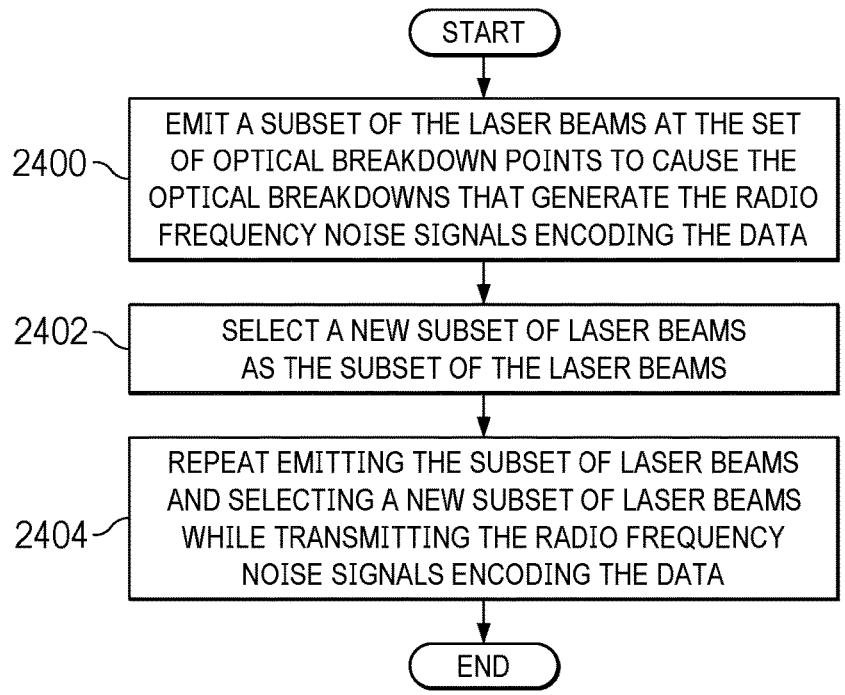
FIG. 24 is an illustration of a flowchart for controlling the emission of laser beams in points in accordance with an illustrative embodiment.

With reference next to FIG. 24, an illustration of a flowchart for controlling the emission of laser beams is depicted in points with an illustrative embodiment. The process illustrated in FIG. 24 is another example of an implementation for operation 2002 in FIG. 20.

The process begins by emitting a subset of the laser beams at the set of optical breakdown points to cause the optical breakdowns that generate the radio frequency noise signals encoding the data (operation 2400). The process selects a new subset of laser beams as the subset of the laser beams (operation 2402).

The process repeats emitting the subset of laser beams and selecting a new subset of laser beams while transmitting the radio frequency noise signals encoding the data (operation 2404). The process terminates thereafter. By using different subsets of the laser beams, identifying a location from which the laser beams originate can be made more difficult when the laser beams are emitted from different locations.

Figure 25:
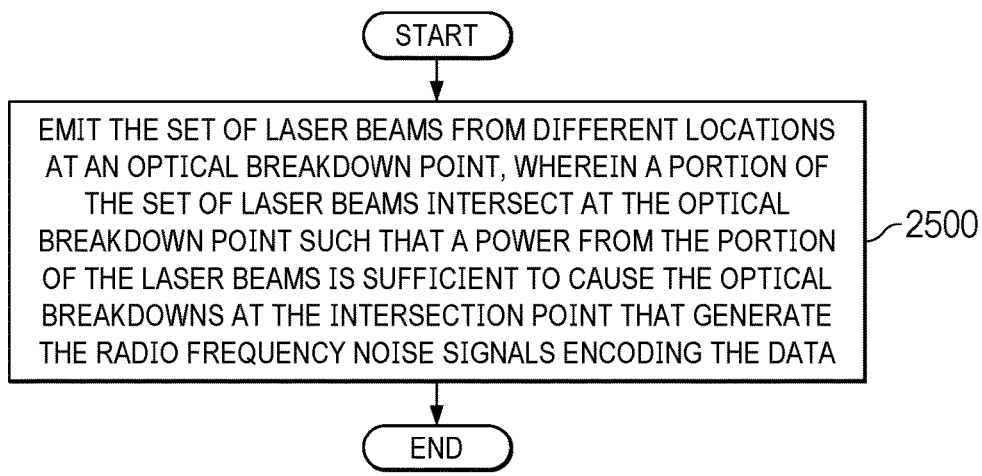
FIG. 25 is an illustration of a flowchart for controlling the emission of laser beams in points in accordance with an illustrative embodiment.

In FIG. 25, an illustration of a flowchart for controlling the emission of laser beams is depicted in points with an illustrative embodiment. The process illustrated in FIG. 25 is an example of an implementation for operation 2002 in FIG. 20.

The process emits the set of laser beams from different locations at an optical breakdown point, wherein a portion of the set of laser beams intersect at the optical breakdown point such that a power from the portion of the laser beams is sufficient to cause the optical breakdowns at the intersection point that generate the radio frequency noise signals encoding the data (operation 2500). The process terminates thereafter.

Figure 26:
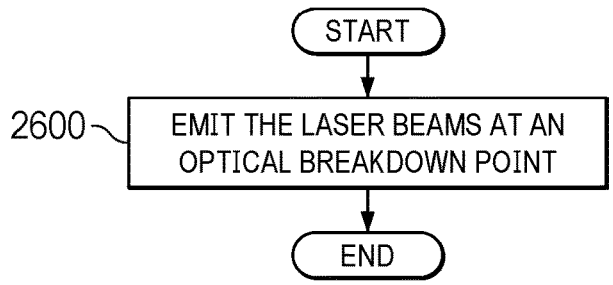
FIG. 26 is an illustration of a flowchart for controlling the emission of laser beams in points in accordance with an illustrative embodiment.

With reference to FIG. 26, an illustration of a flowchart for controlling the emission of laser beams is depicted in points with an illustrative embodiment. The process illustrated in FIG. 26 is an example of an implementation for operation 2002 in FIG. 20.

The process emits the laser beams at an optical breakdown point (operation 2600). The process terminates thereafter. In operation 2600, the optical breakdowns occur in response to all of the laser beams intersecting at the optical breakdown point.

Figure 27:
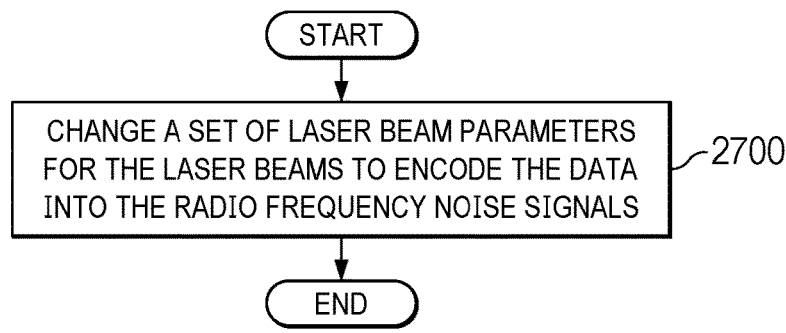
FIG. 27 is an illustration a flowchart for controlling laser beams in accordance with an illustrative embodiment.

With reference now to FIG. 27, an illustration a flowchart for controlling laser beams is depicted in accordance with an illustrative embodiment. The process illustrated in this figure is an example of an additional operation that can be performed with the operations in FIG. 20.

The process changes a set of laser beam parameters for the laser beams to encode the data into the radio frequency noise signals (operation 2700). The process terminates thereafter. In operation of 2700, changing the set of laser beam parameters changes a set of radio frequency characteristics for the radio frequency noise signals. The set of radio frequency characteristics is selected from at least one of a timing, an optical breakdown point, an amplitude of the radio frequency noise signals, or other characteristics of the radio frequency noise signals.

Figure 28:
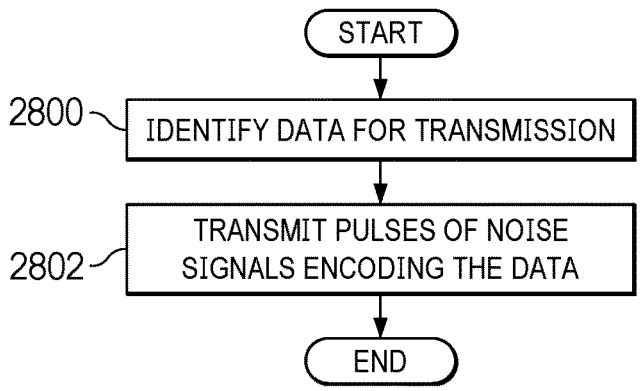
FIG. 28 is an illustration of a flowchart for communicating data in accordance with an illustrative embodiment.

In this illustrative example, FIGS. 28-35 are flowcharts illustrating operations that can be performed to encode data in noise signals. Turning first to FIG. 28, an illustration of a flowchart for communicating data is depicted in accordance with an illustrative embodiment. The process in FIG. 28 can be implemented in hardware, software, or both. When implemented in software, the process can take the form of program instructions that is run by one of more processor units located in one or more hardware devices in one or more computer systems. For example, the process can be implemented in communications manager 912 in computer system 910 in FIG. 9.

The process begins by identifying data for transmission (operation 2800). The process transmits pulses of noise signals encoding the data (operation 2802). The process terminates thereafter. The pulses of noise signals can be selected from at least one of electromagnetic frequency signals, radio frequency signals, microwave frequency signals, audio frequency signals, ultrasonic frequency signals, ultra-low frequency signals, very low frequency signals, underwater frequency signals, or optical frequency signals.

In operation 2802, the pulses of radio frequency noise signals can be transmitted in a number of different ways. For example, these pulses of noise signals can be radio frequency noise signals transmitted from a physical antenna. In another illustrative example, the pulses of noise signals can be transmitted using optical breakdowns generated by laser beams. The optical breakdowns can be controlled to generate pulses of noise signals in the form of radio frequency noise signals.

The noise signals can be generated using at least one of a laser generation system that emits lasers to cause optical breakdown that generates the noise signal or an electric noise generator. The noise in the noise signal can be selected from at least one of nondeterministic noise or pseudo random noise.

Figure 29:
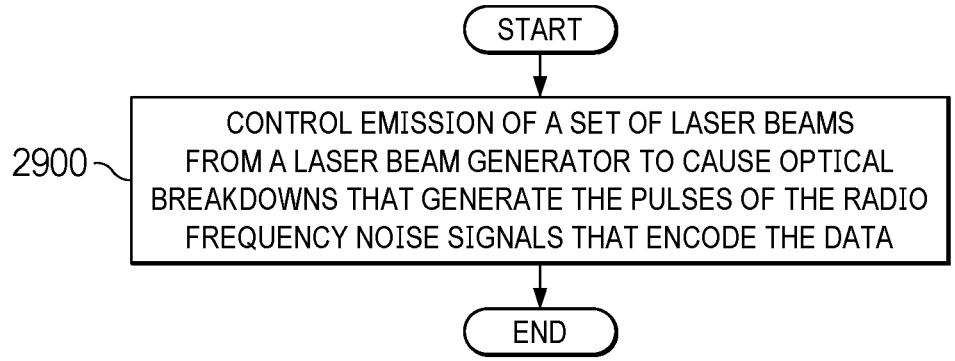
FIG. 29 is an illustration of a flowchart for transmitting pulses of noise signals in accordance with an illustrative embodiment.

Turning to FIG. 29, an illustration of a flowchart for transmitting pulses of noise signals is depicted in accordance with an illustrative embodiment. This flowchart is an example of an implementation for operation 2802 in FIG. 28. In this example, the pulses of noise signals can be pulses of radio frequency noise signals.

The process controls emission of a set of laser beams from a laser beam generator to cause optical breakdowns that generate the pulses of the radio frequency noise signals that encode the data (operation 2900). The process terminates thereafter.

Figure 30:
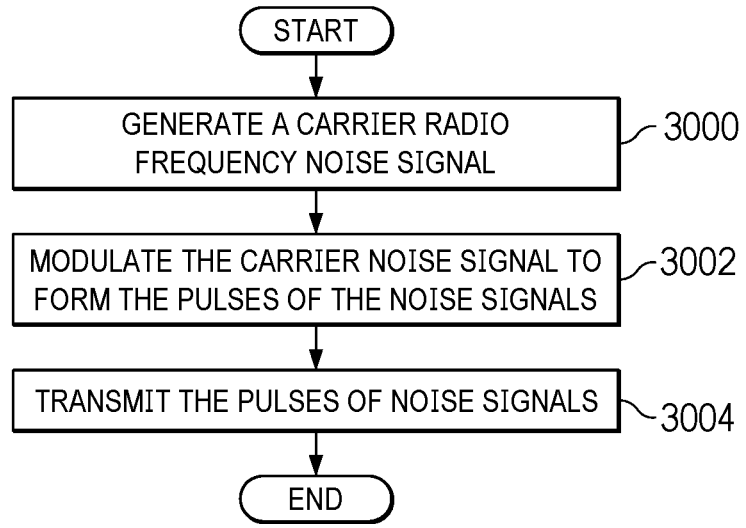
FIG. 30 is another illustration of a flowchart for transmitting pulses of noise signals in accordance with an illustrative embodiment.

With reference next to FIG. 30, another illustration of a flowchart for transmitting pulses of noise signals is depicted in accordance with an illustrative embodiment. This flowchart is an example of an implementation for operation 2802 in FIG. 28.

The process begins by generating a carrier radio frequency noise signal (operation 3000). The process modulates the carrier noise signal to form the pulses of the noise signals (operation 3002). In operation 3002, the pulses encode the data.

The process transmits the pulses of noise signals (operation 3004). The process terminates thereafter.

Figure 31:
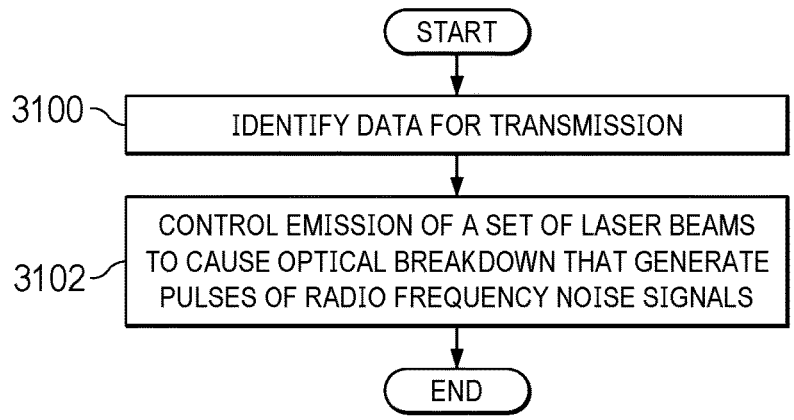
FIG. 31 is an illustration of a flowchart for communicating data in accordance with an illustrative embodiment.

Turning now to FIG. 31, an illustration of a flowchart for communicating data is depicted in accordance with an illustrative embodiment. The process in FIG. 31 can be implemented in hardware, software, or both. When implemented in software, the process can take the form of program instructions that is run by one of more processor units located in one or more hardware devices in one or more computer systems. For example, the process can be implemented in communications manager 912 in computer system 910 in FIG. 9.

The process begins by identifying data for transmission (operation 3100). The process controls emission of a set of laser beams to cause optical breakdown that generate pulses of radio frequency noise signals (operation 3102). The process terminates thereafter. In operation 3100, the data can be encoded in the pulses of the radio frequency noise signals.

Figure 32:
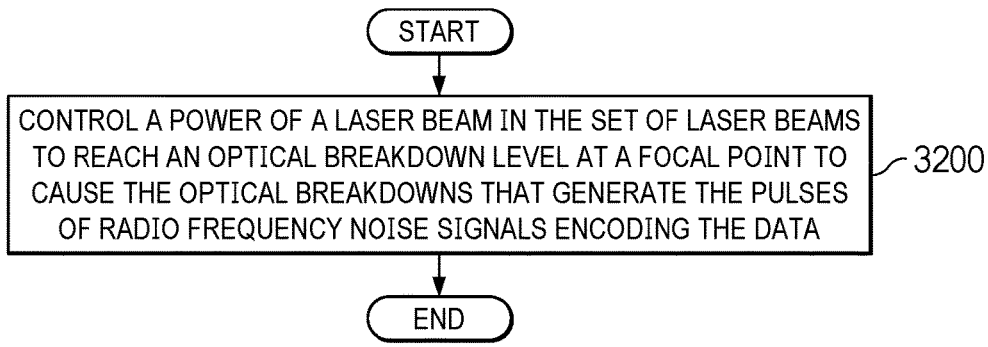
FIG. 32 is an illustration of a flowchart of a process for controlling the emission of a set of one or more beams in accordance with an illustrative embodiment.

With reference to FIG. 32, an illustration of a flowchart of a process for controlling the emission of a set of laser beams is depicted in accordance with an illustrative embodiment. The process in this flowchart is an example of an implementation for operation 3102 in FIG. 31.

The process controls a power of a laser beam in the set of laser beams to reach an optical breakdown level at a focal point to cause the optical breakdowns that generate the pulses of radio frequency noise signals encoding the data (operation 3200). The process terminates thereafter.

Figure 33:
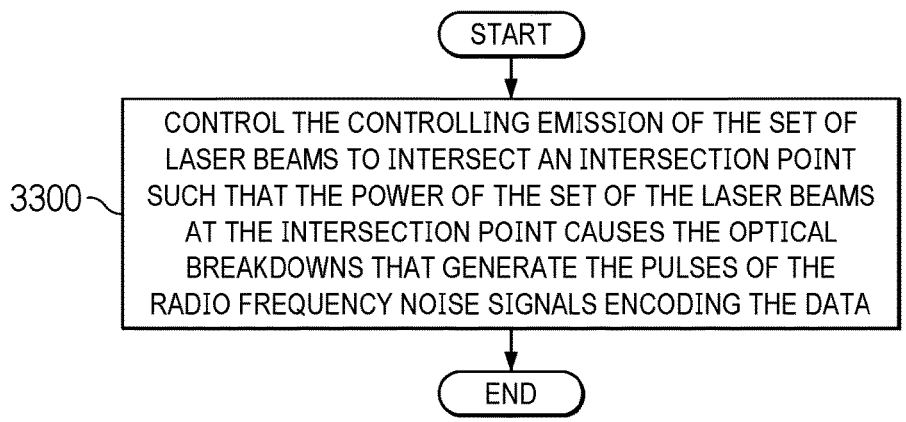
FIG. 33 is an illustration of a flowchart of a process for controlling the emission of a set of one or more beams in accordance with an illustrative embodiment.

Turning next to FIG. 33, an illustration of a flowchart of a process for controlling the emission of a set of laser beams is depicted in accordance with an illustrative embodiment. The process in this flowchart is an example of an implementation for operation 3102 in FIG. 31.

The process controls the controlling emission of the set of laser beams to intersect an intersection point such that the power of the set of the laser beams at the intersection point causes the optical breakdowns that generate the pulses of the radio frequency noise signals encoding the data (operation 3300). The process terminates thereafter.

Figure 34:
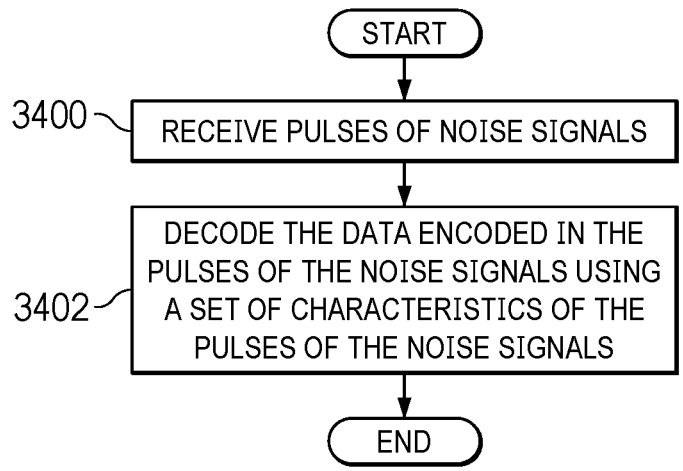
FIG. 34 is an illustration of a flowchart for communicating data in accordance with an illustrative embodiment.

In FIG. 34, an illustration of a flowchart for communicating data is depicted in accordance with an illustrative embodiment. The process in FIG. 34 can be implemented in hardware, software, or both. When implemented in software, the process can take the form of program instructions that is run by one of more processor units located in one or more hardware devices in one or more computer systems. For example, the process can be implemented in communications manager 912 in computer system 910 in FIG. 9.

The process begins by receiving pulses of noise signals (operation 3400). In operation 3400, data is encoded in the pulses of noise signals.

The process decodes the data encoded in the pulses of the noise signals using a set of characteristics of the pulses of the noise signals (operation 3402). The process terminates thereafter. In operation 3402, the set of characteristics comprises at least one of a timing of the pulses of noise, an amplitude of the pulses of noise, a duration of the pulses of noise, or some other characteristic.

Figure 35:
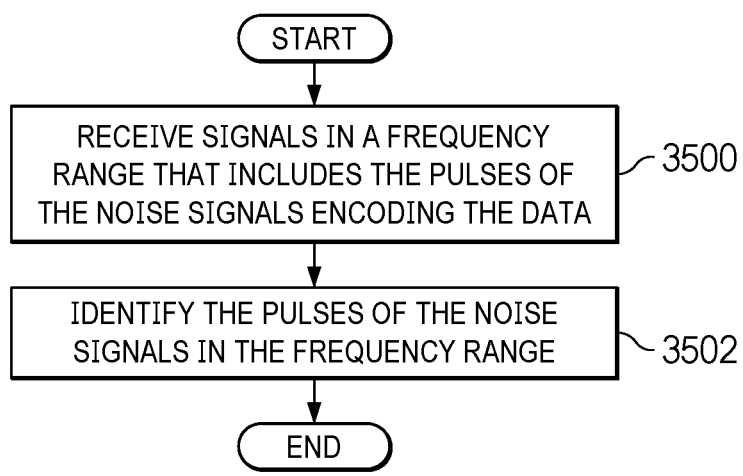
FIG. 35 is an illustration of a flowchart for decoding data in accordance with an illustrative embodiment.

With reference now to FIG. 35, an illustration of a flowchart for decoding data is depicted in accordance with an illustrative embodiment. The process depicted in this flowchart is an example of an implementation for operation 3402 in FIG. 34.

The process begins by receiving signals in a frequency range that includes the pulses of the noise signals encoding the data (operation 3500). In operation 3500, the signals in the frequency range can be received using at least one of a bandpass filter, a notch filter, a band reject filter, a low-pass filter, or a high-pass filter.

The process identifies the pulses of the noise signals in the frequency range (operation 3502). The process terminates thereafter. In operation 3502, the pulses of the noise signals in the frequency range can be identified using an envelope detector.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, the illustrative examples provide a method, apparatus, and system for transmitting radio frequency signals using a transmission system in which a physical antenna is absent. Optical breakdowns are generated by laser beams in which the optical breakdowns create plasma. The plasma results in radio frequency noise signals. The optical breakdowns can be controlled to encode data in the radio frequency noise signals. The locations of these optical breakdowns are radio frequency source emitters in the depicted examples.

Further, these radio frequency source emitters can be moved to different locations by repositioning the laser beams such that the laser beams point at different optical breakdown points. Attacks at these locations are in essence attacks at the optical breakdown points where the plasma is generated.

As a result, kinetic attacks against these locations are useless because no physical infrastructure is present at the locations. Further, the laser modulation sources are remote from the locations of these radio frequency source emitters. These optical breakdowns can occur at a location that is remote from the laser source.

Further, the illustrative examples can encode data using noise signals. The use of noise signals is in contrast to the use of sinusoidal signals as a carrier signal to encode data. With the encoding of data in pulses of noise signals, issues with detection and interference in transmitting data encoded using sinusoidal carriers can be reduced.

The following Figures provide examples of some types of noise modulation that can be performed in accordance with one or more illustrative examples. Some examples of noise modulation that can be performed include analog amplitude noise modulation (AANM), analog frequency noise modulation (AFNM), analog frequency amplitude noise color modulation (AFANCM), and analog phase noise modulation (APNM).

Figure 36:
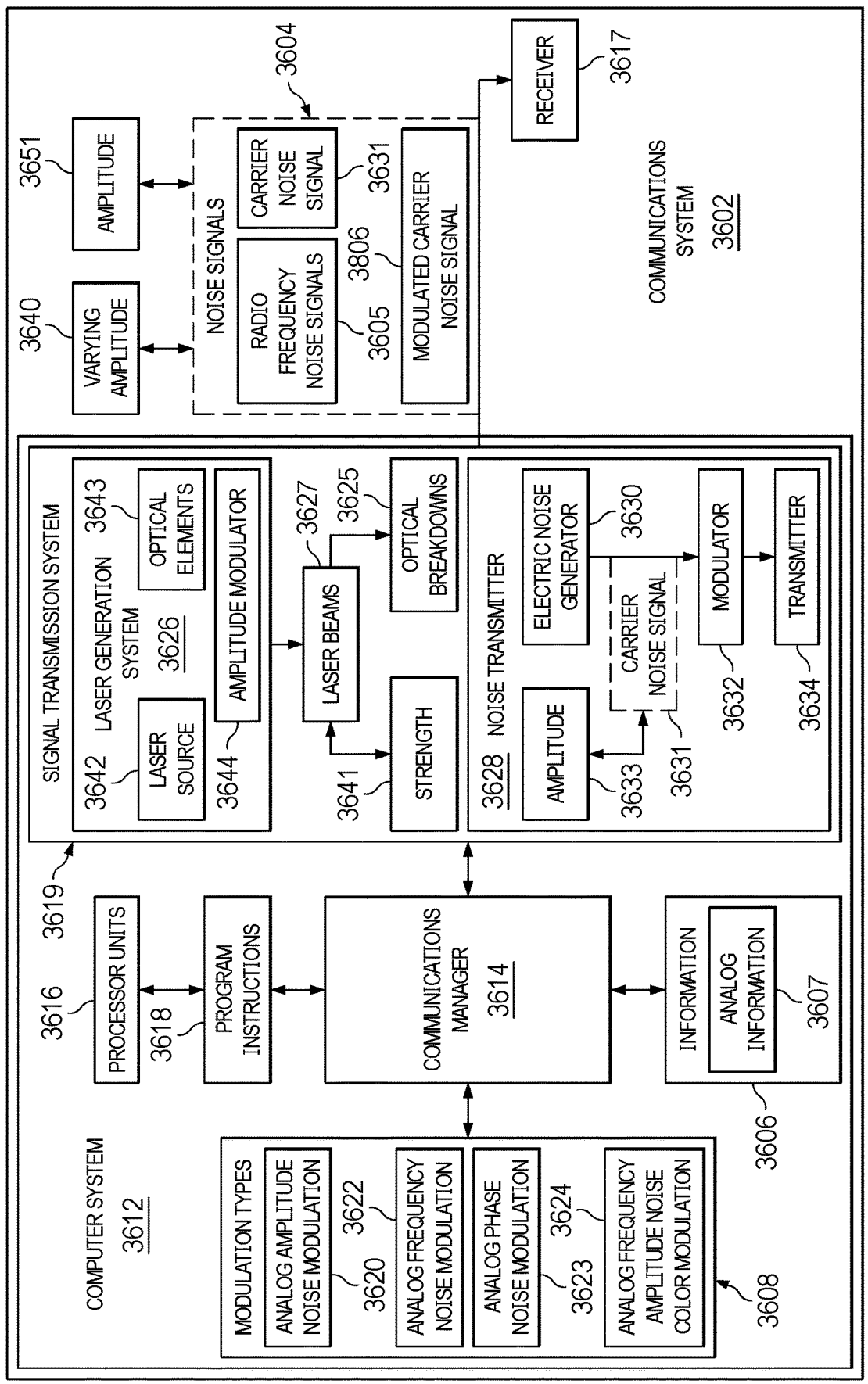
FIG. 36 is an illustration of a block diagram of a communication system in accordance with an illustrative embodiment.

With reference next to FIG. 36, an illustration of a block diagram of a communication system is depicted in accordance with an illustrative embodiment. In this illustrative example, communications system 3602 operates to modulate noise signals 3604 to correspond to information 3606. Noise signals 3604 are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

The modulation performed can be selected from a set of modulation types 3608. As depicted, communications system 3602 comprises computer system 3612, communications manager 3614, and signal transmission system 3619.

In the illustrative example, communications manager 3614 can be implemented in software, hardware, firmware or a combination thereof. When software is used, the operations performed by communications manager 3614 can be implemented in program instructions configured to run on hardware, such as a processor unit. When firmware is used, the operations performed by communications manager 3614 can be implemented in program instructions and data and stored in persistent memory to run on a processor unit.

When hardware is employed, the hardware may include circuits that operate to perform the operations in communications manager 3614. The circuits used to implement communications manager 3614 can take other forms in addition to or in place of a processor unit.

Computer system 3612 is a physical hardware system and includes one or more data processing systems. When more than one data processing system is present in computer system 3612, those data processing systems are in communication with each other using a communications medium. The communications medium can be a network. The data processing systems can be selected from at least one of a computer, a server computer, a tablet computer, or some other suitable data processing system.

As depicted, computer system 3612 includes a number of processor units 3616 that are capable of executing program instructions 3618 implementing processes in the illustrative examples. In other words, program instructions 3618 are computer-readable program instructions.

As used herein, a processor unit in the number of processor units 3616 is a hardware device and is comprised of hardware circuits such as those on an integrated circuit that respond to and process instructions and program code that operate a computer. When the number of processor units 3616 executes program instructions 3618 for a process, the number of processor units 3616 can be one or more processor units that are in the same computer or in different computers. In other words, the process can be distributed between processor units 3616 on the same or different computers in computer system 3612.

Further, the number of processor units 3616 can be of the same type or different type of processor units. For example, the number of processor units 3616 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, modulation types 3608 can be, for example, analog amplitude noise modulation (AANM) 3620, analog frequency noise modulation (AFNM) 3622, analog frequency amplitude noise color modulation (AFANCM) 3624, and analog phase noise modulation (APNM) 3623.

In this example, noise signals 3604 can be transmitted to receiver 3617 from signal transmission system 3619. In this illustrative example, noise signals 3604 are received by receiver 3617. Receiver 3617 is also depicted as part of communications system 3602. In yet other illustrative examples, receiver 3617 may be a separate component from communications system 3602.

Receiver 3617 is a hardware system and can include processes implemented in hardware or software that recover information 3606 from noise signals 3604.

In this illustrative example, signal transmission system 3619 can take a number of different forms. For example, signal transmission system 3619 can be implemented using at least one of laser generation system 3626 or noise transmitter 3628. Laser generation system 3626 can be implemented using laser generation systems as depicted in FIGS. 2-7. With laser generation system 3626, noise signals 3604 take the form of radio frequency noise signals 3605.

As depicted, noise transmitter 3628 can include electric noise generator 3630, modulator 3632, and transmitter 3634. In one illustrative example, noise transmitter 3628 can be implemented using a noise transmitter such as radio frequency transmitter 1002 as depicted in FIG. 10 and FIG. 11. In other illustrative examples, other types of noise transmitters can be used to transmit other types of noise signals 3604.

In the illustrative examples, the noise generator can be implemented to generate electrical noise and other forms other than radio frequency noise signals. As result, noise signals 3604 can take different forms and can be selected from at least one of noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

When using analog amplitude noise modulation 3620, communications manager 3614 identifies information 3606 in the form of analog information 3607 for transmission. Communications manager 3614 transmits noise signals 3604 with varying amplitude 3640 that thereby modulate noise signals 3604 to correspond to analog information 3607. In other words, the amplitude 3651 of noise signals 3604 can be varied such that the manner in which the amplitude varies is the same, similar, corresponding, or correlated pattern or information as analog information 3607.

In one illustrative example, noise signals 3604 take the form of radio frequency noise signals 3605. With this example, laser generation system 3626 is configured to emit a set of one or more laser beams 3627. As result, in transmitting noise signals 3604, communications manager 3614 controls emission of the set of one or more laser beams 3627 from laser generation system 3626 to cause and/or control optical breakdowns 3625 that generate radio frequency noise signals 3605 with varying amplitude 3640 that thereby modulate radio frequency noise signals 3605 to correspond to analog information 3607. In other words, analog information 3607 is encoded, transferred, transformed, and/or modulated into radio frequency noise signals 3605 based on different amplitudes for radio frequency noise signals 3605.

In controlling the emission of the set of one or more laser beams 3627, communications manager 3614 can control strength 3641 of the set of one or more laser beams 3627 emitted from laser generation system 3626 to cause and/or control optical breakdowns 3625 that generate radio frequency noise signals 3605 with varying amplitude 3640 that thereby modulate radio frequency noise signals 3605 to correspond to analog information 3607.

Communications manager 3614 can control strength 3641 of the set of one or more laser beams 3627 in a number of different ways. For example, strength 3641 of the set of one or more laser beams 3627 can be performed by controlling strength 3641 of the set of one or more laser beams 3627 emitted from laser source 3642 in laser generation system 3626. For example, current, voltage, or power control can be used with laser diodes in laser source 3642 to change strength 3641. In another example, pump source can be adjusted for laser source 3642 to change strength 3641.

In another illustrative example, communications manager 3614 can control strength 3641 of the set of one or more laser beams 3627 using a set of optical elements 3643 to cause optical breakdowns 3625 that generate radio frequency noise signals 3605 with varying amplitude 3640 that thereby modulate radio frequency noise signals 3605 to correspond to the analog information 3607. In this example, optical elements 3643 can include various fixed or adjustable elements such as a mirror, a lens, a focal focusing lens, or other optical element that can be adjusted to change strength 3641.

In yet another illustrative example, communications manager 3614 can control strength 3641 of the set of one or more laser beams 3627 using amplitude modulator 3644 in laser generation system 3626. In this example, amplitude modulator 3644 can modulate the amplitude, power, or intensity of the set of one or more laser beams 3627 emitted by laser source 3642.

In another illustrative example, communications manager 3614 can transmit analog information 3607 using noise transmitter 3628 in signal transmission system 3619. With this example, electric noise generator 3630 is configured to generate a carrier noise signal 3631.

With this example, in generating noise signals 3604, communications manager 3614 generates carrier noise signal using electric noise generator 3630. Communications manager 3614 modulates amplitude 3633 of carrier noise signal 3631 using modulator 3632 to vary carrier noise signal 3631 with varying amplitude 3640 that thereby modulates carrier noise signal 3631 to correspond and/or correlate, directly or indirectly, to analog information 3607. Communications manager 3614 transmits this carrier noise signal 3631 with varying amplitude 3640 as noise signals 3604 using transmitter 3634.

Figure 37:
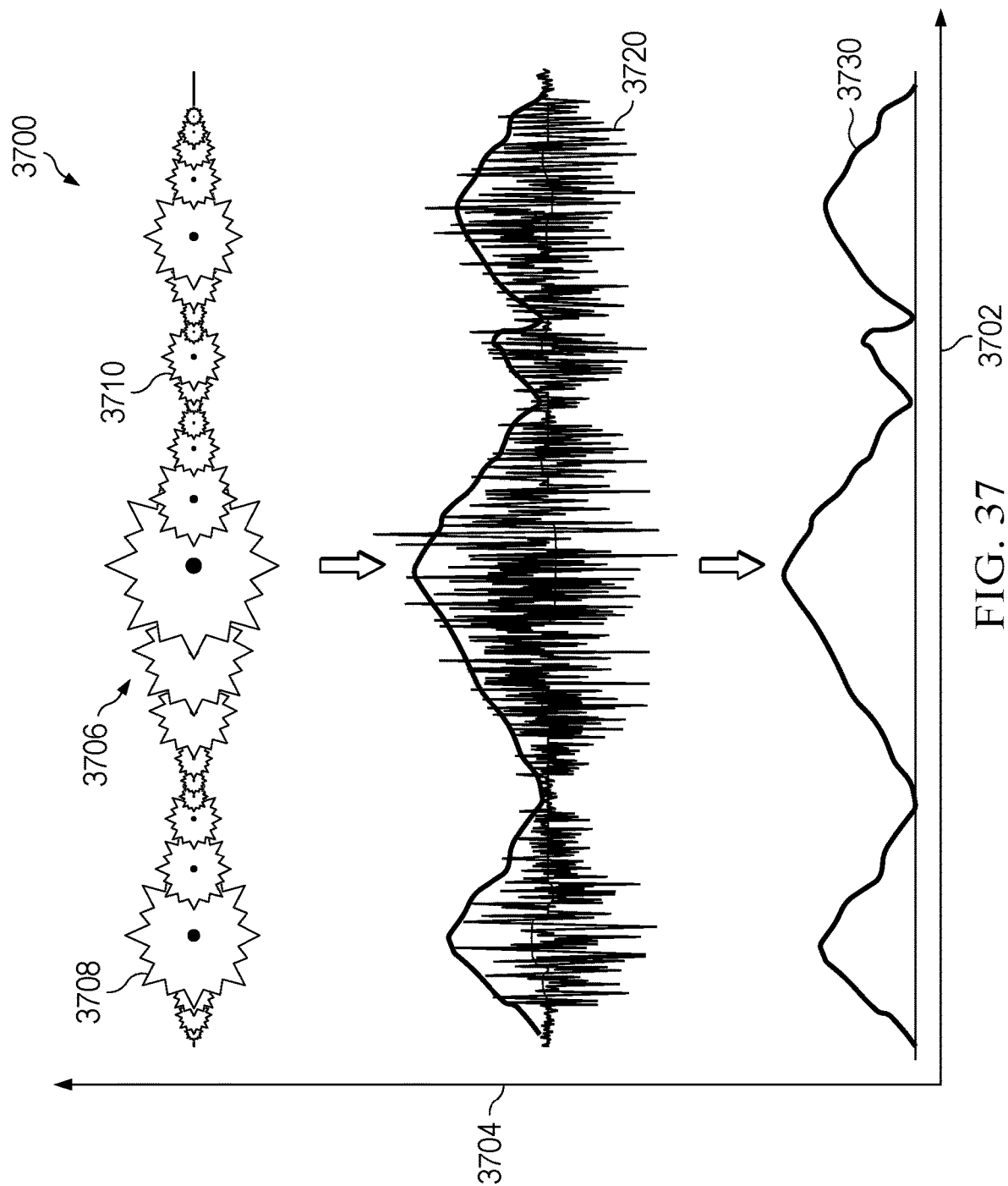
FIG. 37 is an illustration of information flow depicting transmitting analog information with analog amplitude noise modulation using a laser generation system in accordance with an illustrative embodiment.

Turning next to FIG. 37, an illustration of information flow for transmitting analog information with analog amplitude noise modulation using a laser generation system is depicted in accordance with an illustrative embodiment. In this example, information flow 3700 can be implemented using laser generation system 3626 in signal transmission system 3619 for communications system 3602 in FIG. 36. In this example, x-axis 3702 represents time for optical breakdowns and noise signals while y-axis 3704 represents a strength or amplitude for noise signals in information flow 3700.

As depicted, optical breakdowns 3706 are generated with varying amplitude based on the analog information to be transmitted. As previously described, these optical breakdowns are plasma generated using laser generation system 3626. Each optical breakdown in optical breakdowns 3706 is a plasma event generated by the set of one or more laser beams 3627 emitted by laser generation system 3626 in FIG. 36.

In this illustrative example, different optical breakdowns in optical breakdowns 3706 have different sizes, strengths, amplitudes, or powers. For example, optical breakdown 3708 is larger in size, strength, amplitude, or power than optical breakdown 3710. The sizes, amplitudes, strengths, or powers of optical breakdowns 3706 is controlled through controlling amplitude, power, or strength 3641 of the set of one or more laser beams 3627. As depicted, the optical breakdowns are generated such that individual laser pulses in the optical breakdowns 3706 merge, overlap, or combine with each other in this example to achieve a continuously varying analog amplitude, power, or strength.

The result of these optical breakdowns is radio frequency noise signals 3720 and radio frequency noise signals 3605 as depicted in FIG. 36. As depicted, these radio frequency signals have varying amplitude that are modulated to correspond to the analog information being transmitted.

Analog signals 3730 can be recovered in response to receiver 3617 receiving radio frequency noise signals 3720 and radio frequency noise signals 3605 as depicted in FIG. 36. Thus, laser generation system 3626 is an example of one manner in which signal transmission system 3619 can transmit analog information 3607 in noise signals comprising radio frequency noise signals with varying amplitude.

Figure 38:
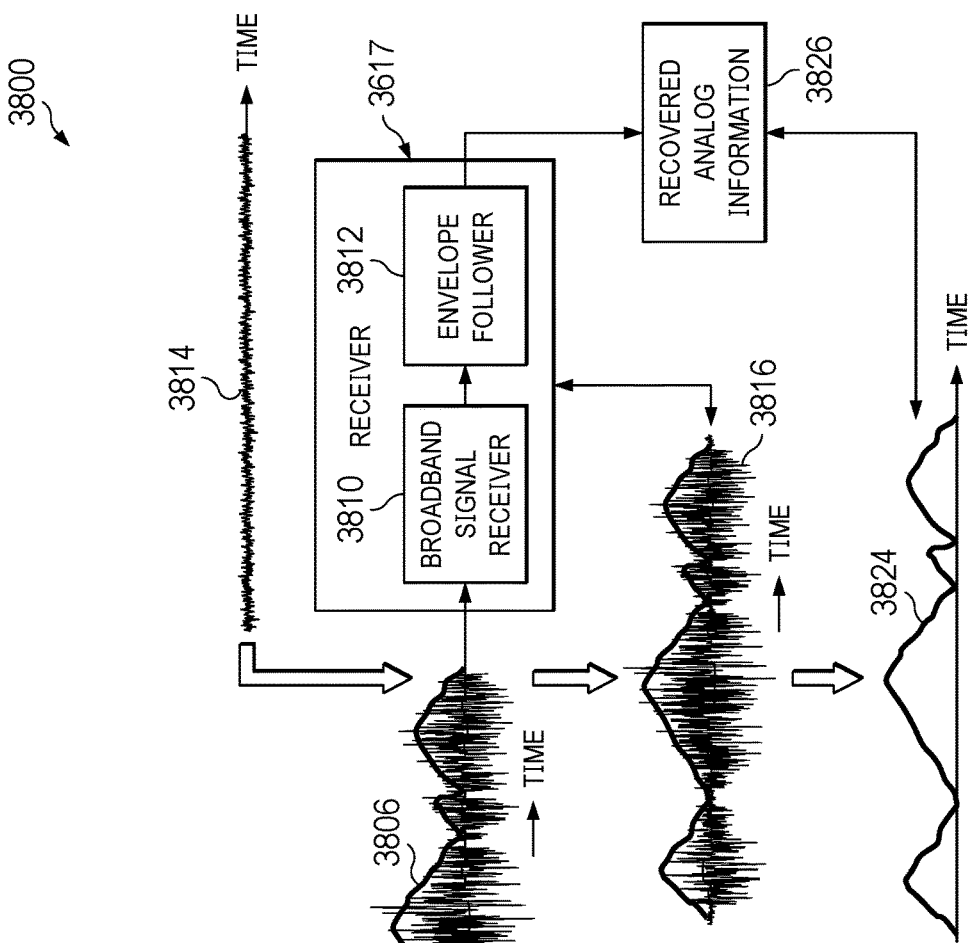
FIG. 38 is an illustration demonstrating transmitting analog information with analog amplitude noise modulation using a noise transmitter in accordance with an illustrative embodiment.

Turning next to FIG. 38, an illustration information flow for demonstrating transmitting analog information with analog amplitude noise modulation using a noise transmitter is depicted in accordance with an illustrative embodiment. In the illustrative examples, the same reference numeral may be used in more than one figure. This reuse of a reference numeral in different figures represents the same element in the different figures.

In this example, information flow 3800 can be implemented using noise transmitter 3628 in signal transmission system 3619 for communications system 3602 in FIG. 36.

As depicted in this example, analog signal 3802 is an example of analog information 3607 that is to be transmitted using analog amplitude modulation. In this example, electric noise generator 3630 generates carrier noise signal 3804. In this example, modulator 3632 is an amplitude modulator that modulates carrier noise signal 3804 with analog signal 3802. This modulation causes carrier noise signal 3804 to vary in amplitude in a manner that results in carrier noise signal with varying amplitude 3640 that is transmitted by transmitter 3634. This carrier noise signal with varying amplitude 3640 is transmitted by transmitter 3634 as modulated carrier noise signal 3806. Modulated carrier noise signal 3806 has a varying amplitude. This modulated carrier noise signal has an amplitude that varies in a manner that corresponds to or correlates with, directly or indirectly, with analog signal 3802.

As depicted, receiver 3617 includes broadband signal receiver 3810 and envelope follower 3812. Broadband signal receiver 3810 is a hardware device that is configured to receive and process signals across a wide range of frequencies. In this example, broadband signal receiver 3810 receives modulated carrier noise signal 3806 with varying amplitude. In addition, broadband signal receiver 3810 also receives noise 3814. Noise 3814 represents the normal noise floor that can be present when receiving signals. This reception of modulated carrier noise signal 3806 and noise 3814 results in received signal 3816. As depicted, received signal 3816 is a combination of modulated carrier noise signal 3806 and noise 3814. In this example, envelope follower 3812 can detect amplitude variations in received signal 3816 to generate a signal having a shape that resembles, corresponds, or correlates to, directly or indirectly, those variations. In this example, the signal is recovered analog information signal 3824 for recovered analog information 3826. In this example, envelope follower 3812 is implemented using envelope follower 1414 as depicted in FIG. 14 and FIG. 15B. As depicted in this example, recovered analog information signal 3824 for recovered analog information 3826 has the same or similar shape as analog signal 3802 for analog information 3607.

Figure 39:
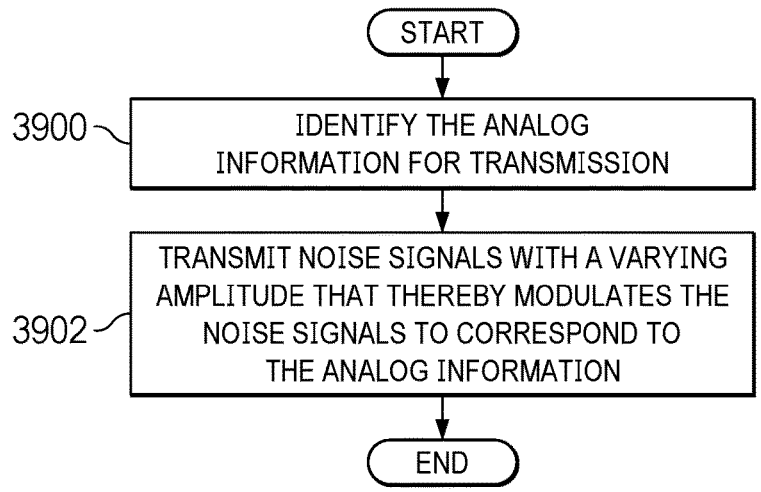
FIG. 39 is an illustration of a flowchart for communicating analog information in accordance with an illustrative embodiment.

Turning now to FIG. 39, an illustration of a flowchart for communicating analog information is depicted in accordance with an illustrative embodiment. The process in FIG. 39 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 36.

The process begins by identifying the analog information for transmission (operation 3900). The process transmits noise signals with a varying amplitude that thereby modulates the noise signals to correspond to the analog information (operation 3902). In other words, the varying amplitude of the analog information is used to modulate the noise signals to correspond to or correlate to, directly or indirectly, the analog information. The process terminates thereafter.

Figure 40:
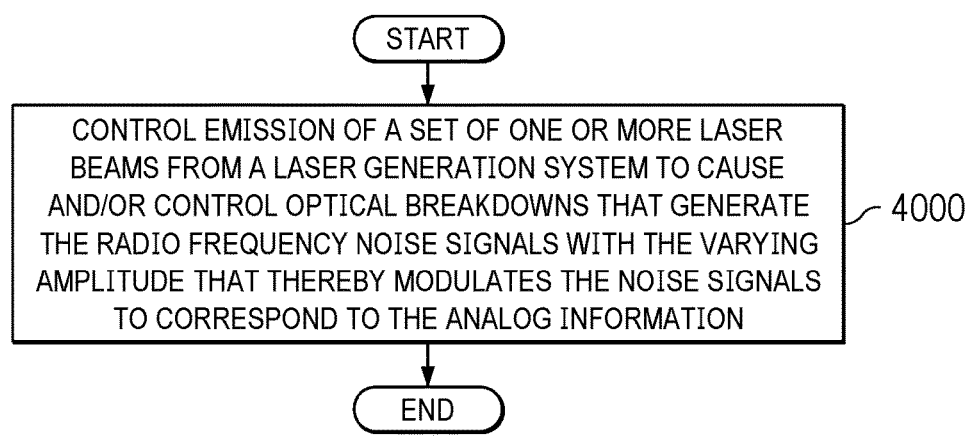
FIG. 40 is an illustration of a flowchart of a process for transmitting noise signals using a laser generation system in accordance with an illustrative embodiment.

With reference next to FIG. 40, an illustration of flowchart of a process for transmitting noise signals using a laser generation system is depicted in accordance with an illustrative embodiment. The process in this figure is an example of an implementation for operation 3902 in FIG. 39. In this example, the noise signals are radio frequency noise signals.

The process controls emission of a set of one or more laser beams from a laser generation system to cause and/or control optical breakdowns that generate the radio frequency noise signals with the varying amplitude that thereby modulates the noise signals to correspond to the analog information (operation 4000). The process terminates thereafter.

In other words, the varying amplitude of the analog information is used to control the emissions of the set of laser beams to cause and/or control optical breakdowns that generate the radio frequency noise signals and/or optical signals including visible and/or non-visible light. The varying amplitude is used to control these emissions which thereby modulates the noise signals to correspond to or correlate with, directly or indirectly, the analog information. In other words, the control of the emissions of the set of one or more laser beams does not necessarily correlate exactly to the varying analog amplitude. In alternative examples, the control of the emissions of the set of the one or more laser beams may be modified in such a way that the final output noise modulated signal most closely corresponds to original analog input signal such that it may be received with minimum distortion by a receiver 3617 in FIG. 36.

Figure 41:
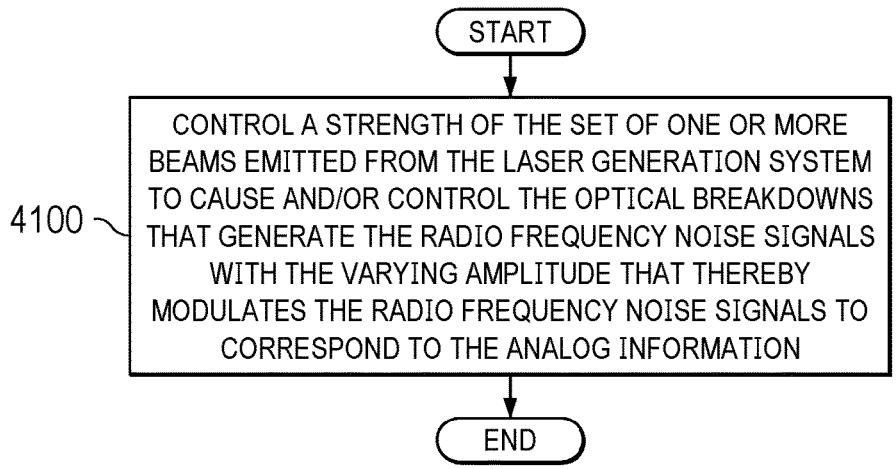
FIG. 41 is an illustration of a flowchart of a process for controlling emission of a set of one or more laser beams in accordance with an illustrative embodiment.

Next in FIG. 41, an illustration of a flowchart of a process for controlling emission of a set of one or more laser beams is depicted in accordance with an illustrative embodiment. The process in this figure is an example of an implementation for operation 4000 in FIG. 40.

The process controls a strength of the set of one or more beams emitted from the laser generation system to cause and/or control the optical breakdowns that generate the radio frequency noise signals with the varying amplitude that thereby modulates the radio frequency noise signals to correspond to the analog information (operation 4100). The process terminates thereafter.

Figure 42:
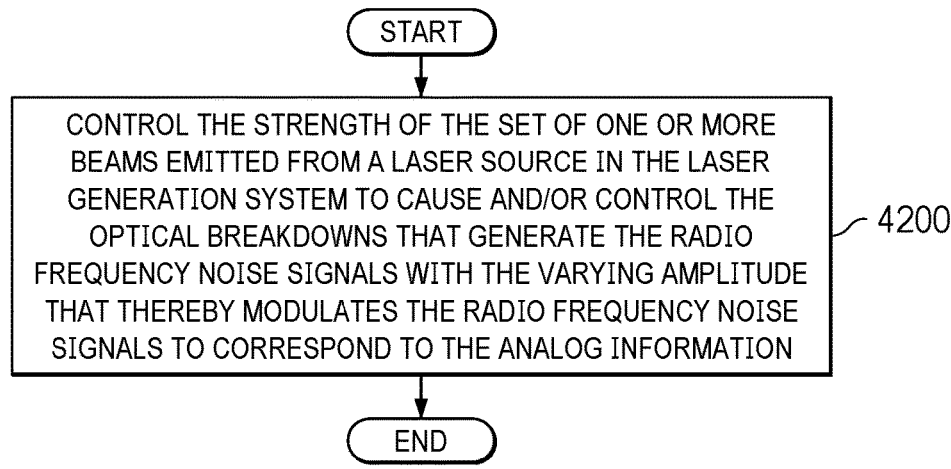
FIG. 42 is an illustration of a flowchart of a process for controlling emission of a set of one or more laser beams in accordance with an illustrative embodiment.

With reference now to FIG. 42, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more beams emitted from a laser source in the laser generation system to cause and/or control the optical breakdowns that generate the radio frequency noise signals with the varying amplitude that thereby modulates the radio frequency noise signals to correspond to the analog information (operation 4200). The process terminates thereafter.

Figure 43:
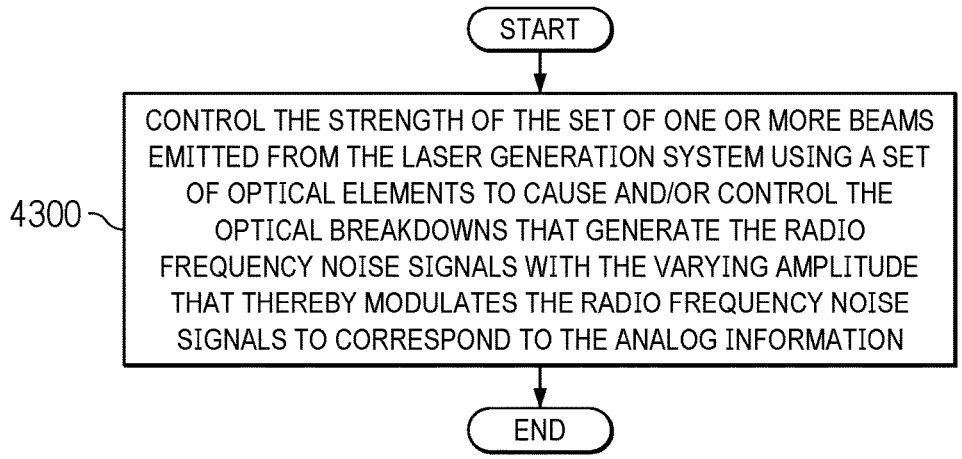
FIG. 43 is an illustration of a flowchart of a process for controlling emission of a set of one or more laser beams in accordance with an illustrative embodiment.

Next FIG. 43, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more beams emitted from the laser generation system using a set of optical elements to cause and/or control the optical breakdowns that generate the radio frequency noise signals with the varying amplitude that thereby modulates the radio frequency noise signals to correspond to the analog information (operation 4300). The process terminates thereafter.

Figure 44:
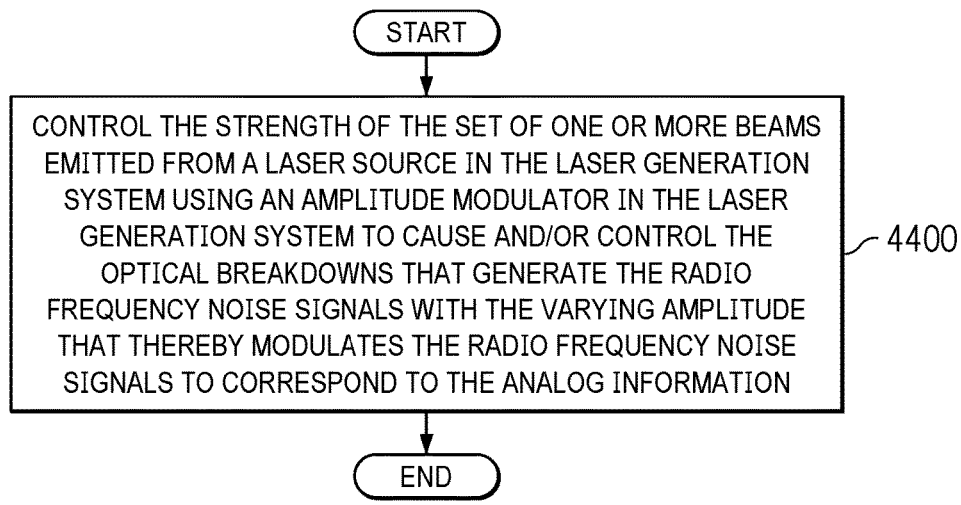
FIG. 44 is an illustration of a flowchart of a process for controlling emission of a set of one or more laser beams in accordance with an illustrative embodiment.

With reference now to FIG. 44, an illustration of a flowchart of a process for controlling emission of a set of one or more laser beams is depicted in accordance with an illustrative embodiment. The process in this figure is an example of an implementation for operation 4100 in FIG. 41.

The process controls the strength of the set of one or more beams emitted from a laser source in the laser generation system using an amplitude modulator in the laser generation system to cause and/or control the optical breakdowns that generate the radio frequency noise signals with the varying amplitude that thereby modulates the radio frequency noise signals to correspond to the analog information (operation 4400). The process terminates thereafter.

Figure 45:
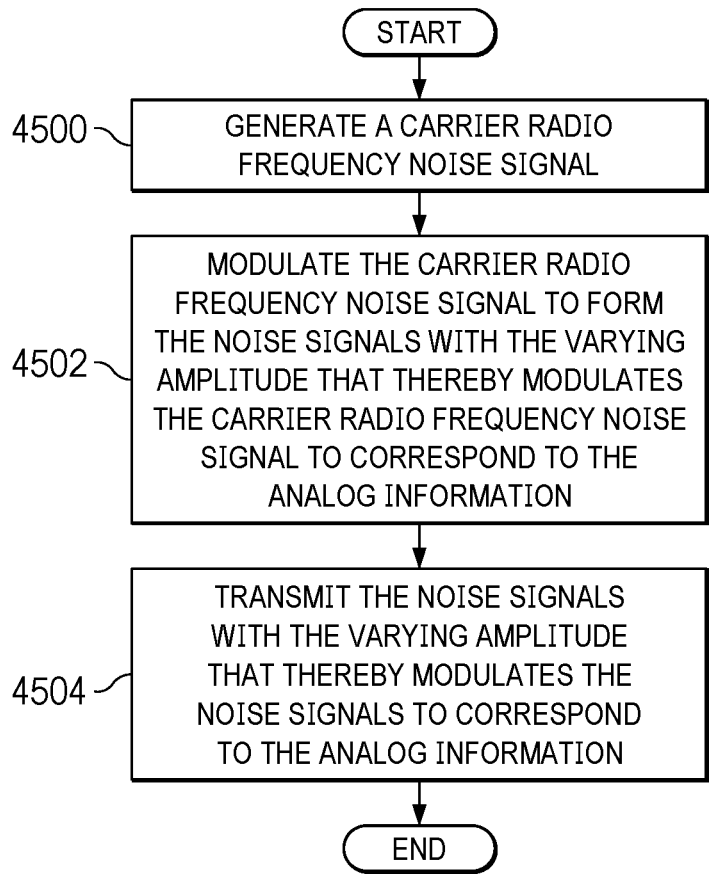
FIG. 45 is an illustration of a flowchart of a process for transmitting noise signals in accordance with an illustrative embodiment.

With reference now to FIG. 45, an illustration of a flowchart of a process for transmitting noise signals is depicted in accordance with an illustrative embodiment. The process in this figure is an example of an implementation for operation 3902 in FIG. 39.

The process begins by generating a carrier radio frequency noise signal (operation 4500). The process modulates the carrier radio frequency noise signal to form the noise signals with the varying amplitude that thereby modulates the carrier radio frequency noise signal to correspond to the analog information (operation 4502).

The process transmits the noise signals with the varying amplitude that thereby modulates the noise signals to correspond to the analog information (operation 4504). The process terminates thereafter.

Figure 46:
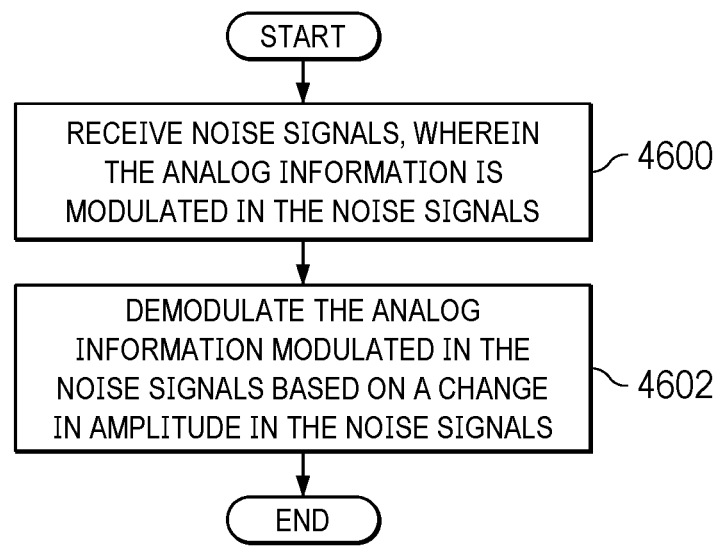
FIG. 46 is an illustration of a flowchart of process for communicating analog information in accordance with an illustrative.

Turning next to FIG. 46, an illustration of a flowchart of process for communicating analog information is depicted in accordance with an illustrative. The process in FIG. 46 can be implemented in hardware, software, or both. When implemented in software, the process can take the form of program instructions that are run by one or more processor units located in one or more hardware devices in one or more computer systems. For example, the process can be implemented in receiver 3617 in FIG. 36.

The process begins by receiving noise signals, wherein the analog information is modulated in the noise signals (operation 4600). The process demodulates the analog information modulated in the noise signals based on a change in amplitude in the noise signals (operation 4602). The process terminates thereafter.

Some features of the illustrative examples for modulating analog information 3607 using analog amplitude noise modulation 3620 in communications system 3602 are described in the following clauses. These clauses are examples of features and are not intended to limit other illustrative examples.

1. A communications system comprising:
   a computer system; and
   a communications manager in the computer system, wherein the communications manager is configured to:
   identify analog information for transmission; and
   transmit noise signals with a varying amplitude that thereby modulate the noise signals to correspond to the analog information.

2. The communications system of clause 1, wherein the noise signals are radio frequency noise signals, and further comprising:
   a laser generation system configured to emit a set of one or more laser beams, wherein in transmitting the noise signals, the communications manager is configured to:
   control an emission of the set of one or more laser beams from the laser generation system to control optical breakdowns that generate the radio frequency noise signals with the varying amplitude that thereby modulate the radio frequency noise signals to correspond to the analog information.

3. The communications system of clause 2, wherein in controlling the emission of the set of one or more laser beams, the communication manager is configured to:
   control a strength of the set of one or more laser beams emitted from the laser generation system to control the optical breakdowns that generate the radio frequency noise signals with the varying amplitude that thereby modulate the radio frequency noise signals to correspond to the analog information.

4. The communications system of clause 3, wherein in controlling the strength of the set of one or more laser beams, the communication manager is configured to:
   control the strength of the set of one or more laser beams emitted from a laser source in the laser generation system to control the optical breakdowns that generate the radio frequency noise signals with the varying amplitude that thereby modulate the radio frequency noise signals to correspond to the analog information.

5. The communications system of clause 3, wherein in controlling the strength of the set of one or more laser beams, the communication manager is configured to:
   control the strength of the set of one or more laser beams emitted from the laser generation system using a set of optical elements to control the optical breakdowns that generate the radio frequency noise signals with the varying amplitude that thereby modulate the radio frequency noise signals to correspond to the analog information.

6. The communications system of clause 3, wherein in controlling the strength of the set of one or more laser beams, the communication manager is configured to:
   control the strength of the set of one or more laser beams emitted from the laser generation system using an amplitude modulator in the laser generation system to control the optical breakdowns that generate the radio frequency noise signals with the varying amplitude that thereby modulate the noise signals to correspond to the analog information.

7. The communications system of clause 1, further comprising:
an electrical noise generator configured to generate a carrier noise signal;
a modulator; and
a transmitter, wherein in generating the noise signals, the communications manager is configured to:
generate the carrier noise signal using the electrical noise generator; and
modulate an amplitude of the carrier noise signal using the modulator to vary the carrier noise signal with the varying amplitude that thereby modulates the carrier noise signal to correspond to the analog information.

8. The communications system of clause 1, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

9. A method for communicating analog information, the method comprising:
identifying the analog information for transmission; and
transmitting noise signals with a varying amplitude that thereby modulates the noise signals to correspond to the analog information.

10. The method of clause 9, wherein the noise signals are radio frequency noise signals, and wherein said transmitting the noise signals comprises:
controlling emission of a set of one or more laser beams from a laser generation system to control optical breakdowns that generate the radio frequency noise signals with the varying amplitude that thereby modulates the noise signals to correspond to the analog information.

11. The method of clause 10, wherein said controlling the emission of the set of one or more laser beams comprises:
controlling a strength of the set of one or more beams emitted from the laser generation system to control the optical breakdowns that generate the radio frequency noise signals with the varying amplitude that thereby modulates the radio frequency noise signals to correspond to the analog information.

12. The method of clause 11, wherein said controlling the strength of the set of one or more beams comprises:
controlling the strength of the set of one or more beams emitted from a laser source in the laser generation system to control the optical breakdowns that generate the radio frequency noise signals with the varying amplitude that thereby modulates the radio frequency noise signals to correspond to the analog information.

13. The method of clause 11, wherein said controlling the strength of the set of one or more beams comprises:
controlling the strength of the set of one or more beams emitted from the laser generation system using a set of optical elements to control the optical breakdowns that generate the radio frequency noise signals with the varying amplitude that thereby modulates the radio frequency noise signals to correspond to the analog information.

14. The method of clause 11, wherein said controlling the strength of the set of one or more beams comprises:
controlling the strength of the set of one or more beams emitted from a laser source in the laser generation system using an amplitude modulator in the laser generation system to control the optical breakdowns that generate the radio frequency noise signals with the varying amplitude that thereby modulates the radio frequency noise signals to correspond to the analog information.

15. The method of clause 9, wherein said transmitting the noise signals comprises:
generating a carrier radio frequency noise signal; and
modulating the carrier radio frequency noise signal to form the noise signals with the varying amplitude that thereby modulates the carrier radio frequency noise signal to correspond to the analog information; and
transmitting the noise signals with the varying amplitude that thereby modulates the noise signals to correspond to the analog information.

16. The method of clause 9, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

17. A method for communicating analog information, the method comprising:
receiving noise signals, wherein the analog information is modulated in the noise signals; and
demodulating the analog information modulated in the noise signals based on a change in amplitude in the noise signals.

18. The method of clause 17, wherein a receiver receives the noise signals and demodulates the noise signals.

Figure 47:
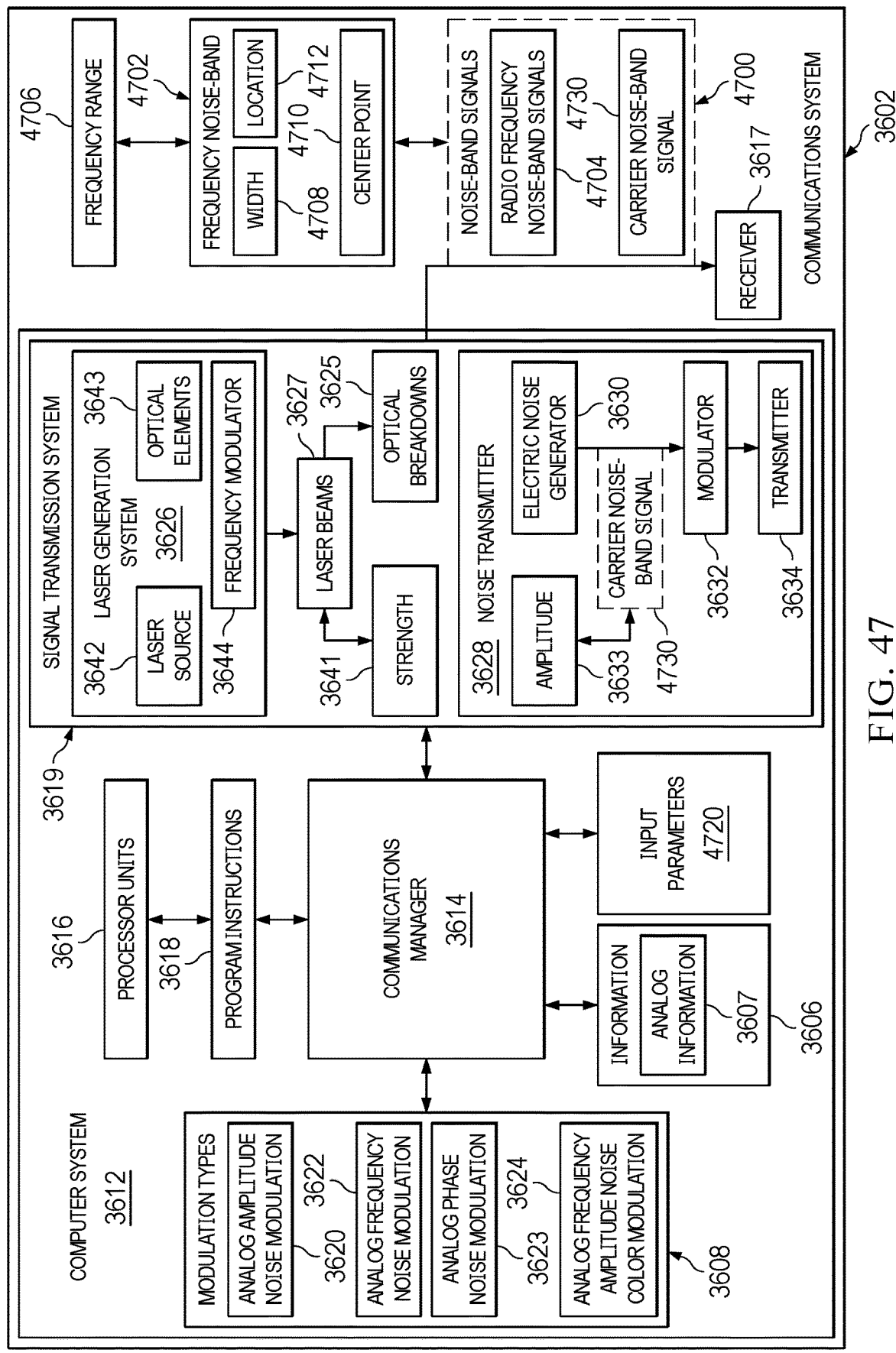
FIG. 47 is an illustration of a block diagram of a communication system for transmitting noise signals using analog frequency noise modulation in accordance with an illustrative embodiment.

Turning now to FIG. 47, an illustration of a block diagram of a communication system for transmitting noise signals using analog frequency noise modulation is depicted in accordance with an illustrative embodiment. In this illustrative example, communications system 3602 operates to modulate noise-band signals 4700 to correspond to information 3606 using analog frequency noise modulation 3622. Noise-band signals 4700 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, optical frequency noise signals including visible and/or non-visible light, or other types of noise signals.

In this example, communications manager 3614 identifies analog information 3607 for transmission. Additionally, communications manager 3614 transmits noise-band signals 4700 with changes in a frequency noise-band 4702 that thereby modulate the noise-band signals 4700 to correspond to analog information 3607. In other words, frequency noise-band 4702 of noise-band signals 4700 can be varied such that the manner in which the frequency noise-band 4702 varies corresponds to or correlates to, either directly or indirectly, the same or similar pattern as analog information 3607.

In other words, the control of the changes in a frequency noise-band does not necessarily correlate exactly to the varying analog information 3607. In alternative examples, the control of the changes in a frequency noise-band may be modified in such a way that the final output noise-modulated signal most closely corresponds to original analog information 3607 such that it may be received with minimum distortion by a receiver 3617 in FIG. 47.

In this example, frequency noise-band 4702 is a grouping of noise-band signals 4700. For example, frequency noise-band 4702 can be at least one of "clusters of noise," "noise spectra," noise spectrum," "a frequency band of noise," "a pass-band of noise," "a band-pass of noise," "a frequency range of noise," or a "noise frequency range" which can have a lower ½ power boundary and an upper half-power boundary". Frequency noise-band 4702 for noise-band signals 4700 can be changed in a manner that corresponds to analog information 3607. For example, noise-band signals 4700 can be modulated such that frequency noise-band 4702 changes in at least one of width 4708 (bandwidth or frequency bandwidth), location 4712, center point 4710, or 4 power boundary.

For example, frequency noise-band 4702 can be changed by changing frequency range 4706 of frequency noise-band 4702. In this example, the change in frequency range 4706 of frequency noise-band 4702 means that the boundaries of frequencies encompassed by frequency noise-band 4702 can change. This change in the boundaries of frequency range 4706 can change at least one of bandwidth or width 4708, location 4712, or center point 4710, of frequency noise-band 4702. In this manner, noise-band signals 4700 can be modulated to change frequency range 4706 of frequency noise-band 4702 of noise-band signals 4700 in a manner that causes noise-band signals 4700 to correspond to or correlate to, either directly or indirectly, analog information 3607.

In one illustrative example, this transmission can be performed by laser generation system 3626. With this example, communications manager 3614 controls an emission of a set of one or more laser beams 3627 from laser generation system 3626 to cause and/or control optical breakdowns 3625 that generate noise-band signals 4700 in the form of radio frequency noise-band signals 4704 with the changes in frequency range 4706 of frequency noise-band 4702 for radio frequency noise-band signals 4704 that thereby modulate the radio frequency noise-band signals 4704 to correspond to or correlate to, directly or indirectly, the analog information 3607. In this example, at least one of width 4708, location 4712, or center point 4710, of frequency range 4706 of frequency noise-band 4702 can be varied to cause radio frequency noise-band signals 4704 to correspond to analog information 3607.

In one illustrative example, communications manager 3614 controls the emission of the set of one or more laser beams 3627 by controlling the emission of the set of one or more laser beams 3627 from laser generation system 3626 to cause and/or control optical breakdowns 3625 that generate radio frequency noise-band signals 4704 by varying location 4712 of center point 4710 of frequency noise-band 4702 for radio frequency noise-band signals 4704. In this example, a variation of the location 4712 of center point 4710 of frequency noise-band 4702 for radio frequency noise-band signals 4704 thereby modulates radio frequency noise-band signals 4704 to correspond to analog information 3607.

Thus, in this example, center point 4710 can be moved back and forth to modulate radio frequency noise-band signals 4704 to correspond to analog information 3607. In other words, the modulation of center point 4710 of radio frequency noise-band 4710 for radio frequency noise-band signals 4704 is an example of one manner in which radio frequency noise-band 4702 can be modulated to cause and/or control radio frequency noise-band signals 4704 to correspond to analog information 3607.

In another example, communications manager 3614 can control the emission of the set of one or more laser beams 3627 from the laser generation system 3626 to cause and/or control optical breakdowns 3625 that generate radio frequency noise-band signals 4704 by varying width 4708 of frequency range 4706 of frequency noise-band 4702 for radio frequency noise-band signals 4704. In this example, a variation of width 4708 thereby modulates radio frequency noise-band signals 4704 to correspond to analog information 3607. In other words, the width or range of radio frequency noise-band signals 4704 in frequency noise-band 4702 can be increased and decreased to modulate radio frequency noise-band signals 4704 to correspond to analog information 3607.

In another example, communications manager 3614 controls a set of one or more input parameters 4720 for the emission of a set of one or more of laser beams 3627 from the laser generation system 3626 to cause and/or control optical breakdowns 3625 that generate radio frequency noise-band signals 4704 by varying frequency noise-band 4702. In this example, a variation of frequency noise-band 4702 of radio frequency noise-band signals 4704 thereby modulates radio frequency noise-band signals 4704 to correspond to or correlate with, directly or indirectly, analog information 3607.

With this example, the set of one or more input parameters 4720 can take a number of different forms. For example, the set of one or more input parameters 4720. The set of input parameters 4720 can for example be selected from one or more of, a mirror orientation, a deformable mirror position, a lens position, lens, a deformable lens position or some other element that can be positioned in a manner that changes an optical path length (OPL) for the set of one or more laser beams 3627. In this example, the path length change can be both the optical path length and the physical path length. Another input parameter that can be changed in this example is the index of refraction (IoR). The optical pathway is inversely proportional to the index of refraction.

These changes to input parameters 4720 can change frequency noise-band 4702 to radio frequency noise-band signals 4704. For example, changes can be made to at least one of width 4708 (bandwidth or frequency bandwidth) or location 4712 of frequency noise-band 4702 for radio frequency noise-band signals 4704.

In another example, communications manager 3614 can control noise transmitter 3628 in signal transmission system 3619 to transmit analog information 3607. For example, in generating noise-band signals 4700, communications manager 3614 can generate carrier noise-band signal 4730 using electric noise generator 3630. Communications manager 3614 can modulate carrier noise-band signal 4730 using modulator 3632 to change frequency noise-band 4702 for carrier noise-band signal 4730. Changes in frequency range 4706 of frequency noise-band 4702 for carrier noise-band signal 4730 thereby modulate carrier noise-band signal 4730 to correspond to analog information 3607. Communications manager 3614 transmits carrier noise-band signal 4730 with changes in frequency range 4706 of frequency noise-band 4702. In this example, these changes cause carrier noise-band signal 4730 to correspond to or correlate with, directly or indirectly, analog information 3607. This type of modulation of carrier noise-band signal 4730 can change at least one of width 4708 or location 4712 of frequency noise-band 4702 for carrier noise-band signal 4730.

Figure 48:
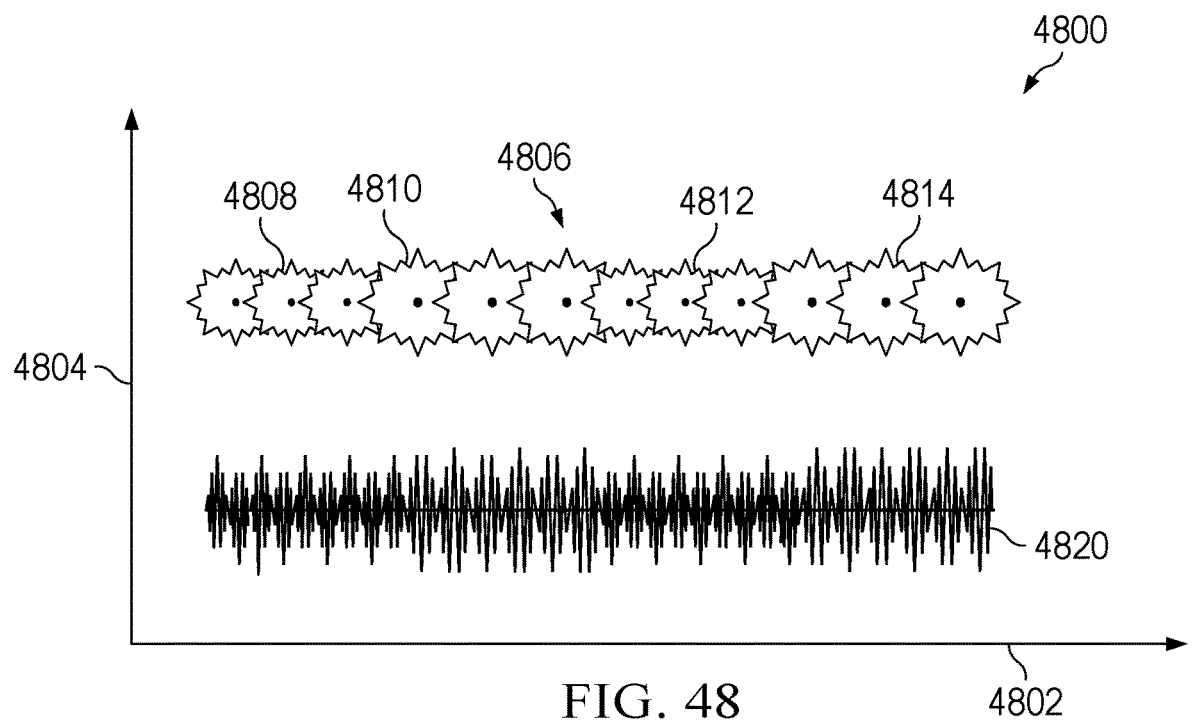
FIG. 48 is an illustration depicting information flow for transmitting analog information with analog frequency noise modulation using a laser generation system in accordance with an illustrative embodiment.

Turning to FIG. 48, an illustration of information flow for transmitting analog information with analog frequency noise modulation using a laser generation system is depicted in accordance with an illustrative embodiment. In this example, information flow 4800 can be implemented using laser generation system 3626 in signal transmission system 3619 for communications system 3602 in FIG. 47. In this example, x-axis 4802 represents time for optical breakdowns and noise signals while y-axis 4804 represents a strength of noise signals in information flow 4800.

As depicted, optical breakdowns 4806 are generated with varying frequency based on the analog information to be transmitted. As previously described, these optical breakdowns are plasma generated using laser generation system 3626. Each optical breakdown in optical breakdowns 4806 is a plasma event generated by the set of one or more laser beams 3627 emitted by laser generation system 3626 in FIG. 47.

In this illustrative example, different optical breakdowns in optical breakdowns 4806 occur at different times that are not periodic because of the different frequencies at which optical breakdowns 4806 occur. As depicted, the optical breakdowns 4806 are generated such that separated pulses are not present. Instead, optical breakdowns 4806 merge or overlap each other in this example.

In this example, the variation frequency can occur from the timing of laser pulses that generate optical breakdowns 4806. For example, optical breakdown 4808 and optical breakdown 4810 occurs at a slower interval as compared to optical breakdown 4812 and optical breakdown 4814.

The result of these optical breakdowns is radio frequency noise signals 4820. As depicted, these radio frequency signals have varying frequencies of noise or noise-bands that are modulated through the frequency of optical breakdowns 4806 to correspond to and/or correlate with, directly or indirectly, the analog information being transmitted. In this example, the change in the frequency of radio frequency noise signals can include at least one of a change in the center point location or width of radio frequency noise signals 4820.

Figure 49:
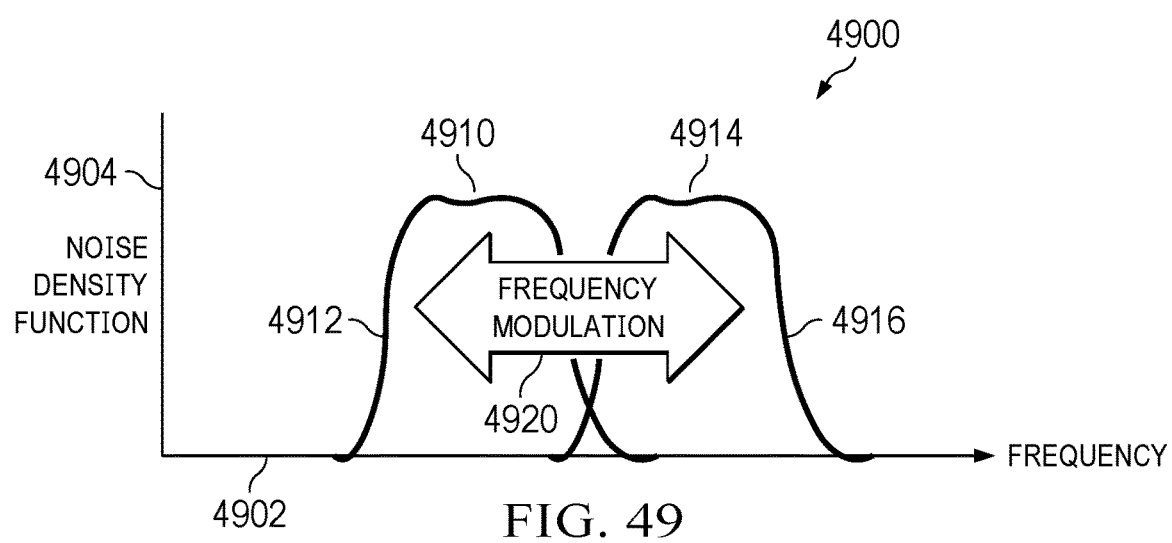
FIG. 49 is an illustration of frequency modulation of radio frequency signals through changing a location of the center points of radio frequency noise-band signals in accordance with an illustrative embodiment.

Turning next to FIG. 49, an illustration of frequency noise modulation of radio frequency signals through changing a location of the center points of radio frequency noise-band signals is depicted in accordance with an illustrative embodiment. In this illustrative example, in graph 4900, x-axis 4902 denotes frequency and y-axis 4904 denotes noise density, noise power density, or noise density function.

As depicted, center point 4910 in frequency noise-band signal 4912 is shifted relative to center point 4914 of radio frequency noise-band signal 4916. In this example, radio frequency noise-band signal 4916 occurs at a higher frequency band than radio frequency noise-band signal 4912. Frequency noise-band signal 4912 can be generated using a lower bandpass noise carrier as compared to frequency noise-band signal 4916.

In this example, frequency modulation 4920 can occur by changing the location of the center point of radio frequency signals back and forth. The amount of change in location can be used to cause and/or control radio frequency noise-band signals to correspond to the analog signals being transmitted.

Figure 50:
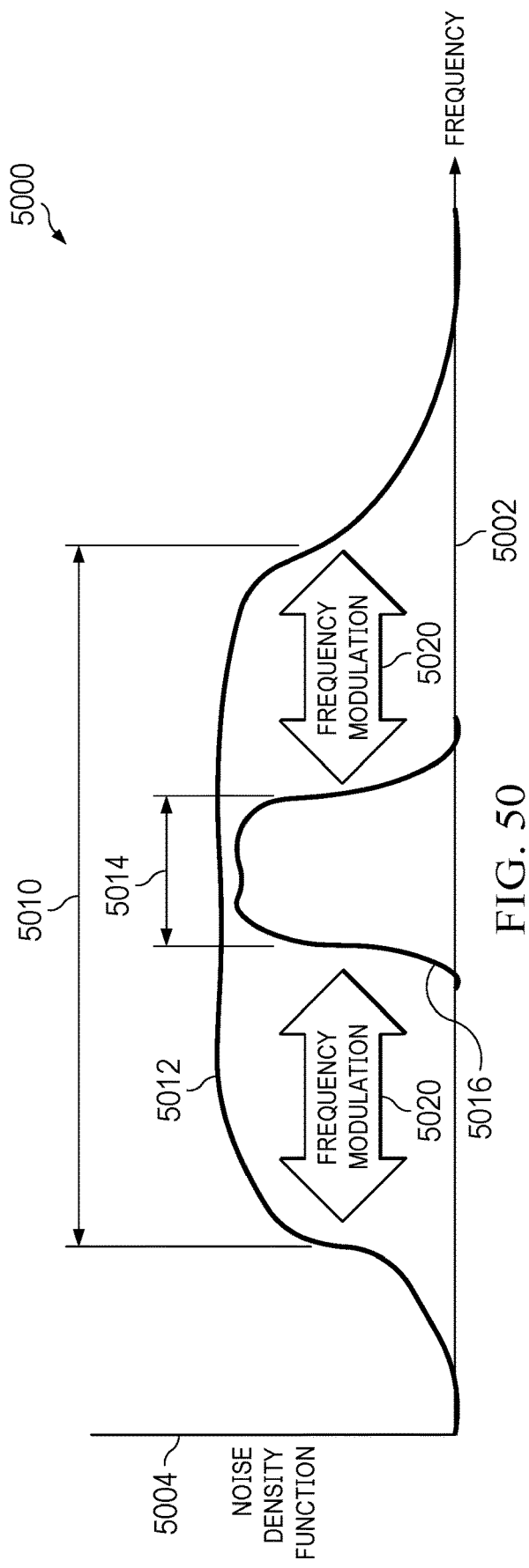
FIG. 50 is an illustration of frequency modulation of radio frequency signals through changing a width or bandwidth of radio frequency noise-band signals in accordance with an illustrative embodiment.

In FIG. 50, an illustration of frequency modulation of radio frequency signals through changing a width or bandwidth of radio frequency noise-band signals is depicted in accordance with an illustrative embodiment. In this illustrative example, in graph 5000, x-axis 5002 denotes frequency and y-axis 5004 denotes noise density function.

As depicted, width 5010 of radio frequency noise-band signal 5012 is wider than width 5014 of radio frequency noise-band signal 5016. In this example, radio frequency noise-band signal 5016 occurs at a narrower frequency band than the wider frequency band of radio frequency noise-band signal 5012.

In this example, frequency modulation 5020 between width 5014 and width 5010 can be used to modulate these radio frequency noise-band signals to correspond to analog signals being transmitted.

Figure 51:
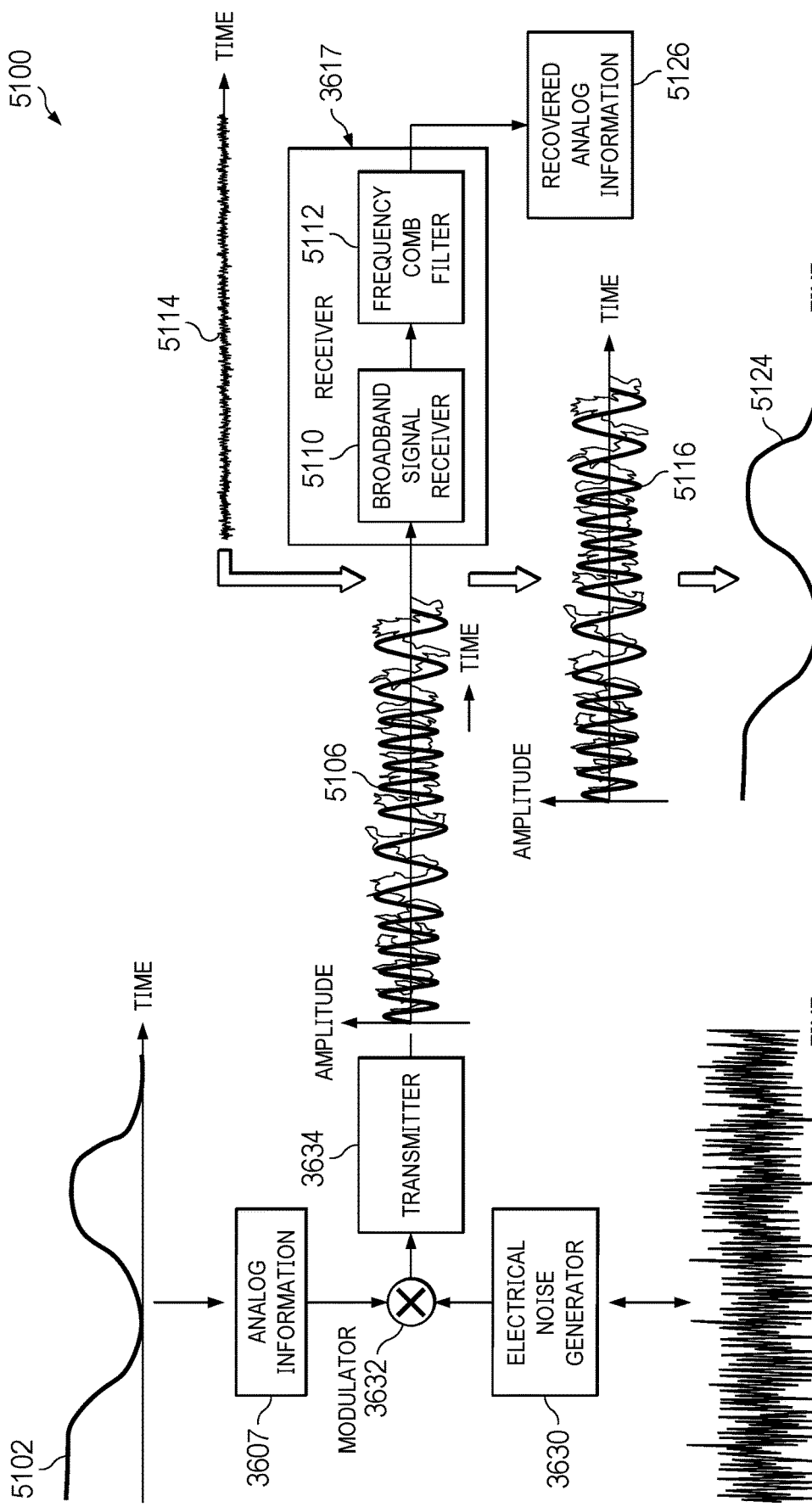
FIG. 51 is an illustration depicting information flow for transmitting analog information with analog frequency noise modulation using a noise transmitter in accordance with an illustrative embodiment.

Turning next to FIG. 51, an illustration of information flow for transmitting analog information with analog frequency noise modulation using a noise transmitter is depicted in accordance with an illustrative embodiment. In the illustrative examples, the same reference numeral may be used in more than one figure. This reuse of a reference numeral in different figures represents the same element in the different figures.

In this example, information flow 5100 can be implemented using noise transmitter 3628 in signal transmission system 3619 for communications system 3602 in FIG. 47.

As depicted in FIG. 51 in this example, analog signal 5102 is an example of analog information 3607 in FIG. 47 that is to be transmitted using analog frequency noise modulation. In this example, electric noise generator 3630 generates carrier noise-band signal 5104. In this example, modulator 3632 is a frequency modulator that modulates the frequency of carrier noise-band signal 5104 with analog information 3607. This modulation causes carrier noise-band signal 5104 to vary in frequency in a manner that results in modulated carrier noise-band signal 5106 that has changes in a frequency range of the frequency noise-band for carrier noise-band signal 5104 that is transmitted by transmitter 3634. This carrier noise-band signal with the frequency noise-band changes is transmitted by transmitter 3634 as modulated carrier noise-band signal 5106. Modulated carrier noise-band signal 5106 is an example of carrier noise-band signal 5104 with changes in the frequency noise-band 4702 in FIG. 47. This modulated transmission signal has a frequency noise-band that varies in a manner that corresponds to analog signal 5102.

As depicted, receiver 3617 includes broadband signal receiver 5110 and frequency comb filter 5112. Broadband signal receiver 5110 is a hardware and/or software device that is configured to receive and process signals across a wide range of frequencies. In this example, broadband signal receiver 5110 receives modulated carrier noise-band signal 5106.

In addition, broadband signal receiver 5110 also receives noise 5114. Noise 5114 represents the normal noise floor that can be present when receiving signals. This reception of modulated carrier noise-band signal 5106 and noise 5114 results in received signal 5116. As depicted in this example, received signal 5116 is the same as modulated carrier noise-band signal 5106. Noise 5114 is not relevant in the signal because modulated carrier noise-band signal 5106 is above the noise floor represented by noise 5114.

In this example, frequency comb filter 5112 can detect frequency changes in the frequency noise-band for received signal 5116 to generate a signal having a shape that resembles those frequency noise-band variations. Frequency comb filter 5112 detects amplitudes of band-pass noise signals that exceed a threshold at different frequency ranges. Multiple filters can have ranges of bandpass frequencies in which each filter is assigned a range of bandpass frequencies. Each of these filters is connected to an amplitude detector that can detect when a noise signal is present for that particular bandpass range of frequencies.

In this example, the output signal from the frequency comb filter 5112 is recovered analog information signal 5124 for recovered analog information 5126. As depicted in this example, recovered analog information signal 5124 for recovered analog information 5126 has the same shape as analog signal 5102 for analog information 3607.

Figure 52:
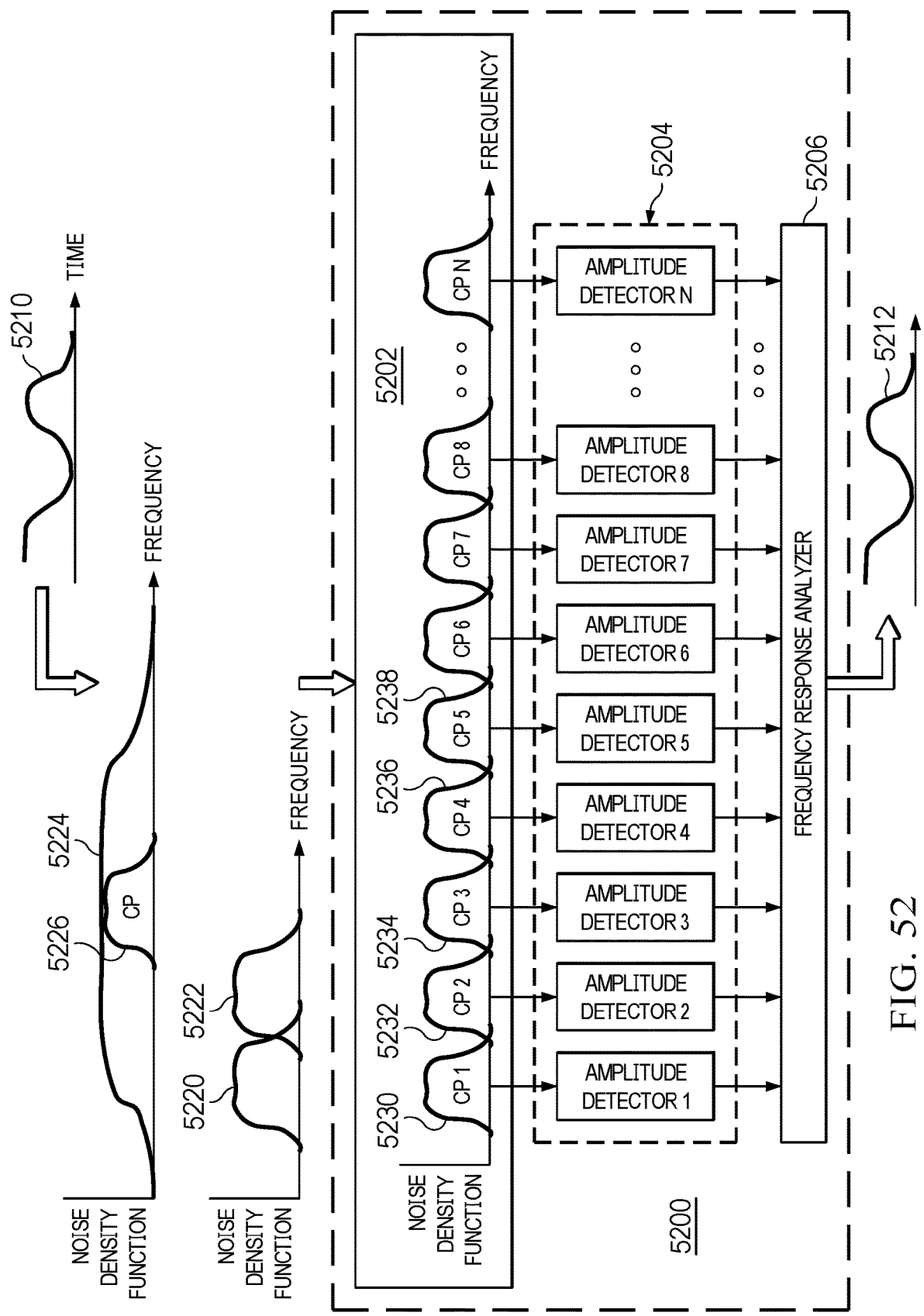
FIG. 52 is an illustration of a receiver frequency comb filter in accordance with an illustrative embodiment.

Turning now to FIG. 52, an illustration of a receiver frequency comb filter is depicted in accordance with an illustrative embodiment. In this illustrative example, frequency comb filter 5200 is an example of an implementation for frequency comb filter 5112 in FIG. 51. As depicted, frequency comb filter 5200 comprises bandpass filters 5202, amplitude detectors 5204, and frequency response analyzer 5206.

In this illustrative example, bandpass filters 5202 are filters that pass selected ranges of frequencies. Each bandpass filter in bandpass filters 5202 is configured to pass frequencies of a particular range with CPx (CP1, CP2, CP3, etc.) indicating the center point of that bandpass filter in bandpass filters 5202. In this example, bandpass filters 5202 are configured to cover a frequency range for frequencies expected for input analog noise-band signal 5210. These input noise-band signals can be, for example, radio frequency noise-band signals or carrier noise-band signals that have been modulated to correspond to or encode analog information.

Amplitude detectors 5204 have inputs connected to the output of bandpass filters 5202. Amplitude detectors 5204 generate output signals in response to detecting signal amplitudes greater than a threshold. In this illustrative example, an amplitude detector is connected to each of bandpass filters 5202. As a result, amplitude detectors 5204 can indicate when different ranges of frequencies are detected from input analog noise-band signal 5210.

Frequency response analyzer 5206 is connected to the outputs of amplitude detectors 5204. Frequency response analyzer 5206 generates recovered analog information in the form of recovered analog information signal 5212.

For example, when input analog noise-band signal 5210 is modulated by changing the location of the center points, this change in the set of points can be detected by different bandpass filters. These changes in frequency location are for a change in frequency of the center points (CP1, CP2, CP3, etc.) of the noise-bands which is detected by frequency comb filter 5200. For example, signal 5220 can be detected by bandpass filter 5230 while signal 5222 can be detected by bandpass filter 5232.

Changes in the width of the signal can also be detected. For example, wide noise bandpass signal 5224 can be detected by bandpass filter 5230, bandpass filter 5232, bandpass filter 5234, bandpass filter 5236, and bandpass filter 5238. The narrower bandpass noise signal 5226 can only be detected by bandpass filter 5234.

This change in the center points or the change in the widths of noise signals can be used to determine the correlation or correspondence, directly or indirectly, to analog information to obtain recovered analog information signal 5212. In addition to frequency noise modulation, in other illustrative examples, this circuit can be implemented to determine changes in amplitude noise modulation, noise color modulation, and/or phase noise modulation.

Figure 53:
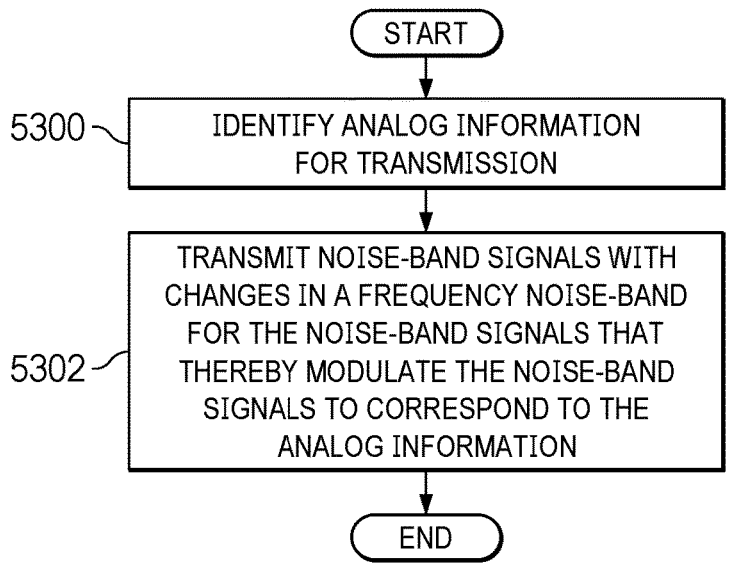
FIG. 53 is an illustration of a flowchart for communicating analog information in accordance with an illustrative embodiment.

Turning now to FIG. 53, an illustration of a flowchart for communicating analog information is depicted in accordance with an illustrative embodiment. The process in FIG. 53 can be implemented in hardware, software, or both. When implemented in software, the process can take the form of program instructions that are run by one or more processor units located in one or more hardware devices in one or more computer systems. For example, the process can be implemented in communications manager 3614 in computer system 3612 in FIG. 47.

The process begins by identifying analog information for transmission (operation 5300). The process transmits noise-band signals with changes in a frequency noise-band for the noise-band signals that thereby modulate the noise-band signals to correspond to the analog information (operation 5302). The process terminates thereafter. These changes in a frequency noise-band do not necessarily correlate exactly to the varying analog information 3607. In alternative examples, the control of the changes in a frequency noise-band may be modified in such a way that the final output noise-modulated signal most closely corresponds to original analog information 3607 such that it may be received with minimum distortion by a receiver 3617 in FIG. 47.

Figure 54:
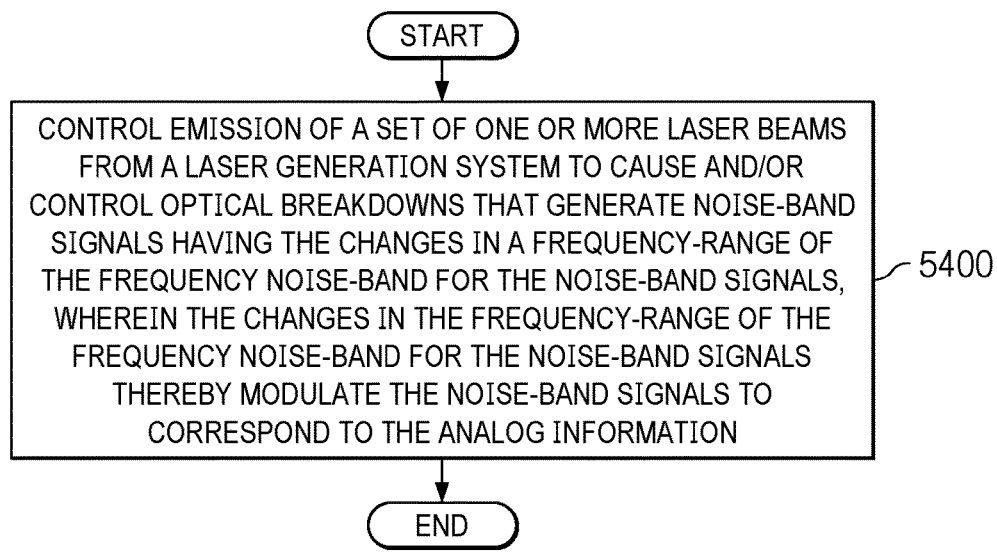
FIG. 54 is an illustration of a flowchart of a process for transmitting noise signals using a laser generation system in accordance with an illustrative embodiment.

With reference next to FIG. 54, an illustration of a flowchart of a process for transmitting noise signals using a laser generation system is depicted in accordance with an illustrative embodiment. The process in this figure is an example of an implementation for operation 5302 in FIG. 53. In this example, the noise signals are radio frequency noise signals.

The process controls emission of a set of one or more laser beams from a laser generation system to cause and/or control optical breakdowns that generate noise-band signals having the changes in a frequency-range of the frequency noise-band for the noise-band signals, wherein the changes in the frequency-range of the frequency noise-band for the noise-band signals thereby modulate the noise-band signals to correspond to the analog information (operation 5400). The process terminates thereafter.

Figure 55:
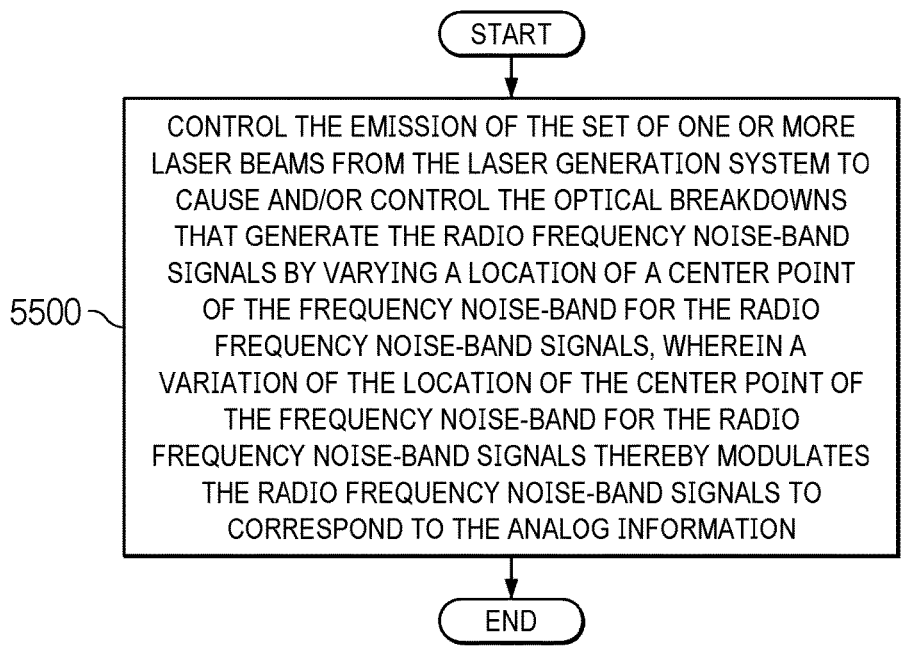
FIG. 55 is an illustration of a flowchart of a process for controlling emission of a set of one or more laser beams in accordance with an illustrative embodiment.

Next in FIG. 55, an illustration of a flowchart of a process for controlling emission of a set of one or more laser beams is depicted in accordance with an illustrative embodiment. The process in this figure is an example of an implementation for operation 5400 in FIG. 54.

The process controls the emission of the set of one or more laser beams from the laser generation system to cause and/or control the optical breakdowns that generate the radio frequency noise-band signals by varying a location of a center point of the frequency noise-band for the radio frequency noise-band signals, wherein a variation of the location of the center point of the frequency noise-band for the radio frequency noise-band signals thereby modulates the radio frequency noise-band signals to correspond to the analog information (operation 5500). The process terminates thereafter.

Figure 56:
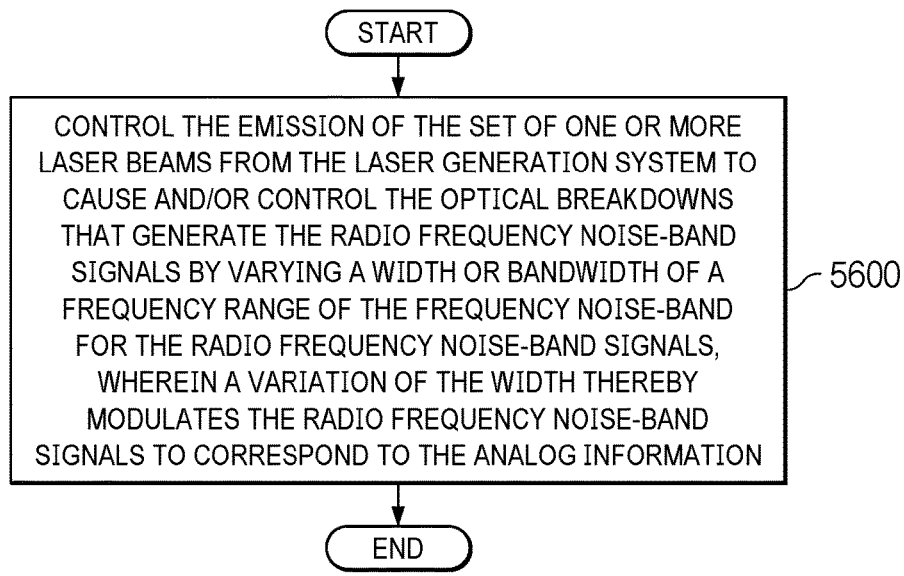
FIG. 56 is an illustration of a flowchart of a process for controlling emission of a set of one or more laser beams in accordance with an illustrative embodiment.

In FIG. 56, an illustration of a flowchart of a process for controlling emission of a set of one or more laser beams is depicted in accordance with an illustrative embodiment. The process in this figure is an example of an implementation for operation 5400 in FIG. 54.

The process controls the emission of the set of one or more laser beams from the laser generation system to cause and/or control the optical breakdowns that generate the radio frequency noise-band signals by varying a width or bandwidth of a frequency range of the frequency noise-band for the radio frequency noise-band signals, wherein a variation of the width thereby modulates the radio frequency noise-band signals to correspond to the analog information (operation 5600). The process terminates thereafter.

Figure 57:
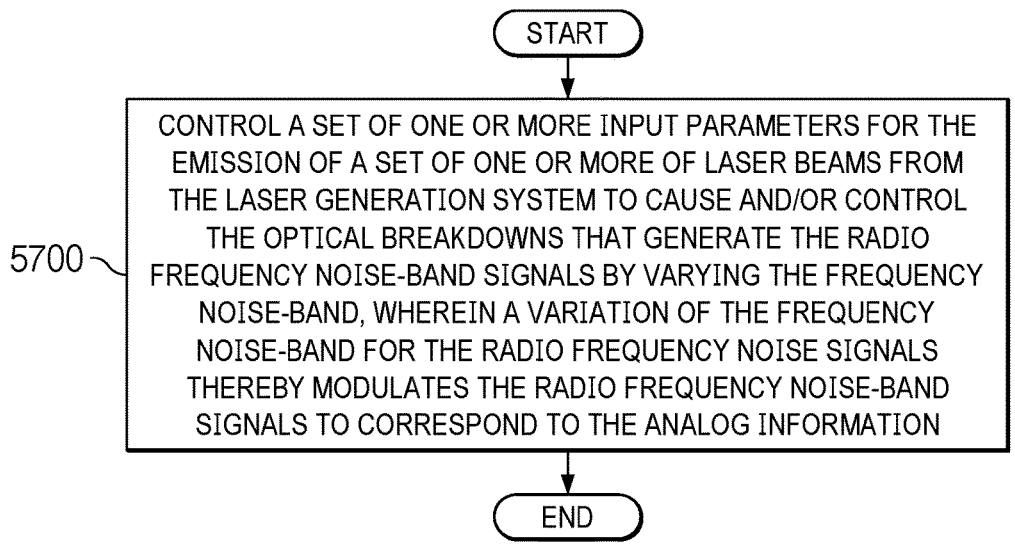
FIG. 57 is an illustration of a flowchart of a process for controlling emission of a set of one or more laser beams in accordance with an illustrative embodiment.

With reference to FIG. 57, an illustration of a flowchart of a process for controlling emission of a set of one or more laser beams is depicted in accordance with an illustrative embodiment. The process in this figure is an example of an implementation for operation 5400 in FIG. 54.

The process controls a set of one or more input parameters for the emission of a set of one or more of laser beams from the laser generation system to cause and/or control the optical breakdowns that generate the radio frequency noise-band signals by varying the frequency noise-band, wherein a variation of the frequency noise-band for the radio frequency noise signals thereby modulates the radio frequency noise-band signals to correspond to the analog information (operation 5700). The process terminates thereafter.

Figure 58:
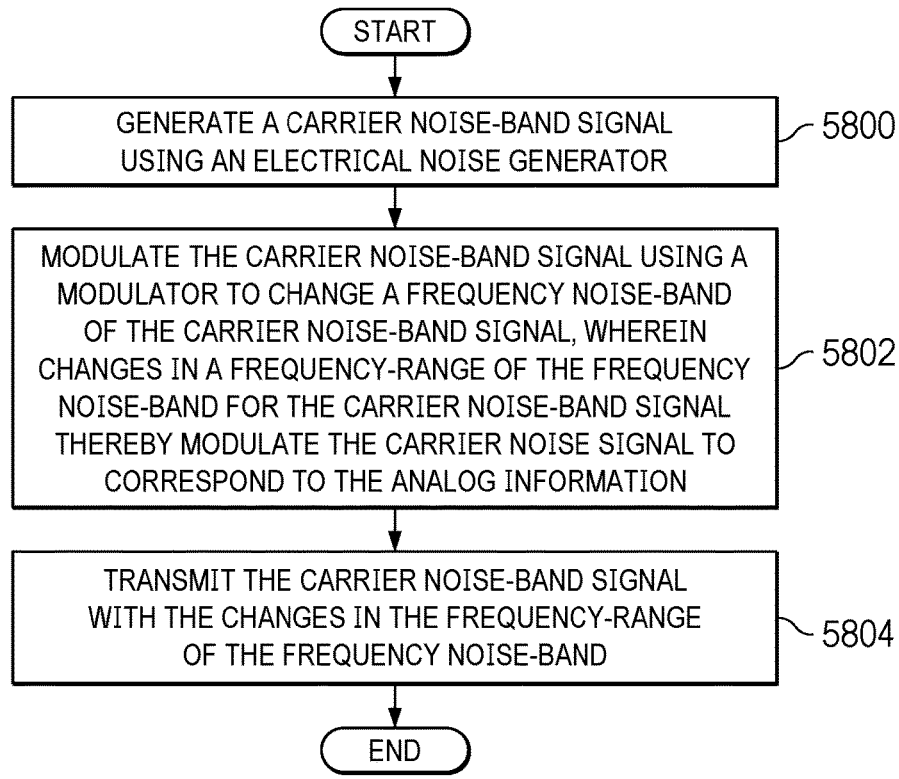
FIG. 58 is an illustration of a flowchart of a process for transmitting noise signals in accordance with an illustrative embodiment.

With reference now to FIG. 58, an illustration of a flowchart of a process for transmitting noise signals is depicted in accordance with an illustrative embodiment. The process in this figure is an example of an implementation for operation 5302 in FIG. 53.

The process begins by generating a carrier noise-band signal using an electrical noise generator (operation 5800). The process modulates the carrier noise-band signal using a modulator to change a frequency noise-band of the carrier noise-band signal, wherein changes in a frequency-range of the frequency noise-band for the carrier noise-band signal thereby modulate the carrier noise signal to correspond to the analog information (operation 5802).

The process transmits the carrier noise-band signal with the changes in the frequency-range of the frequency noise-band (operation 5804). The process terminates thereafter.

Figure 59:
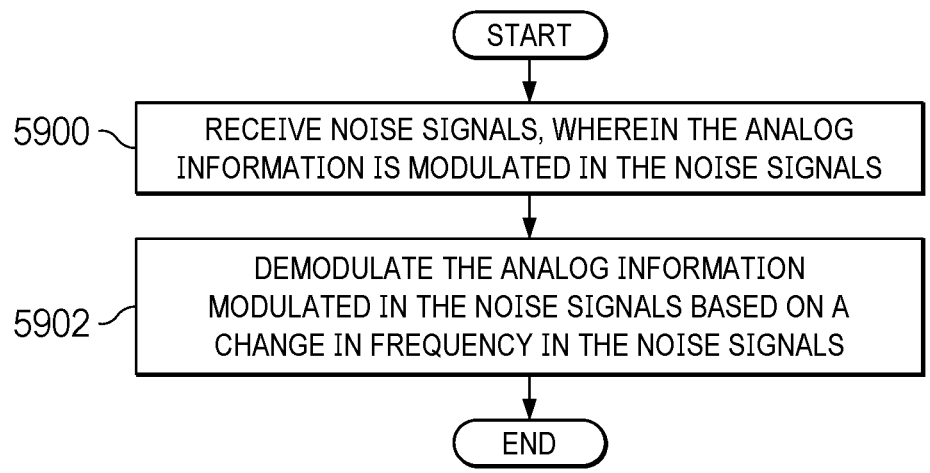
FIG. 59 is an illustration of a flowchart of a process for transmitting noise signals in accordance with an illustrative embodiment.

Turning next to FIG. 59, an illustration of a flowchart of process for communicating analog information is depicted in accordance with an illustrative. The process in FIG. 59 can be implemented in hardware, software, or both. When implemented in software, the process can take the form of program instructions that are run by one or more processor units located in one or more hardware devices in one or more computer systems. For example, the process can be implemented in receiver 3617 in FIG. 47.

The process begins by receiving noise signals, wherein the analog information is modulated in the noise signals (operation 5900). The process demodulates the analog information modulated in the noise signals based on a change in frequency in the noise signals (operation 5902). The process terminates thereafter.

Some features of the illustrative examples for modulating analog information 3607 using analog frequency noise modulation 3622 in communications system 3602 are described in the following clauses. These clauses are examples of features and are not intended to limit other illustrative examples.

1. A communications system comprising:
    a computer system; and
    a communications manager in the computer system, wherein the communications manager is configured to:
    identify analog information for transmission; and
    transmit noise-band signals with changes in a frequency noise-band of the noise-band signals that thereby modulate the noise-band signals to correspond to the analog information.

2. The communications system of clause 1, wherein the noise-band signals are radio frequency noise-band signals and further comprising:
    a laser generation system configured to emit a set of one or more laser beams,
    wherein in transmitting the noise-band signals, the communications manager is configured to:
    control an emission of a set of one or more laser beams from the laser generation system to control optical breakdowns that generate the radio frequency noise-band signals with the changes in a frequency-range of the frequency noise-band for the radio frequency noise-band signals that thereby modulate the radio frequency noise-band signals to correspond to the analog information.

3. The communications system of clause 2, wherein in controlling the emission of the set of one or more laser beams, the communications manager is configured to:
    control the emission of the set of one or more laser beams from the laser generation system to control the optical breakdowns that generate the radio frequency noise-band signals by varying a location of a center point of the frequency noise-band for the radio frequency noise-band signals, wherein a variation of the location of the center point of the frequency noise-band for the radio frequency noise-band signals thereby modulates the radio frequency noise-band signals to correspond to the analog information.

4. The communications system of clause 2, wherein in controlling the emission of the laser beams, the communications manager is configured to:
    control the emission of the set of one or more laser beams from the laser generation system to control the optical breakdowns that generate the radio frequency noise-band signals by varying a width of a frequency range of the frequency noise-band for the radio frequency noise-band signals, wherein a variation of the width thereby modulates the radio frequency noise-band signals to correspond to the analog information.

5. The communications system of clause 2, wherein in controlling the emission of the laser beams, the communications manager is configured to:
    control a set of one or more input parameters for the emission of a set of one or more of laser beams from the laser generation system to control the optical breakdowns that generate the radio frequency noise-band signals by varying the frequency noise-band, wherein a variation of the frequency noise-band for the radio frequency noise signals thereby modulates the radio frequency noise-band signals to correspond to the analog information.

6. The communications system of clause 1 further comprising:
    an electrical noise generator configured to generate a carrier noise-band signal; and
    a modulator; and
    a transmitter,
    wherein in transmitting the noise-band signals, the communications manager is configured to:
    generate the carrier noise-band signal using the electrical noise generator;
    modulate the carrier noise-band signal using the modulator to change a frequency noise-band for the carrier noise-band signal, wherein changes in a frequency-range of the frequency noise-band for the carrier noise-band signal thereby modulate the carrier noise-band signal to correspond to the analog information; and
    transmit the carrier noise-band signal with the changes in the frequency-range of the frequency noise-band for carrier noise-band signal.

7. The communications system of clause 6, wherein the carrier noise-band signal is selected from at least one of electromagnetic frequency noise signals, radio frequency noise signals, microwave frequency noise signals, audio frequency noise signals, ultrasonic frequency noise signals, ultra-low frequency noise signals, very low frequency noise-band signals, underwater frequency noise signals, or optical frequency noise signals including visible and/or non-visible light.

8. The communications system of clause 1, wherein the changes in the frequency noise-band for the noise-band signals are made to at least one of a width or a location of the frequency-noise-band.

9. The communications system of clause 1, wherein the changes are made to a frequency band of the frequency noise-band for the noise-band signals.

10. A method for communicating analog information, the method comprising:
 identifying analog information for transmission; and
 transmitting noise-band signals with changes in a frequency noise-band for the noise-band signals that thereby modulate the noise-band signals to correspond to the analog information.

11. The method of clause 10, wherein the noise-band signals are radio frequency noise-band signals and further comprising:
 controlling emission of a set of one or more laser beams from a laser generation system to control optical breakdowns that generate noise-band signals having the changes in a frequency-range of the frequency noise-band for the noise-band signals, wherein the changes in the frequency-range of the frequency noise-band for the noise-band signals thereby modulate the noise-band signals to correspond to the analog information.

12. The method of clause 11, wherein said controlling the emission of the set of one or more laser beams comprises:
 controlling the emission of the set of one or more laser beams from the laser generation system to control the optical breakdowns that generate the radio frequency noise-band signals by varying a location of a center point of the frequency noise-band for the radio frequency noise-band signals, wherein a variation of the location of the center point of the frequency noise-band for the radio frequency noise-band signals thereby modulates the radio frequency noise-band signals to correspond to the analog information 13. The method of clause 11, wherein said controlling the emission of the laser beams comprises:
 controlling the emission of the set of one or more laser beams from the laser generation system to control the optical breakdowns that generate the radio frequency noise-band signals by varying a width of a frequency range of the frequency noise-band for the radio frequency noise-band signals, wherein a variation of the width thereby modulates the radio frequency noise-band signals to correspond to the analog information.

14. The method of clause 11, wherein said controlling the emission of the laser beams comprises:
 controlling a set of one or more input parameters for the emission of a set of one or more of laser beams from the laser generation system to control the optical breakdowns that generate the radio frequency noise-band signals by varying the frequency noise-band, wherein a variation of the frequency noise-band for the radio frequency noise signals thereby modulates the radio frequency noise-band signals to correspond to the analog information.

15. The method of clause 10, wherein said transmitting the noise-band signals comprises:
 generating a carrier noise-band signal using an electrical noise generator; and
 modulating the carrier noise-band signal using a modulator to change a frequency noise-band of the carrier noise-band signal, wherein changes in a frequency-range of the frequency noise-band for the carrier noise-band signal thereby modulate the carrier noise signal to correspond to the analog information; and
 transmitting the carrier noise-band signal with the changes in the frequency-range of the frequency noise-band.

16. The method of clause 10, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

17. A method for communicating analog information, the method comprising:
 receiving noise-band signals, wherein analog information is modulated in the noise-band signals; and
 demodulating the analog information modulated in the noise-band signals based on changes in a frequency noise-band of the noise-band signals.

18. The method of clause 17, wherein the changes in the frequency noise-band are changes in a frequency-range of the frequency noise-band of the noise-band signals.

19. The method of clause 10, wherein the changes in the frequency noise-band for the noise-band signals are made to at least one of a width or a location of the frequency-noise-band.

20. The method of clause 10, wherein the changes are made to a frequency band of the frequency noise-band for the noise-band signals.

Figure 60:
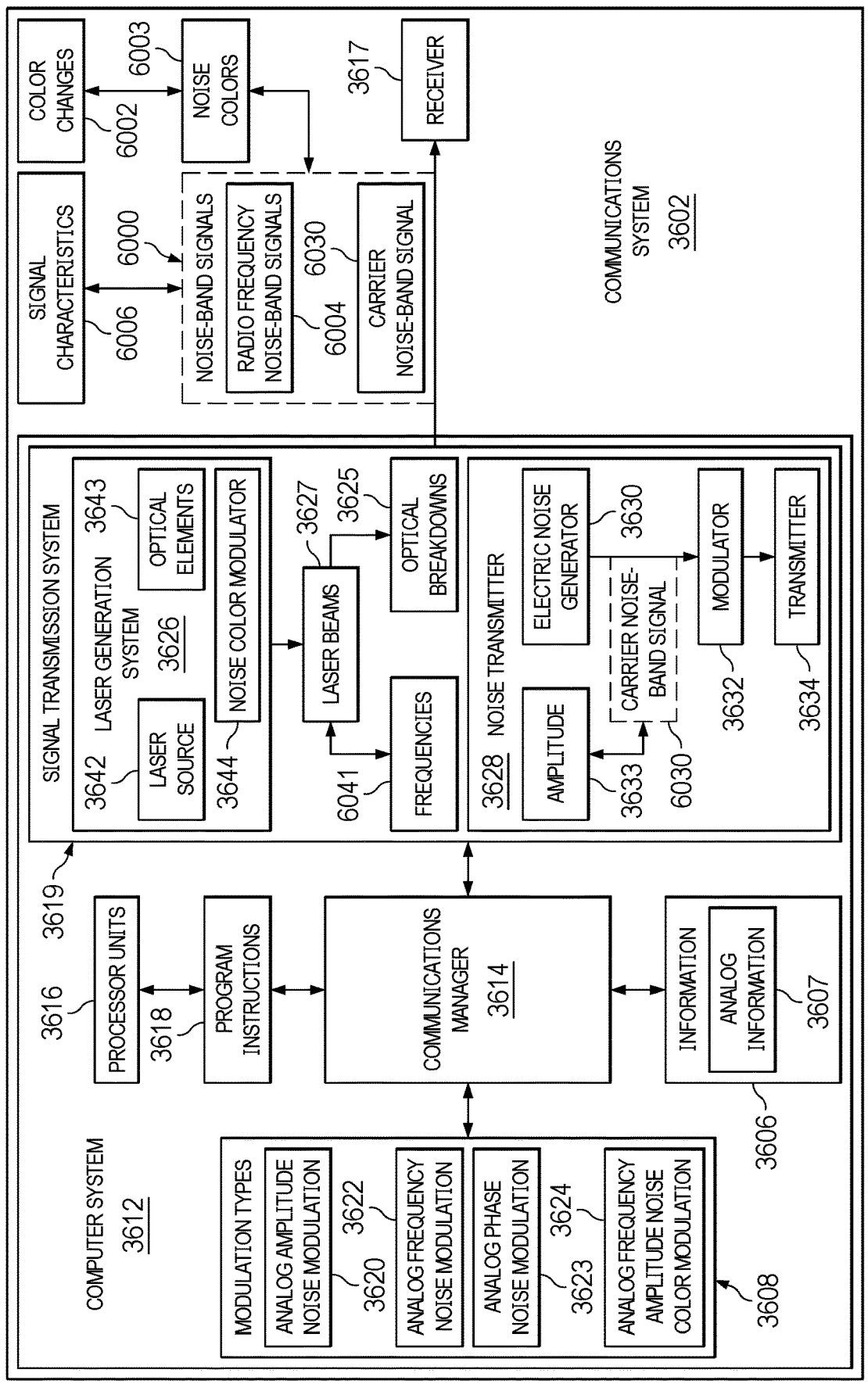
FIG. 60 is an illustration of a block diagram of a communication system for transmitting noise-band signals using analog noise color modulation in accordance with an illustrative embodiment.

Turning now to FIG. 60, an illustration of a block diagram of a communications system 3602 for transmitting noise-band signals using analog frequency-amplitude noise color modulation, or more simply analog noise color modulation, is depicted in accordance with an illustrative embodiment. In this illustrative example, communications system 3602 operates to modulate noise-band signals 6000 to correspond to information 3606 using analog frequency amplitude color modulation 3624.

In this illustrative example, noise-band signals 6000 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

In this example, communications manager 3614 identifies analog information 3607 for transmission. Additionally, communications manager 3614 transmits noise-band signals 6000 that have a set of one or more noise colors 6003. Communications manager 3614 transmits noise-band signals 6000 with color changes 6002 in noise colors 6003 of noise-band signals 6000 that modulate analog information 3607. In this example, color changes 6002 in noise colors 6003 of noise-band signals 6000 correspond to and/or correlate with, directly or indirectly, analog information 3607. This correspondence encodes, transfers, and/or transforms analog information 3607 into noise-band signals 6000.

In other words, the control of the changes in a noise color modulation does not necessarily correlate exactly to the varying analog information 3607. In alternative examples, the control of the changes in noise color modulation may be modified in such a way that the final output noise-modulated signal most closely corresponds to original analog information 3607 such that it may be received with minimum distortion by a receiver 3617 in FIG. 60.

In this illustrative example a noise color is a spectrum of frequencies present in noise-band signals 6000. Different colors are present in noise colors 6003 based on a set of one or more signal characteristics 6006 of noise-band signals 6000. These signal characteristics of noise-band signals 6000 can be selected from at least one of a noise slope characteristic, an amplitude, a frequency, a frequency region, a phase, a time domain, a polarization, a passband or bandpass, a band reject, a slope of the noise-band signals, a curvature of the noise-band signals, a frequency spectrum, a power spectral density profile, or other characteristics that can be used to define noise colors 6003. Changes in these characteristics can be used to generate color changes 6002 in noise colors 6003 of noise-band signals 6000.

As depicted, the transmission of noise-band signals 6000 with color changes 6002 can be performed by communications manager 3614 using signal transmission system 3619. As depicted signal transmission system 3619 can include at least one of laser generation system 3626 or noise transmitter 3628.

In one illustrative example, noise-band signals 6000 are radio frequency noise-band signals 6004. In this example, laser generation system 3626 is configured to emit a set of one or more laser beams 3627. In transmitting the noise-band signals 6000 encoding analog information 3607, communications manager 3614 is configured to control an emission of a set of one or more laser beams 3627 from laser generation system 3626 to cause and/or control optical breakdowns 3625 that generate radio frequency noise-band signals 6004 with color changes 6002 in noise colors 6003 for radio frequency noise-band signals 6004 that modulate analog information 3607.

For example, communications manager 3614 can control the emission of the set of one or more laser beams 3627 with signal changes in a set of one or more signal characteristics 6006 of radio frequency noise-band signals 6004 corresponding to noise colors 6003 for radio frequency noise-band signals 6004 that modulate the analog information 3607.

In one illustrative example, in controlling the emission of the set of one or more laser beams 3627, communications manager 3614 controls frequencies 6041 for the set of one or more laser beams 3627 emitted from laser source 3642 in laser generation system to cause and/or control the optical breakdowns that generate radio frequency noise-band signals 6004 to have signal changes in the set of one or more noise slope characteristics in the set of one or more signal characteristics 6006 corresponding to noise colors 6003 for radio frequency noise-band signals 6004 that modulate analog information 3607.

In this illustrative example, other components in laser generation system 3626 can also be used to control frequencies 6041. For example, optical elements 3643 can be used to change frequencies 6041 in addition to or in place of controlling laser source 3642. Further, controlling noise slope characteristics is an example of one manner in which color changes 6002 in noise colors 6003 can be implemented. In other examples, other characteristics in the set of one or more signal characteristics 6006 can be controlled in place of or in addition to noise slope characteristics to implement color changes 6002 in noise colors 6003 for noise-band signals 6000.

In another illustrative example, communications manager 3614 can generate carrier noise-band signal 6030 using electric noise generator 3630. With this example, communications manager 3614 modulates carrier noise signal using modulator 3632 to form carrier noise-band signal 6030 with signal changes in a set of one or more signal characteristics 6006 thereby generating noise colors 6003 for carrier noise-band signal 6030 that modulate analog information 3607.

In this example, modulator 3632 comprises a set of one or more filters that modify the set of one or more signal characteristics 6006 of carrier noise-band signal 6030 to create noise colors 6003. These filters can be selected from at least one of a bandpass filter, a bandstop or band reject filter, a low pass filter, a high-pass filter, an all pass filter that changes the phase, a notch filter, or other suitable type of filter that can be used to generate color changes 6002 in noise colors 6003 for carrier noise-band signals 6030. Thus, modulator 3632 can be used by communications manager 3614 to make modifications to a set of one or more signal characteristics 6006 for carrier noise-band signal 6030 that causes color changes 6002 in noise colors 6003 to a set of one or more signal characteristics for the carrier noise signal.

Figure 61:
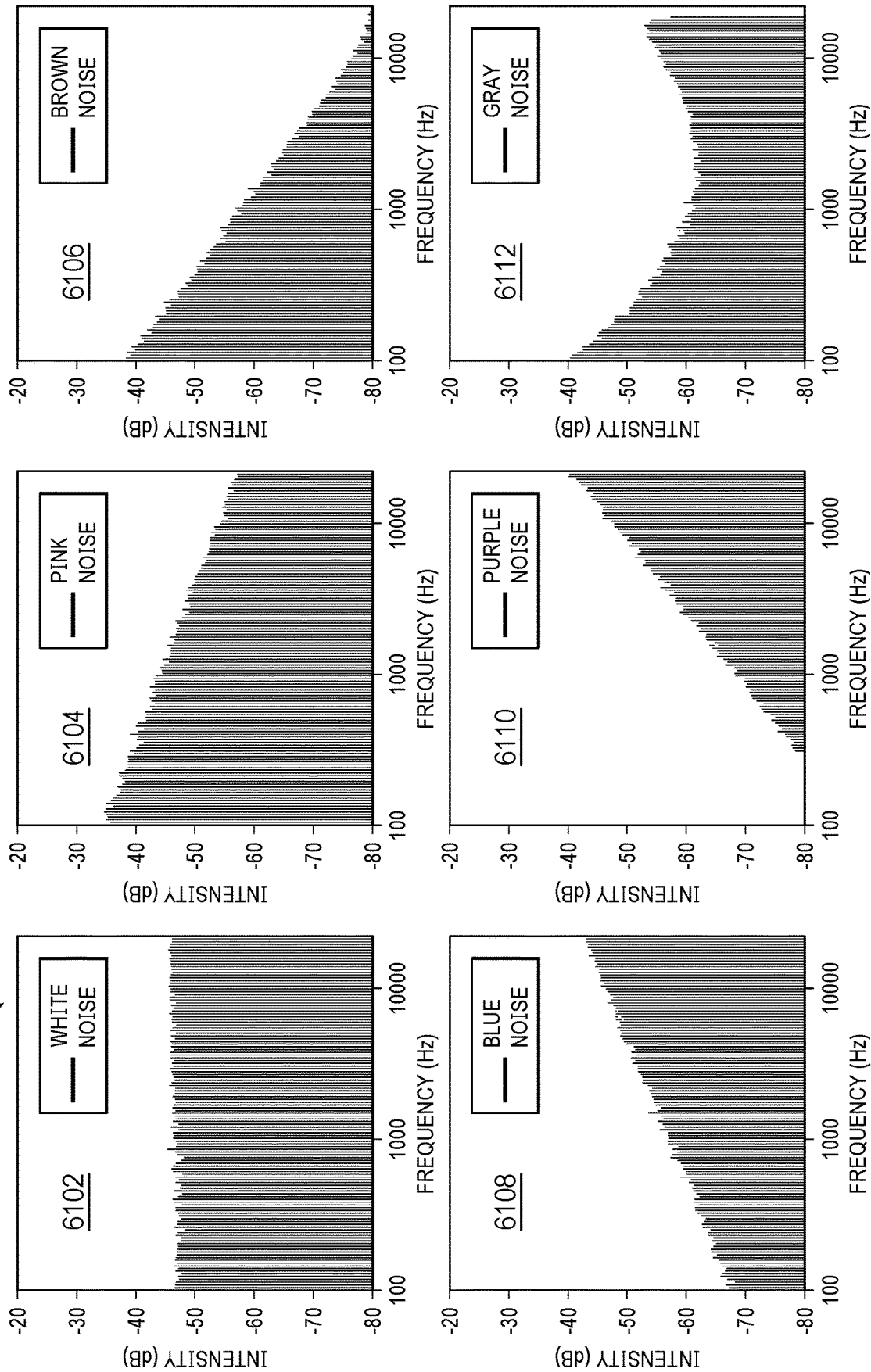
FIG. 61 is an illustration of noise colors in accordance with an illustrative embodiment.

Turning next to FIG. 61, an illustration of noise colors is depicted in accordance with an illustrative embodiment. As depicted, noise colors 6100 are examples of noise colors 6003 for noise-band signals 6000 in FIG. 60. In this example, the signal characteristics for noise colors 6100 in FIG. 61 are defined by the power spectrum, frequency power spectrum, spectral density, or noise spectral density of the noise signal. The power spectrum shows the energy of noise signals distributed over various frequencies. Each noise color in this example is defined by the characteristics of the power spectrum.

As depicted, noise colors 6100 comprises white noise 6102, pink noise 6104, brown noise 6106, blue noise 6108, purple noise 6110, and gray noise 6112. As depicted, each of the noise colors 5900, including white noise 6102, pink noise 6104, brown noise 6106, blue noise 6108, purple noise 6110, and gray noise 6112, has a unique signal characteristic, power spectral density, or power spectrum as compared to the other noise colors in noise colors 6100.

For example, white noise 6102 has a power spectrum that is substantially flat. Pink noise 6104 has a power spectrum that slopes downward as the frequencies increase. Brown noise 6106 has a power spectrum with a steeper slope as compared to pink noise 6104. Blue noise 6108 has a power spectrum with a slope that increases as the frequency increases. Purple noise 6110 has a steeper slope as compared to blue noise 6108. As yet another example, gray noise 6112 is defined as a curve. Other noise colors may be defined with different spectral densities, including variations of curves with higher and lower power densities at different frequencies and/or spectral ranges.

In this illustrative example, analog information can be modulated or encoded within noise-band signals by using color changes to the noise color of the noise and signals. Different noise colors can be used to represent different amplitudes in an analog signal. Further, different color changes can also be used to represent varying amplitude values between one amplitude and another in the analog signal. In this illustrative example, the rate of change between noise colors may correspond to and/or correlate with, directly or indirectly, the rate of change (slope) of the amplitude of the analog information 3607 in FIG. 60.

Illustration of noise colors 6100 in FIG. 61 are presented as an example of some noise colors that can be used for noise colors 6003 in FIG. 60. This example is not meant to limit the manner in which other illustrative examples can implement noise colors 6003. In other illustrative examples, other numbers or types of noise colors can be used in addition to or in place of noise colors 6100 depicted in this example.

Figure 62:
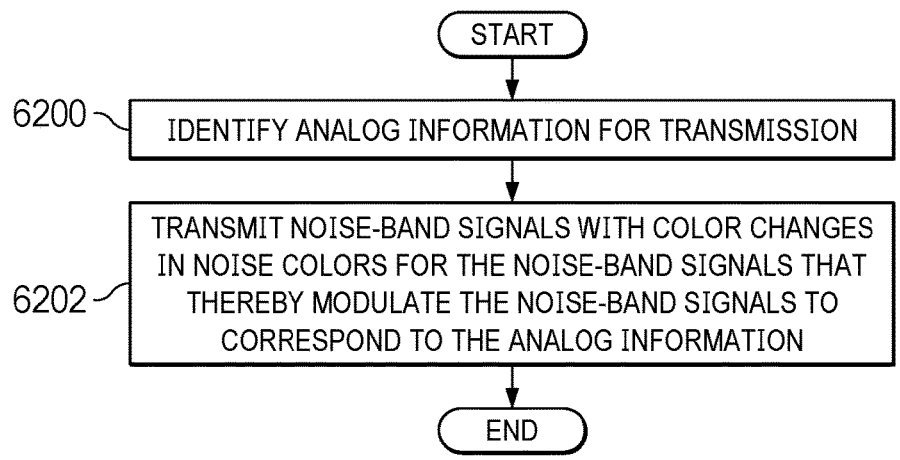
FIG. 62 is an illustration a flowchart of a process for communicating analog information in accordance with an illustrative embodiment.

With reference next to FIG. 62, an illustration a flowchart of a process for communicating analog information is depicted in accordance with an illustrative embodiment. The process in FIG. 62 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 60.

The process begins by identifying analog information for transmission (operation 6200). The process transmits noise-band signals with color changes in noise colors for the noise-band signals that thereby modulate the noise-band signals to correspond to the analog information (operation 6202). The process terminates thereafter. In this example, the color changes to the noise colors are used to modulate the noise-band signals to correspond to or correlate with, directly or indirectly, the analog information.

Figure 63:
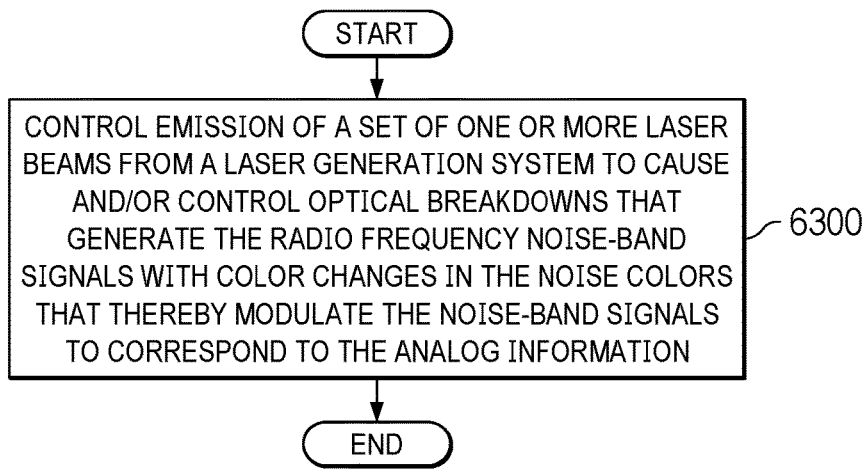
FIG. 63 is an illustration of a flowchart of a process for transmitting noise-band signals using a laser generation system in accordance with an illustrative embodiment.

With reference now to FIG. 63, an illustration of a flowchart of a process for transmitting noise-band signals using a laser generation system is depicted in accordance with an illustrative embodiment. The process in this flowchart is an example of an implementation for operation 6202 in FIG. 62.

The process controls emission of a set of one or more laser beams from a laser generation system to cause and/or control optical breakdowns that generate the radio frequency noise-band signals with color changes in the noise colors that thereby modulate the noise-band signals to correspond to the analog information (operation 6300). The process terminates thereafter.

Figure 64:
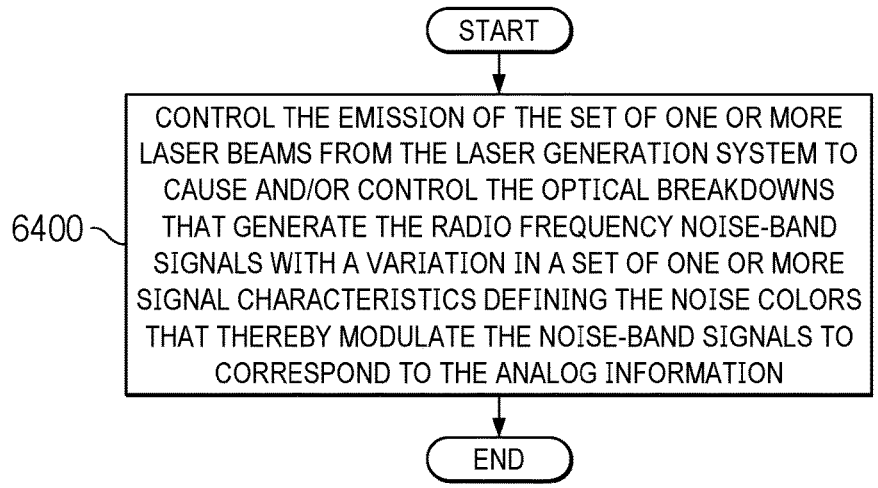
FIG. 64 is an illustration of a flowchart of a process for controlling the emission of a set of one or more laser beams in accordance with an illustrative embodiment.

Turning next to FIG. 64, an illustration of a flowchart of a process for controlling the emission of a set of one or more laser beams is depicted in accordance with an illustrative embodiment. The process in this flowchart is an example of an implementation for operation 6300 in FIG. 63.

The process controls the emission of the set of one or more laser beams from the laser generation system to cause the optical breakdowns that generate the radio frequency noise-band signals with a variation in a set of one or more signal characteristics defining the noise colors that thereby modulate the noise-band signals to correspond to the analog information (operation 6400). The process terminates thereafter.

Figure 65:
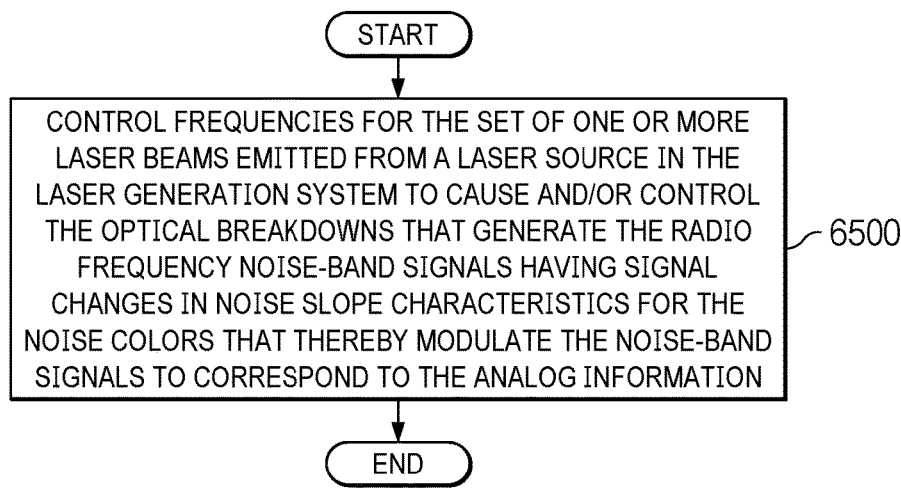
FIG. 65 is an illustration of a flowchart of a process for controlling the emission of a set of one or more laser beams in accordance with an illustrative embodiment.

Next in FIG. 65, an illustration of a flowchart of a process for controlling the emission of a set of one or more laser beams is depicted in accordance with an illustrative embodiment. The process in this flowchart is an example of an implementation for operation 6300 in FIG. 63.

The process controls frequencies for the set of one or more laser beams emitted from a laser source in the laser generation system to cause and/or control the optical breakdowns that generate the radio frequency noise-band signals having signal changes in noise slope characteristics for the noise colors that thereby modulate the noise-band signals to correspond to the analog information (operation 6500). The process terminates thereafter.

Figure 66:
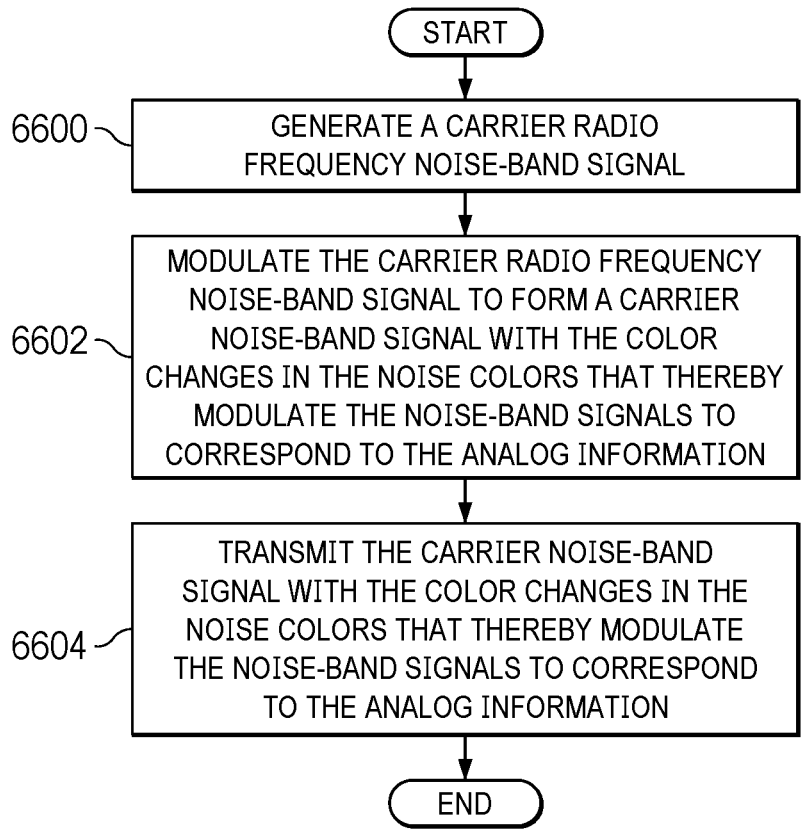
FIG. 66 is an illustration of a flowchart of a process for transmitting noise signals using a noise transmitter in accordance with an illustrative embodiment.

With reference now to FIG. 66, an illustration of a flowchart of a process for transmitting noise signals using a noise transmitter is depicted in accordance with an illustrative embodiment. The process in this flowchart is an example of an implementation for operation 6202 in FIG. 62.

The process begins by generating a carrier radio frequency noise-band signal (operation 6600). The process modulates the carrier radio frequency noise-band signal to form a carrier noise-band signal with the color changes in the noise colors that thereby modulate the noise-band signals to correspond to the analog information (operation 6602).

The process transmits the carrier noise-band signal with the color changes in the noise colors that thereby modulate the noise-band signals to correspond to the analog information (operation 6604). The process terminates thereafter.

Figure 67:
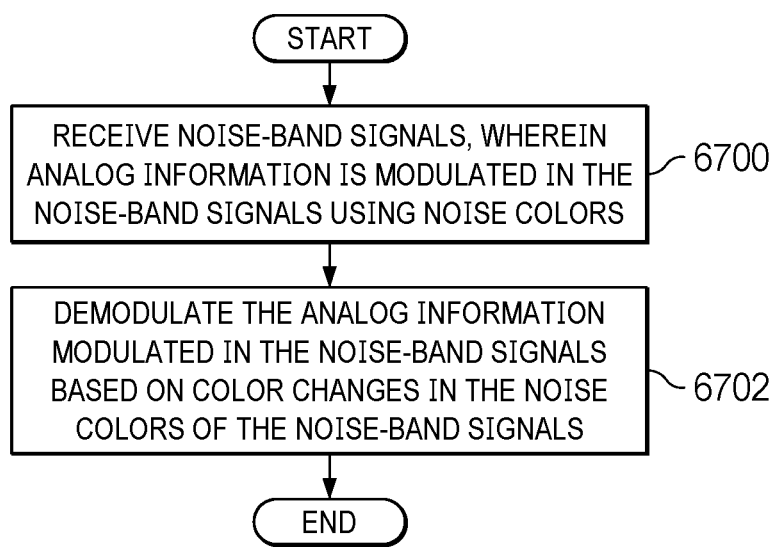
FIG. 67 is an illustration of a flowchart of a process for communicating analog information in accordance with an illustrative embodiment.

Turning next to FIG. 67, an illustration of a flowchart of a process for communicating analog information is depicted in accordance with an illustrative embodiment. The process in FIG. 67 can be implemented in hardware, software, or both. When implemented in software, the process can take the form of program instructions that are run by one of more processor units located in one or more hardware devices in one or more computer systems. For example, the process can be implemented in receiver 3617 in FIG. 58.

The process begins by receiving noise-band signals, wherein analog information is modulated in the noise-band signals using noise colors (operation 6700). The process demodulates the analog information modulated in the noise-band signals based on color changes in the noise colors of the noise-band signals (operation 6702). The process terminates thereafter.

Some features of the illustrative examples for modulating analog information 3607 using analog frequency noise color modulation 3624 in communications system 3602 are described in the following clauses. These clauses are examples of features and are not intended to limit other illustrative examples.

1. A communications system comprising:
   a computer system; and
   a communications manager in the computer system, wherein the communications manager is configured to:
   identify analog information for transmission; and
   transmit noise-band signals with color changes in noise colors for noise-band signals that thereby modulate the noise-band signals to correspond to the analog information.

2. The communications system of clause 1, wherein the noise-band signals are radio frequency noise-band signals and further comprising:
   a laser generation system configured to emit a set of one or more laser beams,
   wherein in transmitting the noise-band signals, the communications manager is configured to:
   control an emission of the set of one or more laser beams from the laser generation system to control optical breakdowns that generate the radio frequency noise-band signals with color changes in the noise colors for radio frequency noise band signals that thereby modulate the noise-band signals to correspond to the analog information.

3. The communications system of clause 2, wherein in controlling the emission of the set of one or more laser beams, the communication manager is configured to:
   control the emission of the set of one or more laser beams from the laser generation system to control the optical breakdowns that generate the radio frequency noise-band signals with signal changes in a set of one or more signal characteristics of radio frequency noise band signals corresponding to the noise colors for radio frequency noise band signals that thereby modulate the noise-band signals to correspond to the analog information.

4. The communications system of clause 3, wherein in controlling the emission of the set of one or more laser beams, the communication manager is configured to:

control frequencies for the set of one or more laser beams emitted from a laser source in the laser generation system to control the optical breakdowns that generate the radio frequency noise-band signals to have signal changes in the set of one or more noise slope characteristics corresponding to the noise colors for the radio frequency noise-band signals that thereby modulate the noise-band signals to correspond to the analog information.

5. The communications system of clause 1 further comprising:
an electrical noise generator configured to generate a carrier noise signal;
a modulator; and
a transmitter,
wherein in generating the carrier noise signal, the communications manager is configured to:
generate the carrier noise signal using the electrical noise generator; and
modulate the carrier noise signal using the modulator to form a carrier noise-band signal with signal changes in a set of one or more signal characteristics thereby generating the noise colors for carrier noise signal that modulate the noise-band signals to correspond to the analog information, 6. The communications system of clause 5, wherein the modulator comprises a set of one or more filters that modify the set of one or more signal characteristics of the carrier noise signal to create the noise colors.

7. The communications system of clause 1, wherein the noise colors are defined using a set of one or more signal characteristics of the noise-band signals.

8. The communications system of clause 7, wherein the color changes in the noise colors are caused by modifications to a set of one or more signal characteristics for the carrier noise-band signal.

9. The communications system of clause 7, wherein the set of one or more signal characteristics of the noise-band signals is selected from at least one of a noise slope characteristic, an amplitude, frequency, a phase, a time domain, a polarization, a slope of the noise-band signals, a curvature of the noise-band signals, a frequency spectrum, or a power spectral density profile.

10. The communications system of clause 1, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

11. A method for communicating analog information, the method comprising:
identifying analog information for transmission; and
transmitting noise-band signals with color changes in noise colors for the noise band signals that thereby modulate the noise-band signals to correspond to the analog information.

12. The method of clause 11, wherein the noise-band signals are radio frequency noise-band signals and wherein transmitting the noise-band signals comprises:
controlling emission of a set of one or more laser beams from a laser generation system to control optical breakdowns that generate the radio frequency noise-band signals with color changes in the noise colors that thereby modulate the noise-band signals to correspond to the analog information.

13. The method of clause 12, wherein said controlling the emission of the set of one or more laser beams comprises:
controlling the emission of the set of one or more laser beams from the laser generation system to control the optical breakdowns that generate the radio frequency noise-band signals with a variation in a set of one or more signal characteristics defining the noise colors that thereby modulate the noise-band signals to correspond to the analog information.

14. The method of clause 13, wherein said controlling the emission of the set of one or more laser beams comprises:
controlling frequencies for the set of one or more laser beams emitted from a laser source in the laser generation system to control the optical breakdowns that generate the radio frequency noise-band signals having signal changes in noise slope characteristics for the noise colors that thereby modulate the noise-band signals to correspond to the analog information.

15. The method of clause 11, wherein said transmitting the noise-band signals comprises:
generating a carrier radio frequency noise-band signal;
modulating the carrier radio frequency noise-band signal to form a carrier noise-band signal with the color changes in the noise colors that you is when been okay the ones that that summer figure like the slaves modulate the noise-band signals to correspond to the analog information; and
transmitting the carrier noise-band signal with the color changes in the noise colors that thereby modulate the noise-band signals to correspond to the analog information.

16. The method of clause 15, wherein the noise colors are defined by a set of one or more signal characteristics and the color changes in the noise colors are caused by modifications to a set of one or more signal characteristics for the carrier noise signal.

17. The method of clause 16, wherein the modulator comprises a set of one or more filters that modify the set of one or more signal characteristics in the carrier noise signal to create the noise colors.

18. The method of clause 11, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

19. The method of clause 11, wherein the noise colors are identified using signal characteristics selected from at least one of amplitude, frequency, a phase, a time domain, a polarization, a slope of noise-band signals, a curvature of the noise-band signals, a frequency spectrum or a power spectral density profile.

20. A method for communicating analog information, the method comprising:
receiving noise-band signals, wherein analog information is modulated in the noise-band signals using noise colors; and
demodulating the analog information modulated in the noise-band signals based on color changes in the noise colors of the noise-band signals.

Figure 68:
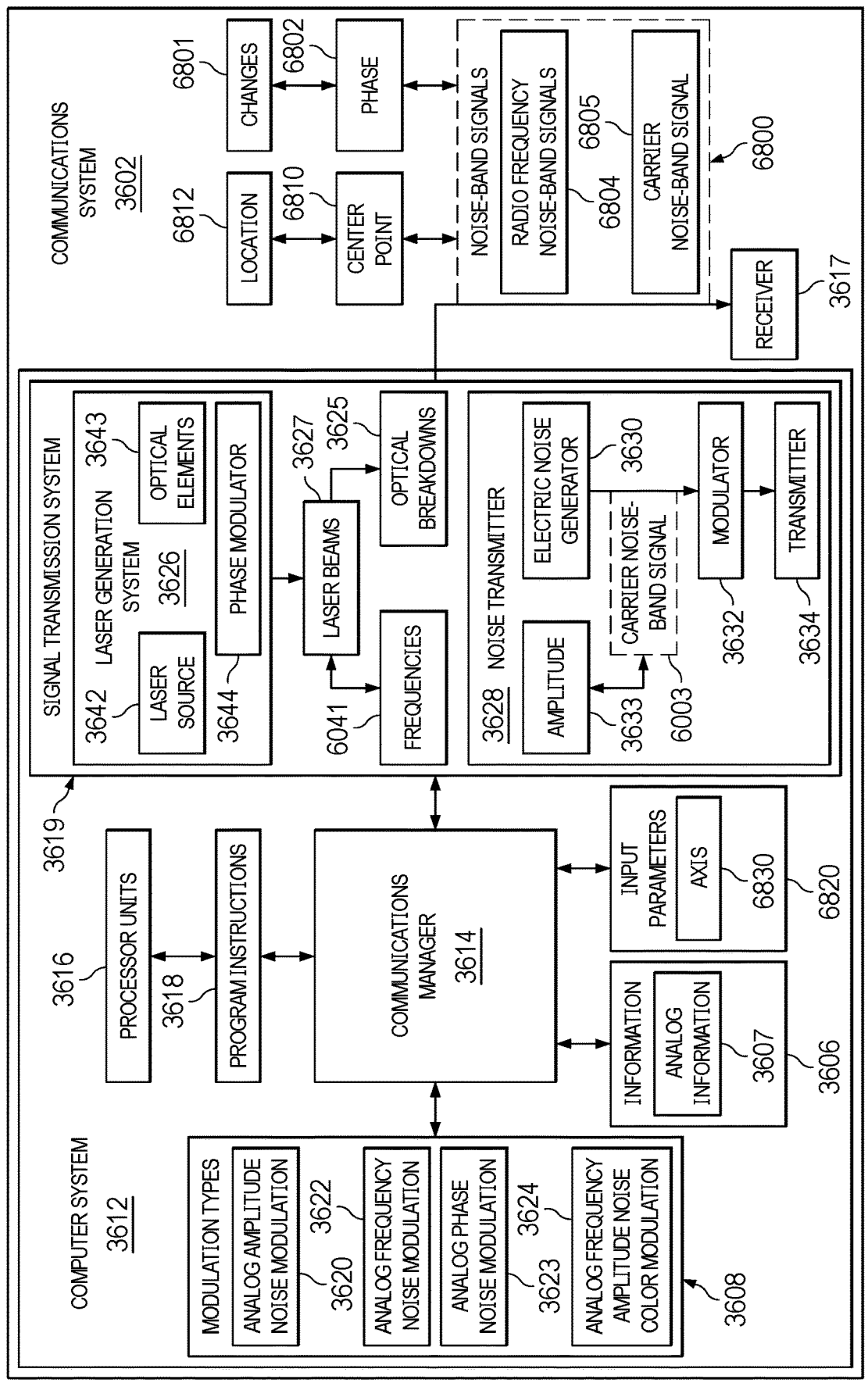
FIG. 68 is an illustration of a block diagram of a communication system for transmitting noise-band signals using analog phase noise modulation in accordance with an illustrative embodiment.

Turning now to FIG. 68, an illustration of a block diagram of a communications system 3602 for transmitting noise-band signals 6800 using analog phase noise modulation is depicted in accordance with an illustrative embodiment. In this illustrative example, communications system 3602 operates to modulate noise-band signals 6800 to correspond to information 3606 as analog information 3607 using analog phase noise modulation 3623.

In this illustrative example, noise-band signals 6800 can be selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

In this example, communications manager 3614 identifies analog information 3607 for transmission. Communications manager 3614 transmits noise-band signals 6800 with changes 6801 in phase 6802 of the noise-band signals 6800 that thereby modulates noise-band signals 6800 to correspond to analog information 3607. In this illustrative example, communications manager 3614 uses signal transmission system 3619 to transmit noise-band signals 6800 with changes 6801 in phase 6802. The transmission of a signal transmission system 3619 can be made using various components such as laser generation system 3626 and noise transmitter 3628.

In one illustrative example, communications manager 3614 uses laser generation system 3626 to transmit noise-band signals 6800 in the form of radio frequency noise-band signals 6804. With this example, communications manager 3614 controls an emission of a set of one or more laser beams 3627 from laser generation system 3626 to cause and/or control optical breakdowns 3625 that generate radio frequency noise-band signals 6804 with the changes 6801 in phase 6802 that thereby modulates the phase of the radio frequency noise-band signals 6804 to correspond to analog information 3607.

In controlling the emission of the set of one or more laser beams 3627, communications manager 3614 can control the emission of the set of one or more laser beams 3627 from laser generation system 3626 to cause and/or control optical breakdowns 3625 that generate radio frequency noise-band signals 6804 by varying location 6812 of center point 6810 of radio frequency noise-band signals 6804. In this example, a variation of location 6812 of center point 6810 of radio frequency noise-band signals 6804 thereby modulates phase 6802 of radio frequency noise-band signals 6804 to correspond to analog information 3607.

In this illustrative example, the variation in location 6812 of center point 6810 can be performed in a number of different ways. For example, communications manager 3614 controls a set of one or more input parameters 6820 for an emission of a set of one or more laser beams 3627 from laser generation system 3626 to cause and/or control optical breakdowns 3625 that generate radio frequency noise-band signals 6804 by varying location 6812 of center point 6810 of radio frequency noise-band signals 6804. In this example, a variation of location 6812 of center point 6810 of radio frequency noise-band signals 6804 thereby modulates phase 6802 of radio frequency noise-band signals 6804 to correspond to analog information. In other words, the variation in location 6812 of center point 6810 for radio frequency noise-band signals 6804 results in changes 6801 in phase 6802 for radio frequency noise-band signals 6804.

Communications manager 3614 can control input parameters 6820 in a number of different ways. For example, communications manager 3614 can control axis 6830 in an input parameter in the set of one or more input parameters 6820 to cause and/or control changes 6801 in phase 6802. In this illustrative example, communications manager 3614 can control directing the set of one or more laser beams 3627 along axis 6830 such that optical breakdowns 3625 vary in space along axis 6830 to generate radio frequency noise-band signals 6804 with changes 6801 in phase 6802 occurring along axis 6830 that thereby modulates the phase of radio frequency noise-band signals 6804 to correspond to analog information 3607.

In this example, changes 6801 in phase 6802 caused by a change location 6812 in center point 6810 result in a phase shift. Changes 6801 in phase 6802 can be implemented through change in a laser position or mirror position using optical elements 3643 in laser generation system 3626. These optical elements can include mirrors, lenses, and other devices. The change can occur through changing a focal length of a mirror or other components to cause and/or control a phase shift. In other cases, a mirror or lens can move to pivot a laser beam.

In another illustrative example, communications manager 3614 can use noise transmitter 3628 to transmit noise-band signals 6800 in the form of carrier noise-band signal 6805 with changes 6801 in phase 6802. In this example, communications manager 3614 modulates the carrier noise-band signal 6805 using modulator 3632 to form carrier noise-band signal 6805 with changes 6801 in phase 6802 of carrier noise-band signal 6805 that thereby modulates the phase 6802 of carrier noise-band signal 6805 to correspond to the analog information 3607.

In this example, modulator 3632 can be implemented using devices capable of shifting or changing phase 6802 of carrier noise-band signal 6805. For example, modulator 3632 can be implemented using a phase shift modulator for bandwidth noise, noise-band center point, and/or noise color.

In this example, the change in phase 6802 can take a number of forms. For example, for a Doppler phase shift the carrier noise-band signal can be a shift in a bandpass range of frequencies. In another example, analog continuous Doppler phase shift of a bandpass range of colored noise frequencies, slope, or curvature of range of noise frequencies can occur using noise transmitter 3628. In yet another example, a continuous Doppler shift of modulation of white, pink, red (Brownian), purple, or gray noise can occur using noise transmitter 3628. Also, multi-color noise Doppler shifts (electronic approach as opposed to lasers) can occur using noise transmitter 3628.

Figure 69:
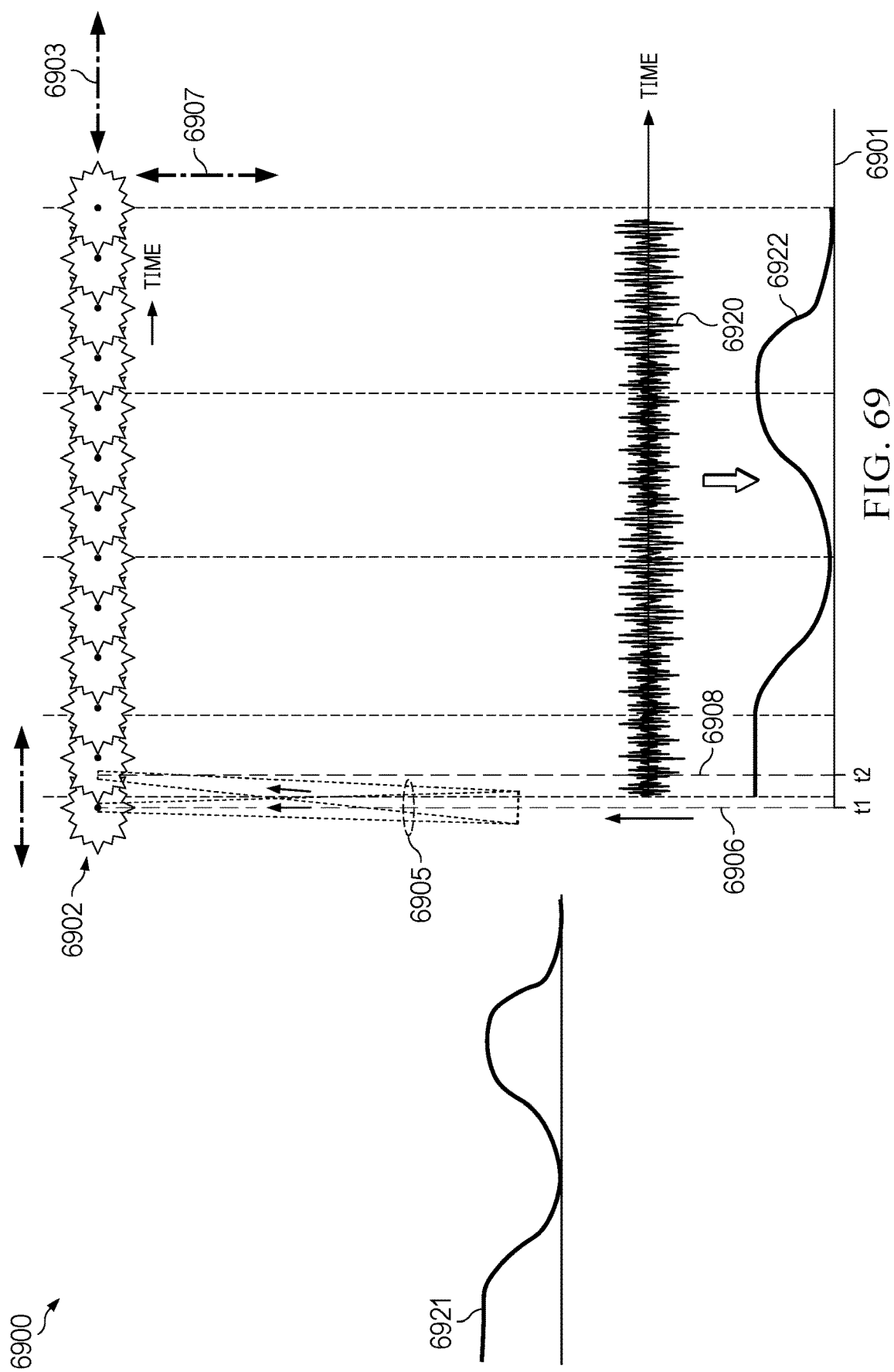
FIG. 69 is an illustration depicting information flow in transmitting analog information with analog phase noise modulation using a laser generation system in accordance with an illustrative embodiment.

Turning next to FIG. 69, an illustration of information flow in transmitting analog information with analog phase noise modulation using a laser generation system is depicted in accordance with an illustrative embodiment. In this example, information flow 6900 can be implemented using laser generation system 3626 in signal transmission system 3619 for communications system 3602 in FIG. 68. In this example, x-axis 6901 represents time for optical breakdowns and noise signals in information flow 6900. The y-axis for radio frequency noise-band signal 6920 and analog information 6922 represents amplitude or signal strength.

As depicted, optical breakdowns 6902 are generated with varying phase based on the analog information to be transmitted. In this example, the analog information is represented as input analog signal 6921. As previously described, these optical breakdowns 6902 are plasma generated using laser generation system 3626 laser beams 3627 in FIG. 68. Each optical breakdown in optical breakdowns 6902 in FIG.

69 is a plasma event generated by the set of one or more laser beams 3627 emitted by laser generation system 3626 in FIG. 68. In FIG. 69, the act of pivoting laser beam 6905 to the right or left during optical breakdown results in respective positive or negative Doppler phase shift in a lateral direction causing a Doppler noise-band phase shift along axis 6903.

In this example, the phase of optical breakdowns 6902 can change along axis 6903. As depicted, laser beam 6905 can generate optical breakdowns 6902 at time t1 6906. As long as laser beam 6905 does not pivot as this timing is used, the phase of optical breakdowns 6902 does not change. In this example, laser beam 6905 can move or pivot such that optical breakdowns 6902 is continuously generated from time t1 6906 to time t2 6908. When this pivot occurs between time t1 6906 and time t2 6908, the change in position of the generation of optical breakdowns 6902 during time t1 to t2 results in a phase shift in the lateral direction along axis 6903.

In this illustrative example, the change in timing and optical breakdown location can be performed by changing the position of the laser or a mirror. This change can cause and/or control a phase shift in one or both of axis 6903 and axis 6907. As depicted in FIG. 69, axis 6907 is perpendicular to axis 6903. In this illustrative example, the phase shift will be along the lateral axis 6903, with almost no phase shift along the vertical axis 6907.

As depicted, these optical breakdowns 6902 result in radio frequency noise-band signal 6920 with changes in phase. These changes in phase encode analog information that can be recovered. In this example, processing of radio frequency noise-band signal 6920 results in output analog information 6922 which corresponds to or correlates with, directly or indirectly, input analog signal 6921.

Figure 70:
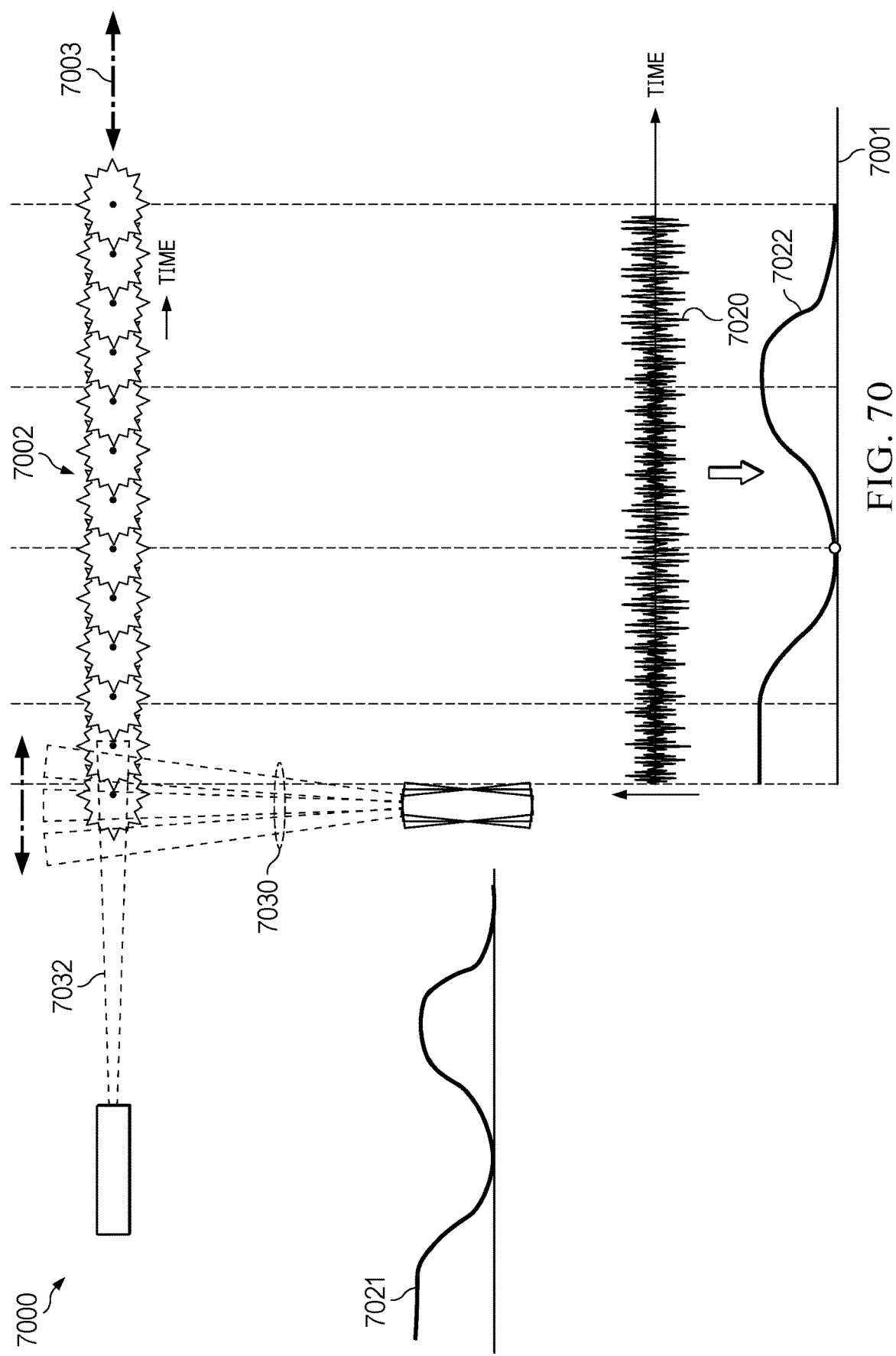
FIG. 70 is an illustration depicting information flow in transmitting analog information with analog phase noise modulation using a laser generation system in accordance with an illustrative embodiment.

Turning next to FIG. 70, an illustration of information flow in transmitting analog information with analog phase noise modulation using a laser generation system is depicted in accordance with an illustrative embodiment. In this example, information flow 7000 can be implemented using laser generation system 3626 in signal transmission system 3619 for communications system 3602 in FIG. 68. In this example, x-axis 7001 represents time for optical breakdowns 7002 and noise signals in information flow 7000.

In this example, optical breakdowns 7002 are generated using laser beam 7030 and laser beam 7032. In this example, laser beam 7032 is emitted in a direction along axis 7003. Laser beam 7030 is emitted in one or more directions to intersect laser beam 7032. In this illustrative example, laser beam 7030 can be pivoted relative to laser beam 7032 to shift the timing and physical locations at which optical breakdowns 7002 are generated. This change in timing and physical locations of optical breakdowns 7002 generates a phase shift in a direction along axis 7003. The phase shift is generated based on input analog signal 7021. The phase shift in this example can also be referred to as a Doppler noise-band shift.

As a result, radio frequency noise-band signal 7020 is generated with changes in phase to correspond to and/or correlate with, directly or indirectly, the analog information in input analog signal 7021. In this example, radio frequency noise-band signal 7020 can be received and decoded to generate output analog signal 7022.

In this illustrative example, the axes for laser beam 7032 and laser beam 7030 are at or near right angles (i.e., 90 degrees). The movement of laser beam 7030 along axis 7003, thus causes optical breakdowns 7002 to also shift along axis 7003. This means that the directionality of the phase shift will also be along axis 7003. However, if, in another illustrative example, the axes for laser beam 7032 and laser beam 7030 are not at or near right angles (e.g., at 45 degrees), then the directionality of the phase shift would be in the direction of the change in location of the optical breakdowns 7002. This would generally be along the axis of the stationary laser beam but controlled by the moving or pivoting intersecting laser beam.

Figure 71:
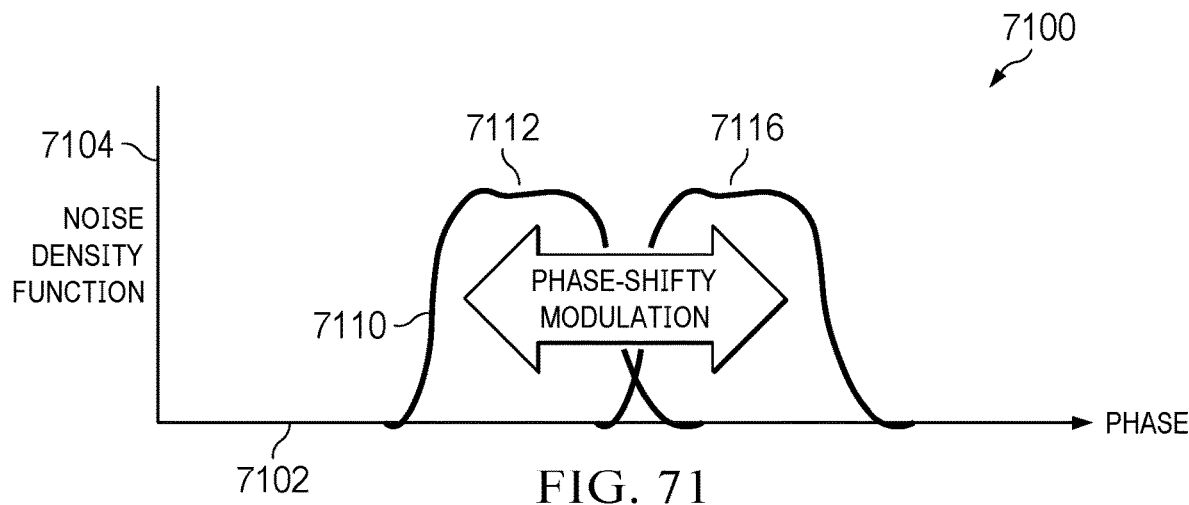
FIG. 71 is an illustration of analog phase noise modulation in accordance with an illustrative embodiment.

In FIG. 71, an illustration of analog phase noise modulation is depicted in accordance with an illustrative embodiment. As depicted in graph 7100, x-axis 7102 represents phase and y-axis 7104 represents a noise density function.

In this illustrative example, noise-band signal 7110 has a first center point 7112 and a second center point 7116. As depicted, the set of center points of noise-band signal 7110 are shifted in phase relative to each other. The shifting in the phase of this noise-band signal 7110 can be used to cause and/or control, directly or indirectly, the shift or change in phase of the noise signals to correlate to the analog information being transmitted. As depicted, this shift in phase is Doppler shift and can be performed using either or both laser generation system 3626 and noise transmitter 3628 in signal transmission system 3619 in FIG. 68.

Figure 72:
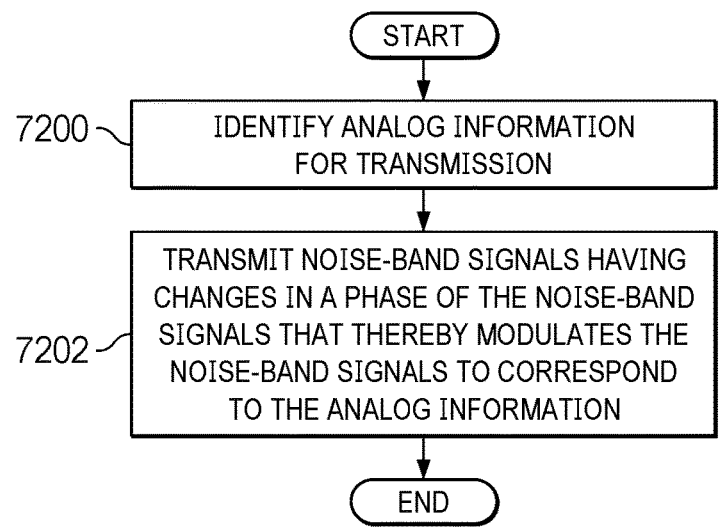
FIG. 72 is an illustration a flowchart of a process for communicating analog information in accordance with an illustrative embodiment.

With reference next to FIG. 72, an illustration of a flowchart of a process for communicating analog information is depicted in accordance with an illustrative embodiment. The process in FIG. 72 can be implemented in hardware, software, or both. When implemented in software, the process can take the form of program instructions that are run by one of more processor units located in one or more hardware devices in one or more computer systems. For example, the process can be implemented in communications manager 3614 in computer system 3612 in FIG. 68.

The process begins by identifying analog information for transmission (operation 7200). The process transmits noise-band signals having changes in a phase of the noise-band signals that thereby modulates the noise-band signals to correspond to the analog information (operation 7202). The process terminates thereafter.

Figure 73:
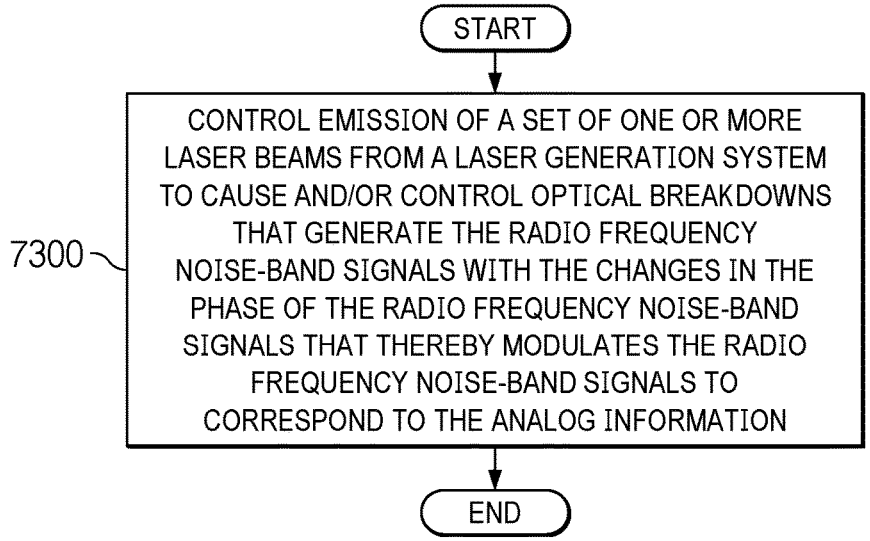
FIG. 73 is an illustration of a flowchart of a process for transmitting noise-band signals using a laser generation system in accordance with an illustrative embodiment.

With reference now to FIG. 73, an illustration of a flowchart of a process for transmitting noise-band signals using a laser generation system is depicted in accordance with an illustrative embodiment. The process in this flowchart is an example of an implementation for operation 7202 in FIG. 72.

The process controls emission of a set of one or more laser beams from a laser generation system to cause and/or control optical breakdowns that generate the radio frequency noise-band signals with the changes in the phase of the radio frequency noise-band signals that thereby modulates the radio frequency noise-band signals to correspond to the analog information (operation 7300). The process terminates thereafter.

Figure 74:
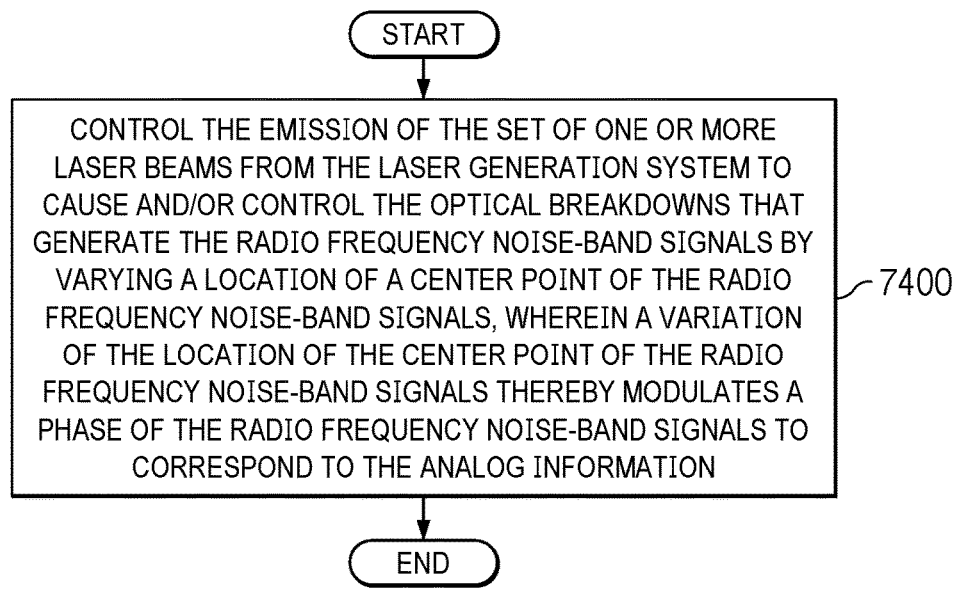
FIG. 74 is an illustration of a flowchart of a process for controlling emission of a set of one or more laser beams in accordance with an illustrative embodiment.

Next in FIG. 74, an illustration of a flowchart of a process for controlling emission of a set of one or more laser beams is depicted in accordance with an illustrative embodiment. The process depicted in this figure is an example of an implementation for operation 7300 in FIG. 73.

The process controls the emission of the set of one or more laser beams from the laser generation system to cause and/or control the optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information (operation 7400). The process terminates thereafter. In other words, by controlling the varying locations of the optical breakdowns that generate the radio frequency noise-band signals, it varies the location of a center point of the radio frequency noise-band signals, wherein a variation of the location of the center point of the radio frequency noise-band signals thereby modulates a phase of the radio frequency noise-band signals to correspond to the analog information.

Figure 75:
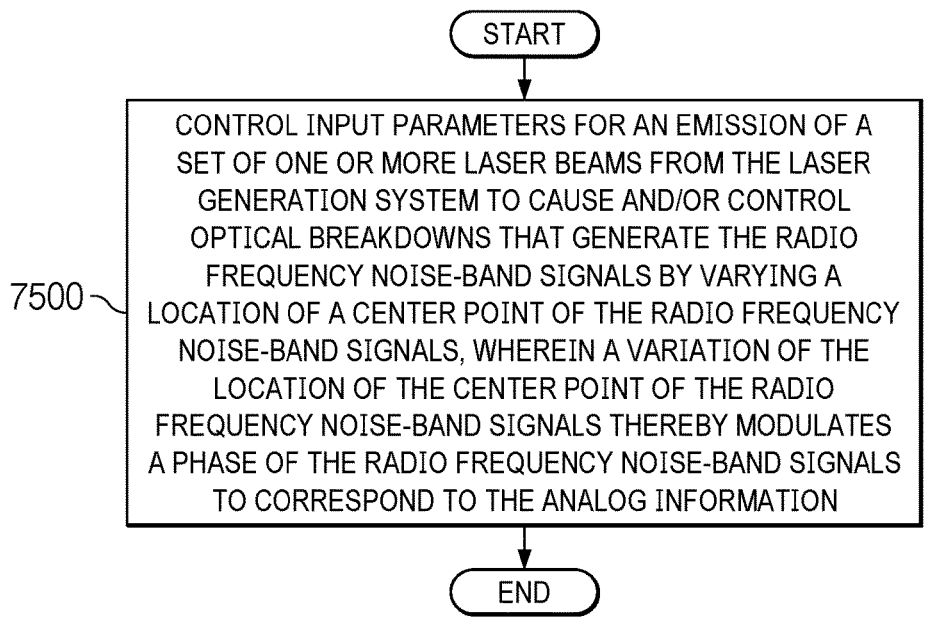
FIG. 75 is an illustration of a flowchart of a process for controlling emission of a set of one or more laser beams in accordance with an illustrative embodiment.

Turning now to FIG. 75, an illustration of a flowchart of a process for controlling emission of a set of one or more laser beams is depicted in accordance with an illustrative embodiment. The process depicted in this figure is an example of an implementation for operation 7300 in FIG. 73.

Figure 76:
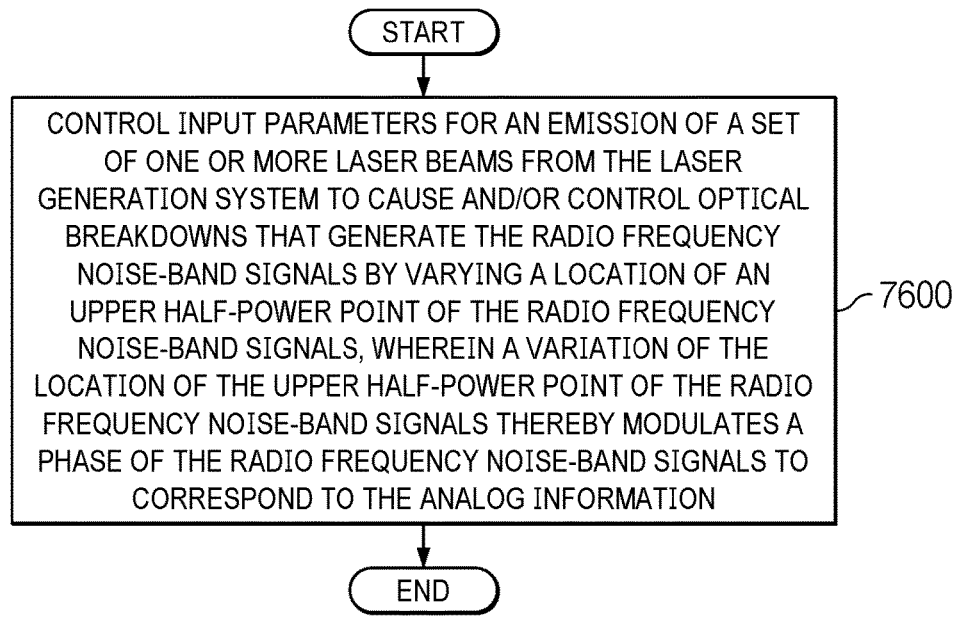
FIG. 76 is an illustration of a flowchart of a process for controlling emission of a set of one or more laser beams in accordance with an illustrative embodiment.

The process controls input parameters for an emission of a set of one or more laser beams from the laser generation system to cause and/or control, directly or indirectly, optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information (operation 7500). The process terminates thereafter. In other words, by controlling the input parameters for an emission of a set of one or more laser beams from the laser generation system, it varies the locations of the optical breakdowns that generate the radio frequency noise-band signals, and thus varies the location of a center point of the radio frequency noise-band signals, wherein a variation of the location of the center point of the radio frequency noise-band signals thereby modulates a phase of the radio frequency noise-band signals to correspond to the analog information Next in FIG. 76, an illustration of a flowchart of a process for controlling emission of a set of one or more laser beams is depicted in accordance with an illustrative embodiment. The process depicted in this figure is an example of an implementation for operation 7300 in FIG. 73.

The process controls input parameters for an emission of a set of one or more laser beams from the laser generation system to cause and/or control optical breakdowns that generate the radio frequency noise-band signals by varying a location of an upper half-power point of the radio frequency noise-band signals, wherein a variation of the location of the upper half-power point of the radio frequency noise-band signals thereby modulates a phase of the radio frequency noise-band signals to correspond to the analog information (operation 7600). The process terminates thereafter.

Figure 77:
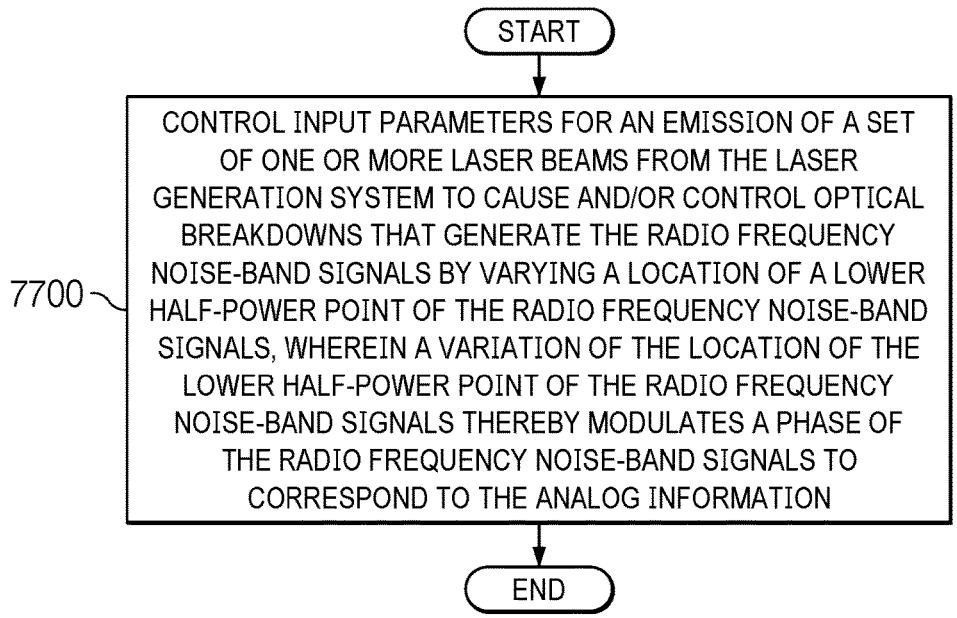
FIG. 77 is an illustration of a flowchart of a process for controlling emission of a set of one or more laser beams in accordance with an illustrative embodiment.

With reference to FIG. 77, an illustration of a flowchart of a process for controlling emission of a set of one or more laser beams is depicted in accordance with an illustrative embodiment. The process depicted in this figure is an example of an implementation for operation 7300 in FIG. 73.

The process controls input parameters for an emission of a set of one or more laser beams from the laser generation system to cause and/or control optical breakdowns that generate the radio frequency noise-band signals by varying a location of a lower half-power point of the radio frequency noise-band signals, wherein a variation of the location of the lower half-power point of the radio frequency noise-band signals thereby modulates a phase of the radio frequency noise-band signals to correspond to the analog information (operation 7700). The process terminates thereafter.

Figure 78:
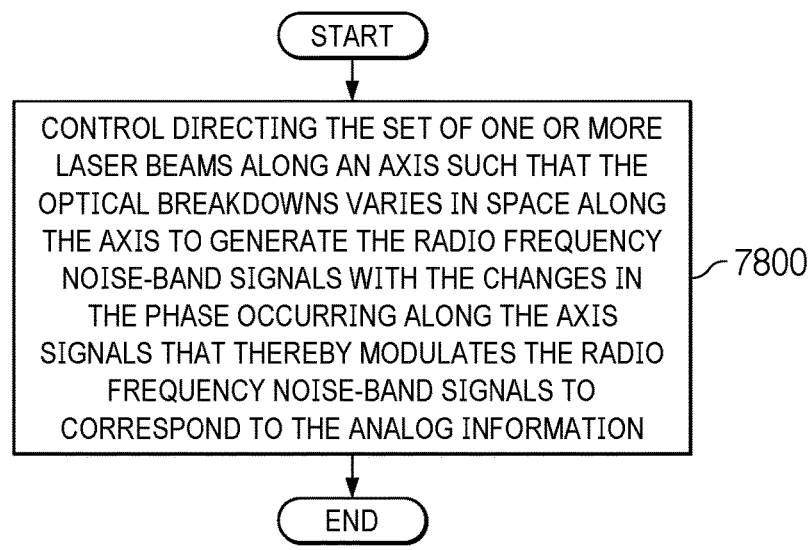
FIG. 78 is an illustration of a flowchart of a process for controlling emission of a set of one or more laser beams in accordance with an illustrative embodiment.

With reference to FIG. 78, an illustration of a flowchart of a process for controlling emission of a set of one or more laser beams is depicted in accordance with an illustrative embodiment. The process depicted in this figure is an example of an implementation for operation 7300 in FIG. 73.

The process controls directing the set of one or more laser beams along an axis such that the optical breakdowns vary in space along the axis to generate the radio frequency noise-band signals with the changes in the phase occurring along the axis signals that thereby modulates the radio frequency noise-band signals to correspond to the analog information (operation 7800). The process terminates thereafter.

In operation 7800, "axis" does not have to be lined up with a laser. The "axis" can be based on the movement of the optical breakdowns that determine the direction of the phase shifts.

Figure 79:
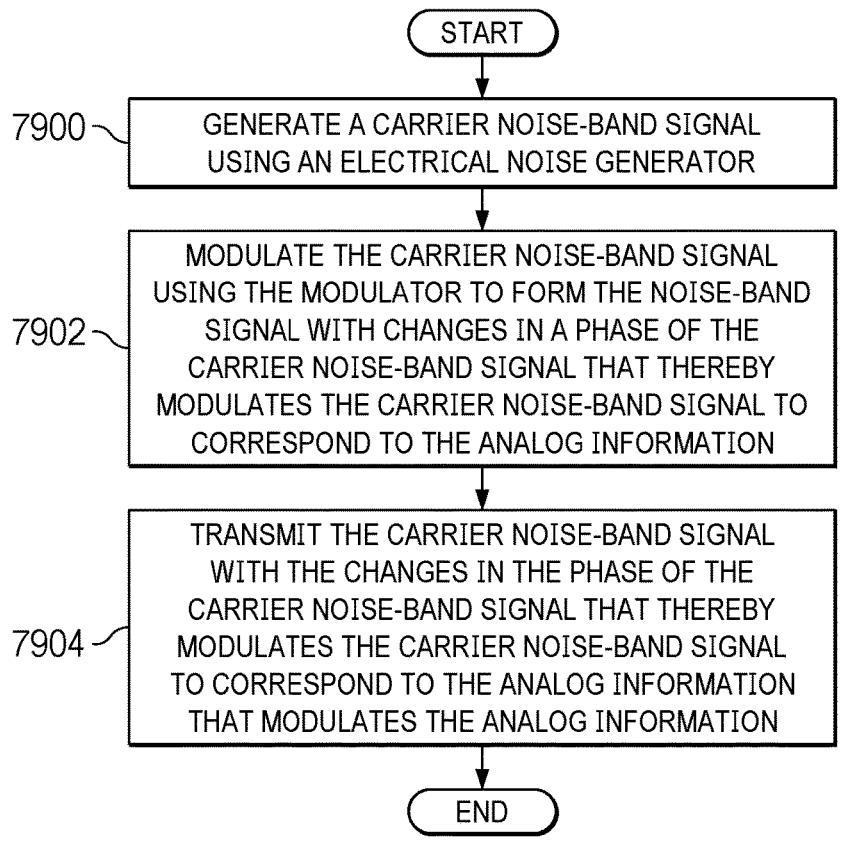
FIG. 79 is an illustration of a flowchart of a process for transmitting noise signals using a noise transmitter in accordance with an illustrative embodiment.

With reference to FIG. 79, an illustration of a flowchart of a process for transmitting noise signals using a noise transmitter is depicted in accordance with an illustrative embodiment. The process in this flowchart is an example of an implementation for operation 7202 in FIG. 72.

The process generates a carrier noise-band signal using an electrical noise generator (operation 7900). The process modulates the carrier noise-band signal using a modulator to form the noise-band signal with changes in a phase of the carrier noise-band signal that thereby modulates the carrier noise-band signal to correspond to the analog information (operation 7902).

The process transmits the carrier noise-band signal with the changes in the phase of the carrier noise-band signal that thereby modulates the carrier noise-band signal to correspond to the analog information that modulates the analog information (operation 7904). The process terminates thereafter.

Figure 80:
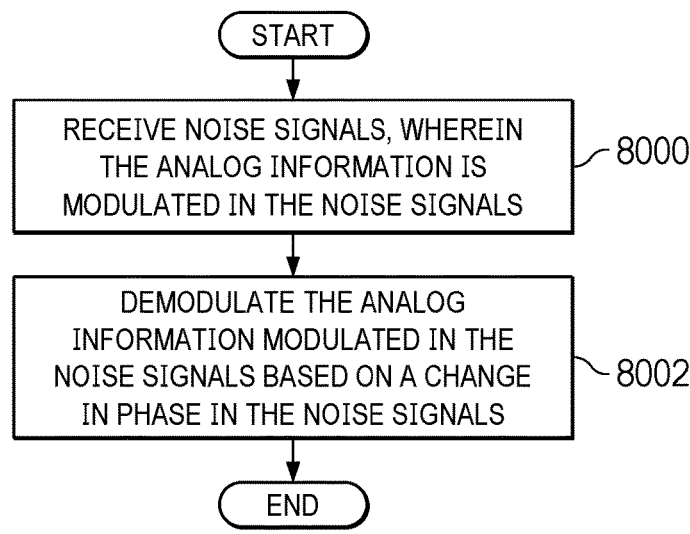
FIG. 80 is an illustration of a flowchart of a process for communicating analog information in accordance with an illustrative embodiment.

Turning next to FIG. 80, an illustration of a flowchart of a process for communicating analog information is depicted in accordance with an illustrative. The process in FIG. 80 can be implemented in hardware, software, or both. When implemented in software, the process can take the form of program instructions that are run by one or more processor units located in one or more hardware devices in one or more computer systems. For example, the process can be implemented in receiver 3617 in FIG. 68.

The process begins by receiving noise signals, wherein the analog information is modulated in the noise signals (operation 8000). The process demodulates the analog information modulated in the noise signals based on a change in phase in the noise signals (operation 8002). The process terminates thereafter.

Some features of the illustrative examples for modulating analog information 3607 using analog phase noise modulation 3623 in communications system 3602 are described in the following clauses. These clauses are examples of features and are not intended to limit other illustrative examples.

1. A communications system comprising:
   a computer system; and
   a communications manager in the computer system, wherein the communications manager is configured to:
   identify analog information for transmission; and
   transmit noise-band signals with changes in a phase of the noise-band signals that thereby modulates the noise-band signals to correspond to the analog information.

2. The communications system of clause 1, wherein the noise-band signals are radio frequency noise-band signals and further comprising:

a laser generation system configured to emit a set of one or more laser beams, wherein in transmitting the noise-band signals, the communications manager is configured to:

control an emission of a set of one or more laser beams from the laser generation system to control optical breakdowns that generate the radio frequency noise-band signals with the changes in the phase that thereby modulates the radio frequency noise-band signals to correspond to the analog information.

3. The communications system of clause 2, wherein in controlling the emission of the set of one or more laser beams, the communications manager is configured to:

control the emission of the set of one or more laser beams from the laser generation system to control the optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information.

4. The communications system of clause 2, wherein in controlling the emission of the laser beams, the communications manager is configured to:

control a set of one or more input parameters for an emission of a set of one or more laser beams from the laser generation system to control optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information.

5. The communications system of clause 4, wherein in controlling the set of one or more input parameters, the communications manager is configured to:

control directing the set of one or more laser beams along an axis such that the optical breakdowns varies in space along the axis to generate the radio frequency noise-band signals with the changes in the phase occurring along the axis that thereby modulates the radio frequency noise-band signals to correspond to the analog information.

6. The communications system of clause 1 further comprising:

an electrical noise generator configured to generate a carrier noise signal; and a modulator; and a transmitter, wherein in generating noise-band signals, the communications manager is configured to:

generate a carrier noise-band signal using the electrical noise generator; and modulate the carrier noise-band signal using the modulator to form the carrier noise-band signal with changes in a phase of the carrier noise-band signal that thereby modulates the phase of the carrier noise-band signal to correspond to the analog information.

7. The communications system of clause 1, wherein the noise-band signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

8. A method for communicating analog information, the method comprising:

identifying analog information for transmission; and transmitting noise-band signals having changes in a phase of the noise-band signals that thereby modulates the noise-band signals to correspond to the analog information.

9. The method of clause 8, wherein the noise-band signals are radio frequency noise-band signals and, wherein said transmitting the noise-band signals comprises:

controlling emission of a set of one or more laser beams from a laser generation system to control optical breakdowns that generate the radio frequency noise-band signals with the changes in the phase of the radio frequency noise-band signals that thereby modulates the radio frequency noise-band signals to correspond to the analog information.

10. The method of clause 9, wherein said controlling the emission of the set of one or more laser beams comprises:

controlling the emission of the set of one or more laser beams from the laser generation system to control the optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information.

11. The method of clause 9, wherein said controlling the emission of the laser beams comprises:

controlling input parameters for an emission of a set of one or more laser beams from the laser generation system to control optical breakdowns that generate the radio frequency noise-band signals by varying a location of a center point of the radio frequency noise-band signals, wherein a variation of the location of the center point of the radio frequency noise-band signals thereby modulates a phase of the radio frequency noise-band signals to correspond to the analog information.

12. The method of clause 9, wherein said controlling the emission of the laser beams comprises:

controlling input parameters for an emission of a set of one or more laser beams from the laser generation system to control optical breakdowns that generate the radio frequency noise-band signals by varying a location of an upper half-power point of the radio frequency noise-band signals, wherein a variation of the location of the upper half-power point of the radio frequency noise-band signals thereby modulates a phase of the radio frequency noise-band signals to correspond to the analog information.

13. The method of clause 9, wherein said controlling the emission of the laser beams comprises:

controlling input parameters for an emission of a set of one or more laser beams from the laser generation system to control optical breakdowns that generate the radio frequency noise-band signals by varying a location of a lower half-power point of the radio frequency noise-band signals, wherein a variation of the location of the lower half-power point of the radio frequency noise-band signals thereby modulates a phase of the radio frequency noise-band signals to correspond to the analog information.

14. The method of clause 9, wherein said controlling the emission of the laser beams comprises:
controlling directing the set of one or more laser beams along an axis such that the optical breakdowns varies in space along the axis to generate the radio frequency noise-band signals with the changes in the phase occurring along the axis signals that thereby modulates the radio frequency noise-band signals to correspond to the analog information.

15. The method of clause 8, wherein said transmitting the noise-band signals comprises:
generating a carrier noise-band signal using an electrical noise generator; and
modulating the carrier noise-band signal using the modulator to form the noise-band signal with changes in a phase of the carrier noise-band signal that thereby modulates the carrier noise-band signal to correspond to the analog information; and
transmitting the carrier noise-band signal with the changes in the phase of the carrier noise-band signal that thereby modulates the carrier noise-band signal to correspond to the analog information that modulates the analog information.

16. The method of clause 8, wherein the noise-band signal is selected from at least one of electromagnetic frequency noise signals, radio frequency noise-band, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

17. A method for communicating analog information, the method comprising:
receiving noise-band signals, wherein the analog information is modulated in the noise-band signals; and
demodulating the analog information modulated in the noise-band signals based on a change in a phase of the noise-band signals.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system comprising:
a computer system; and
a communications manager in the computer system, wherein the communications manager is configured to:
identify analog information for transmission; and
transmit noise signals with a varying amplitude to analog amplitude noise modulate the noise signals to correspond to the analog information.

2. The communications system of claim 1, wherein the noise signals are radio frequency noise signals, and further comprising:
a laser generation system configured to emit a set of one or more laser beams, wherein in transmitting the noise signals, the communications manager is configured to:
control an emission of the set of one or more laser beams from the laser generation system to control optical breakdowns that generate the radio frequency noise signals with the varying amplitude that thereby analog amplitude noise modulate the radio frequency noise signals to correspond to the analog information.

3. The communications system of claim 2, wherein in controlling the emission of the set of one or more laser beams, the communication manager is configured to:
control a strength of the set of one or more laser beams emitted from the laser generation system to control the optical breakdowns that generate the radio frequency noise signals with the varying amplitude that thereby analog amplitude noise modulate the radio frequency noise signals to correspond to the analog information.

4. The communications system of claim 3, wherein in controlling the strength of the set of one or more laser beams, the communication manager is configured to:
control the strength of the set of one or more laser beams emitted from a laser source in the laser generation system to control the optical breakdowns that generate the radio frequency noise signals with the varying amplitude that thereby analog amplitude noise modulate the radio frequency noise signals to correspond to the analog information.

5. The communications system of claim 3, wherein in controlling the strength of the set of one or more laser beams, the communication manager is configured to:
control the strength of the set of one or more laser beams emitted from the laser generation system using a set of optical elements to control the optical breakdowns that generate the radio frequency noise signals with the varying amplitude that thereby analog amplitude noise modulate the radio frequency noise signals to correspond to the analog information.

6. The communications system of claim 3, wherein in controlling the strength of the set of one or more laser beams, the communication manager is configured to:
control the strength of the set of one or more laser beams emitted from the laser generation system using an amplitude modulator in the laser generation system to control the optical breakdowns that generate the radio frequency noise signals with the varying amplitude that thereby analog amplitude noise modulate the noise signals to correspond to the analog information.

7. The communications system of claim 1, further comprising:
an electrical noise generator configured to generate a carrier noise signal;
a modulator; and
a transmitter, wherein in generating the noise signals, the communications manager is configured to:
generate the carrier noise signal using the electrical noise generator; and analog amplitude noise modulate an amplitude of the carrier noise signal using the modulator to vary the carrier noise signal with the varying amplitude that thereby analog amplitude noise modulates the carrier noise signal to correspond to the analog information.

8. The communications system of claim 1, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

9. A method for communicating analog information, the method comprising:
identifying the analog information for transmission; and
transmitting noise signals with a varying amplitude to analog amplitude noise modulates the noise signals to correspond to the analog information.

10. The method of claim 9, wherein the noise signals are radio frequency noise signals, and wherein said transmitting the noise signals comprises:
controlling emission of a set of one or more laser beams from a laser generation system to control optical breakdowns that generate the radio frequency noise signals with the varying amplitude that thereby analog amplitude noise modulates the noise signals to correspond to the analog information.

11. The method of claim 10, wherein said controlling the emission of the set of one or more laser beams comprises:
controlling a strength of the set of one or more beams emitted from the laser generation system to control the optical breakdowns that generate the radio frequency noise signals with the varying amplitude that thereby analog amplitude noise modulates the radio frequency noise signals to correspond to the analog information.

12. The method of claim 11, wherein said controlling the strength of the set of one or more beams comprises:
controlling the strength of the set of one or more beams emitted from a laser source in the laser generation system to control the optical breakdowns that generate the radio frequency noise signals with the varying amplitude that thereby analog amplitude noise modulates the radio frequency noise signals to correspond to the analog information.

13. The method of claim 11, wherein said controlling the strength of the set of one or more beams comprises:
controlling the strength of the set of one or more beams emitted from the laser generation system using a set of optical elements to control the optical breakdowns that generate the radio frequency noise signals with the varying amplitude that thereby analog amplitude noise modulates the radio frequency noise signals to correspond to the analog information.

14. The method of claim 11, wherein said controlling the strength of the set of one or more beams comprises:
controlling the strength of the set of one or more beams emitted from a laser source in the laser generation system using an amplitude modulator in the laser generation system to control the optical breakdowns that generate the radio frequency noise signals with the varying amplitude that thereby analog amplitude noise modulates the radio frequency noise signals to correspond to the analog information.

15. The method of claim 9, wherein said transmitting the noise signals comprises:
generating a carrier radio frequency noise signal; and
modulating the carrier radio frequency noise signal to form the noise signals with the varying amplitude that thereby analog amplitude noise the carrier radio frequency noise signal to correspond to the analog information; and
transmitting the noise signals with the varying amplitude that thereby analog amplitude noise modulates the noise signals to correspond to the analog information.

16. The method of claim 9, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

17. A method for communicating analog information, the method comprising:
receiving noise signals, wherein the analog information is analog amplitude noise modulated in the noise signals; and
analog amplitude noise demodulating the analog information analog amplitude noise modulated in the noise signals based on a change in amplitude in the noise signals.

18. The method of claim 17, wherein a receiver receives the noise signals and analog amplitude noise demodulates the noise signals.

19. The method of claim 18, wherein the receiver analog amplitude noise demodulates an analog amplitude noise modulated carrier radio frequency noise signal that includes the noise signals.

20. The method of claim 17, wherein the noise signals are selected from at least one of electromagnetic frequency noise signals, radio frequency noise signals, microwave frequency noise signals, audio frequency noise signals, ultrasonic frequency noise signals, ultra-low frequency noise signals, very low frequency noise signals, underwater frequency noise signals, or optical frequency noise signals including visible and/or non-visible light.

* * * * *